US012576498B2

(12) United States Patent
Zanoni

(10) Patent No.: US 12,576,498 B2
(45) Date of Patent: Mar. 17, 2026

(54) MULTI-TOOL COMBINING FIREFIGHTING IMPLEMENTS

(71) Applicant: Andrew Zanoni, Carol Stream, IL (US)

(72) Inventor: Andrew Zanoni, Carol Stream, IL (US)

( * ) Notice: Subject to any disclaimer, the term of this patent is extended or adjusted under 35 U.S.C. 154(b) by 0 days.

(21) Appl. No.: 18/403,520

(22) Filed: Jan. 3, 2024

(65) Prior Publication Data

US 2024/0139928 A1 May 2, 2024

Related U.S. Application Data

(63) Continuation of application No. 17/314,814, filed on May 7, 2021, now Pat. No. 11,958,176.

(Continued)

(51) Int. Cl.

| | |
|---|---|
| ***B25F 1/00*** | (2006.01) |
| ***A62B 3/00*** | (2006.01) |
| ***B25F 1/02*** | (2006.01) |

(52) U.S. Cl.

CPC .............. *B25F 1/006* (2013.01); *A62B 3/005* (2013.01); *B25F 1/02* (2013.01)

(58) Field of Classification Search

CPC . B25F 1/006; B25F 1/02; A62B 3/005; A62C 8/00; A62C 8/04; F16B 7/1472

(Continued)

(56) References Cited

U.S. PATENT DOCUMENTS 510,981 A * 12/1893 Massey .................... B25B 13/48
84/459
872,271 A * 11/1907 Benet ........................ B25D 1/02
254/19

(Continued)

FOREIGN PATENT DOCUMENTS

| | | |
|---|---|---|
| CN | 201400031 Y * | 2/2010 |
| CN | 205768438 | 12/2016 |
| EP | 1057594 | 12/2000 |

OTHER PUBLICATIONS

SONG Publication Feb. 10, 2010 retrieved translation from Espacenet: https://worldwide.espacenet.com/patent/search/family/041659827/publication/CN201400031Y?q=CN201400031Y (Year: 2010).*

(Continued)

*Primary Examiner* — Monica S Carter

*Assistant Examiner* — Christopher Soto

(74) *Attorney, Agent, or Firm* — Fitch, Even, Tabin & Flannery LLP

(57) ABSTRACT

A multi-purpose tool and a method for use thereof, where the multi-purpose tool includes a first component having a first shaft and at least one first tool affixed thereto and a second component comprising a second shaft having at least one second tool affixed thereto, the second shaft being substantially hollow and capable of slidably receiving the first shaft. The multi-purpose tool further includes a quick-securing mechanism disposed along the length of the second shaft including a dial that is rotatable relative to the second shaft and having a threaded portion affixed to the dial. The quick-securing mechanism is configured to move a pin into an extended position when the dial is rotated in a first direction, and to move the pin into a retracted position when the dial is rotated in a second direction. The pin interacts with one of at least two holes in the first shaft to secure the first shaft in either a compact or extended configuration relative to the second shaft.

18 Claims, 26 Drawing Sheets

Related U.S. Application Data

(60) Provisional application No. 63/021,348, filed on May 7, 2020.

(58) Field of Classification Search
USPC ................ 269/182, 181; 74/424.78; 254/134
See application file for complete search history.

(56) References Cited

U.S. PATENT DOCUMENTS

| | | | | | |
|---|---|---|---|---|---|
| 1,110,969 | A | | 9/1914 | Stacy | |
| 3,219,316 | A | | 11/1965 | Fried | |
| 3,705,430 | A | | 12/1972 | Ziaylek, Jr. | |
| 3,837,023 | A | * | 9/1974 | Spencer-Foote | B25F 1/02 403/287 |
| 4,287,623 | A | | 9/1981 | Tarran | |
| 4,597,123 | A | | 7/1986 | Cobe, Jr. | |
| 4,681,171 | A | | 7/1987 | Kee | |
| 4,785,488 | A | | 11/1988 | Schellas | |
| 4,926,558 | A | | 5/1990 | Brace | |
| 5,177,850 | A | | 1/1993 | Hull | |
| 5,315,724 | A | | 5/1994 | Trujillo | |
| 5,428,853 | A | | 7/1995 | Menke | |
| 5,743,577 | A | | 4/1998 | Newman, Jr. | |
| 6,357,067 | B1 | | 3/2002 | Jones | |
| 6,899,001 | B1 | * | 5/2005 | Sanders | B25B 13/48 81/125 |
| 7,124,474 | B2 | * | 10/2006 | Nicolay | A45F 5/00 16/436 |
| 7,337,515 | B2 | | 3/2008 | Phillips | |
| D566,510 | S | | 4/2008 | Nielsen | |
| 7,565,711 | B1 | | 7/2009 | Schamadan | |
| 7,634,830 | B2 | | 12/2009 | Ryan | |
| 7,735,172 | B2 | * | 6/2010 | Newton | B25F 1/00 7/166 |
| 8,061,688 | B2 | * | 11/2011 | Darbinyan | B66F 15/00 254/129 |
| 8,117,702 | B2 | | 2/2012 | Woolley | |
| 8,127,387 | B2 | | 3/2012 | Tygh | |
| 8,365,332 | B2 | | 2/2013 | Allen | |
| 8,434,802 | B2 | | 5/2013 | Lofley, Sr. | |
| 8,677,537 | B1 | | 3/2014 | Ingesson | |
| 8,707,491 | B1 | * | 4/2014 | Dykyj | A01B 1/08 30/131 |
| 8,752,224 | B2 | | 6/2014 | Ortiz | |
| 8,821,093 | B2 | * | 9/2014 | Kratzer | F16B 37/14 411/218 |
| 8,939,596 | B2 | | 1/2015 | Lee | |
| 9,003,586 | B2 | | 4/2015 | Weddle | |
| 9,345,912 | B2 | | 5/2016 | Wells | |
| 9,815,216 | B1 | * | 11/2017 | Clarke | B25D 1/00 |
| 10,058,720 | B2 | | 8/2018 | Weinmeister | |
| 11,090,514 | B2 | | 8/2021 | Huner | |
| 2004/0045416 | A1 | * | 3/2004 | Liou | B25D 1/02 81/177.1 |
| 2004/0261188 | A1 | | 12/2004 | Mathis | |
| 2005/0005457 | A1 | | 1/2005 | Wensel | |
| 2006/0075572 | A1 | | 4/2006 | Young | |
| 2008/0022815 | A1 | | 1/2008 | Farrell | |
| 2009/0307847 | A1 | | 12/2009 | Liou | |
| 2010/0299843 | A1 | | 12/2010 | Dapkins, Jr. | |
| 2014/0131644 | A1 | | 5/2014 | Brown | |
| 2015/0014612 | A1 | | 1/2015 | Liou | |
| 2015/0168987 | A1 | | 6/2015 | O'Keefe | |
| 2015/0314143 | A1 | * | 11/2015 | McCann | B25D 7/00 7/138 |
| 2020/0361072 | A1 | * | 11/2020 | Langan | B25F 1/006 |

OTHER PUBLICATIONS

Instructor Company 5 Productions, "Forcible Entry Solo Options" https://www.youtube.com/watch?v=wmhhsS-q_DA, dated Aug. 4, 2017.

Irons and Ladders LLC, "Forcible Entry Training Series; The 6' Steel Hook for Forcible Entry" https://www.youtube.com/watch?v=B2AIQSkbUzo, dated Oct. 18, 2014.

Tobin, Damon, "Back to Basics: Users for Irons," Fire Engineering (Mar. 1, 2008), available at https://www.fireengineering.com/articles/print/volume-161/issue-3/features/back-to-basics-uses-for-irons.html.

When Things Go Bad, Inc., "One Man Chisel Technique" https://www.youtube.com/watch?v=G-rU2-9Uwns, dated Dec. 30, 2014.

* cited by examiner

1400-A
1100-A
401
402
4-51
4-52
4-H53
4-H54
4-H55
101

DETAIL H
H
2300-A
301
302
F2-305
F2-306a
F2-306b
F2-306c
F2-307
F2-308
F2-309
F2-310
F2-311
F2-312
F2-313
F2-314
F2-315
F2-316
3-H58
3-H59
3-H61
2301s
2305c
2305d
2306e
2306f
2306g
2307f
2308a
2308b
2309g
2310c
2310i
2310k
2310m
2311o
2311p
2311q
2312q
2312r
2313f
2313g
2313h
2314a
2314b
2315d
2315e
2315f
2316d
2316f

1100-A

F1-104
F1-103a
F1-103b
101
101-S1
1101a
1101b
1101c
1101d
1101e
1101f
1101g
1101h
1101i
1101j
1101k
1103m
1103n
1103o
1103p
1103q
1103r
1103s
1104t
1104u
1104v
1104w
1104x
1104y
1104z

Pry Tool Bar: Alternate Embodiment 1

Pry Tool Bar: Alternate Embodiment 2

MULTI-TOOL COMBINING FIREFIGHTING IMPLEMENTS

CROSS REFERENCE TO RELATED APPLICATIONS

This application is a continuation of U.S. application Ser. No. 17/314,814, filed May 7, 2021, and claims the benefit of U.S. Provisional Application No. 63/021,348 filed May 7, 2020, both of which are incorporated herein by reference in their entirety.

TECHNICAL FIELD

The present invention relates to tools and methods frequently used by emergency service personnel. More specifically, the invention pertains to forcible entry tools most commonly used by fire rescue professionals to gain access to areas blocked by locked doors or fallen debris.

BACKGROUND

Firefighting is a dangerous industry. A firefighter's tools can reduce the chances of injury and make it possible to extinguish the fire faster with less resulting destruction of property. Over the past few years, technological advancements have forced the fire department to evolve. Their duties have expanded to not only include extinguishing fire but also technical rescue, medical aid, and community engagement.

Every call a firefighter responds to is different. While some require tools specific to the incident, the most common tool firefighters use is a set of irons which comprises of an ax and a Halligan tool. The Halligan has remained virtually unchanged throughout its 71-year history.

A Halligan is a multi-purpose tool frequently used by emergency services and military personnel during forcible entry operations. This double-sided tool characteristically has an adz or wedge on one end and a claw or fork on the opposite end. The Halligan tool is commonly used with a fire ax when forcing entry. This pairing of tools is traditionally referred to as a set of "irons."

The capabilities of a traditional set of irons have been outmatched by growing duty requirements and constantly evolving building construction methods that now incorporate innovations such as lightweight construction methods, increasingly energy-efficient materials, and greater security. A traditional set of irons may fail to open many doors, thus requiring a longer Halligan-like add-on (whose name, appearance, and exact function varies greatly by geographical location) to be used concurrently with the traditional Halligan during forcible entry operations. A set of irons by itself is unwieldy and difficult to carry, and difficult to use properly. In many cases, two people are needed to complete a forced entry using the traditional set of irons. If the longer and heavier Halligan-like add-on is needed, the number of individuals required to efficiently complete a forcible entry operation rises to three. This change in procedure further prolongs rescue operations and stresses municipal budgets.

A robust and agile emergency services department is a core part of most municipal public safety services. Budget cuts, however, can create gaps in service and forced layoffs of critical personnel. The fire service needs people and tools to operate effectively. As many departments are forced to lay off as many as half their firefighters, departments have been forced to close stations. This change creates large service gaps that lengthen response times, increase the chances of additional exposures, and decrease the amount of time firefighters have to get control over the fire.

To shorten response times and ensure there is enough manpower to extinguish a fire quickly and safely many fire departments are establishing mutual aid agreements with neighboring departments and creating rapid response units. These units typically use smaller pickup size trucks and carry fewer firefighters and gear so they can get to the incident faster and before the larger rescue, pumper, and ladder crews. The present invention's multi-functionality and ease of use by a single individual not only make it suitable for any fire emergency but particularly suited for use by such a rapid response unit.

SUMMARY

Generally speaking and pursuant to these various embodiments, an apparatus is provided herein comprising two main bodies that can mate together in multiple configurations by sliding to create a singular multi-function tool. Methods for using the apparatus are also provided herein. The apparatus is intended for use in performing search and rescue, automotive extrication, overhaul, and forcible entry for fire service and law enforcement personnel.

One object of the apparatus is to be a singular firefighting tool that can serve a multiplicity of purposes. By using a single multi-function tool the disclosed apparatus eliminates the current need of a plurality of separate tools for many common firefighting tasks. In addition, the apparatus in alternative embodiments could have applications beyond the fire service by assisting military and paramilitary organizations, such as law enforcement and SWAT, to gain access to fortified structures. Across all embodiments, the tool is manufactured from metals and other materials, such as carbon steel and titanium, proved capable of withstanding the rigors of rescue operations while still being versatile, simple in design, and familiar to veteran emergency service personnel. The tool includes sub-components secured in redundant ways, increasing the strength of the overall tool and helping to make it robust for its intended use.

To achieve the preceding and other objects under the purpose of the tool, the present application discloses a multi-tool combining firefighting implements into one tool for use by a single firefighter. One embodiment disclosed and broadly described herein is a two-part multi-tool comprising, first, a Halligan-type pry bar with a mostly hollow handle, and second, a separate striking tool with a handle. In one example, the striking tool includes an ax head. The hollow handle of the Halligan-type pry bar acts as an outer shaft and the striking tool's handle acts as an inner shaft. One end of the striking tool's handle may be inserted from either end of the Halligan tool and slide freely within the Halligan-type tool's hollow handle, allowing the two tools to be married together. Detents built into the striking tool's handle coupled with a locking mechanism mounted onto the Halligan-type pry bar portion of the tool allow the two parts to be locked together from at least one of several points along the length of the striking tool handle. The locks may be used to adjust the overall length and allow it to be carried single-handedly by one person. When using both parts of the disclosed device together in its longest configuration, a single person can exert significant prying force on an object while using less energy and equipment than a pair of emergency services personnel equipped with two or more separate tools, e.g. a Halligan coupled with a longer prying tool such as a New York hook; or a striking tool such as an ax coupled with a wedge. For industrial buildings, the devices disclosed may be preferable to include a hand operated hydraulic spreader or a K12 saw.

In other disclosed examples, both the inner shaft and the outer shaft include one or more of a fork for prying, a pike, an adz head, a hammerhead or any other tool meant for striking, prying, or cutting.

An embodiment disclosed and broadly described herein is a multi-purpose tool, comprising a first component and a second component. The first component includes a first shaft having at least one first tool affixed thereto, the first shaft having at least two holes disposed at different locations along the length of the first shaft. The second component includes a second shaft having at least one second tool affixed thereto, the second shaft being substantially hollow and capable of slidably receiving the first shaft. The at least one first tool and the at least one second tool are selected from the group consisting of an adz, a pry fork, and an ax head. The multi-purpose tool also includes a quick-securing mechanism disposed along the length of the second shaft. The quick-securing mechanism includes a dial that is rotatable relative to the second shaft and having a threaded portion affixed to the dial, and a pin. The quick-securing mechanism is configured to move the pin into an extended position when the dial is rotated in a first direction, and to move the pin into a retracted position when the dial is rotated in a second direction.

In one example, the first shaft of the multi-purpose tool includes a first one of the at least two holes substantially located at a center of the second shaft and a second one of the at least two holes substantially located proximate to an end of the first shaft.

In another example, the pin of the quick-securing mechanism engages with a first one of the at least two holes to secure the first shaft in a retracted position relative to the second shaft, and the pin of the quick-securing mechanism engages with a second one of the at least two holes to secure the first shaft in an extended position relative to the second shaft.

In another example, the pin of the quick-securing mechanism further comprises a threaded portion interlocked with the threaded portion of the dial.

In another example, the second shaft has multiple ribs with spaces in between to allow visibility of the first shaft. The spaces between the ribs advantageously reduce the weight of the multi-purpose tool and allow a firefighter to see how the first shaft aligns within the second, hollow shaft.

In another example, the dial of the quick-securing mechanism preferably has a diameter that is greater than or equal to 1.5 inches. This size enables a firefighter wearing protective gloves to operate the dial, despite having reduced dexterity resulting from the protective gloves.

A further embodiment disclosed and broadly described herein is a multi-purpose tool including a first shaft being substantially hollow and capable of slidably receiving a second shaft, the second shaft having at least one hole disposed along the length of the second shaft. The multi-purpose tool also includes a quick-securing mechanism disposed along the length of the first shaft. The quick-securing mechanism includes a dial that is rotatable relative to the first shaft and which has a threaded portion affixed to the dial, a pin having a channel running along a portion of the long axis of the pin and a threaded portion interlocked with the threaded portion of the dial, and a first static piece affixed to the first shaft, having a protrusion capable of being received in the channel of the pin and sliding within the channel during rotation of the dial. The pin is capable of engaging the at least one hole of the second shaft to secure the second shaft relative to the first shaft. The second shaft is capable of sliding in and out of the first shaft when the pin is not engaged with the at least one hole of the second shaft.

In one example, the multi-purpose tool includes at least one first tool affixed to the first shaft and at least one second tool affixed to the second shaft. The at least one first tool and the at least one second tool are selected from the group consisting of an adz, a pry fork, and an ax head. In another example, the pin of the multi-purpose tool does not rotate relative to the first shaft.

A further embodiment disclosed and broadly described herein is a multi-purpose tool, including a first tool and a second tool. The first tool includes a first shaft having at least two holes disposed at different locations along the length of the first shaft, and an ax head affixed to a first end of the first shaft. The second tool includes a second shaft being hollow and capable of receiving the first shaft, an adz affixed to a first end of the second shaft, a pike affixed to the first end of the second shaft and oriented perpendicular to the first shaft and oriented perpendicular to a blade of the adz, and a pry bar affixed to a second end of the second shaft. The second tool further includes at least two handles disposed at different locations along the length of the first shaft and at least one striking surface disposed on the second shaft. The multi-purpose tool further includes a quick-securing mechanism comprising a dial and a pin. The pin is capable of moving between a retracted position in which the pin does not engage the holes disposed on the first shaft, and an extended position in which the pin engages at least one of the at least two holes of the first shaft.

In one example, the ax head of the multi-purpose tool further includes a blade portion having a sharpened ax edge and through-hole shaped to operate as a handle. The multi-purpose tool also includes a detachable portion secured to the blade portion with at least one screw. The detachable portion includes a hammer surface on a face opposite the sharpened ax edge of the blade portion, and a hydrant tool component. The hydrant tool includes a threaded through-hole configured to receive a threaded bolt. The threaded bolt, when screwed into the through-hole tightens against a socket surface. The socket surface is designed to receive a variety of hydrant valve bolts, including four-sided, five-sided, and six-sided bolt-heads of varying sizes. The socket surface includes a flat surface and a diamond-shaped indentation disposed opposite a threaded end of the threaded bolt.

In one example, the blade portion of the ax head of the multi-purpose tool has a serrated edge adjacent to the sharpened ax edge. The serrated edge can be used to saw through asphalt shingles or other similar material.

In another example, the multi-purpose tool includes at least one striking plate located on or substantially proximate to each of the adz and the pry bar.

In another example, the multi-purpose tool is configured such that, in a retracted position, the first shaft of the first tool is slidably inserted in the second shaft of the second tool such that the respective tines of the pry bar are disposed on either side of the ax head. In this retracted position, the multi-purpose tool is compact and can be carried by a single firefighter.

In another example, the at least one of the two handles on first shaft of the multi-purpose tool is located along the first shaft proximate to a center of gravity of the multipurpose tool when the multipurpose tool is in the retracted position. Because of its proximity to the multi-purpose tool's center of gravity, a firefighter can carry the tool single handed by the handle, and the tool will be substantially balanced.

A method of using a multi-purpose tool to separate a door from a door frame is disclosed and broadly described herein. The method requires a multipurpose tool including a first tool and a second tool. The first tool includes a hollow shaft, an adz affixed to a first end of the hollow shaft, and a pry fork affixed to a second end of the hollow shaft. The second tool may comprise a striking tool, such as an ax, and includes a second shaft with at least two holes disposed at different locations along the length of the second shaft, and an ax head affixed to a first end of the second shaft. A second end of the second shaft is configured to be slidably received in the hollow shaft. The multipurpose tool required by the method also includes a quick-securing mechanism comprising a dial and a pin. The method of separating a door from a door frame includes multiple steps, discussed here in arbitrary order. The method includes inserting a first prying tool, such as the adz, into a space between the door and a door jamb up to a notch in the adz, sliding the second shaft within the hollow shaft until the pin of the quick-securing mechanism aligns with one of the at least two holes of the second shaft to provide an extended composite shaft, rotating the dial to extend the pin into the one of the at least two holes of the second shaft, applying a first force perpendicular to the multi-purpose tool sufficient to crush the door jamb and to create an expanded space between the door and the jamb by separating the door from the door jamb. In some situations, the first force is not sufficient to crush the door jamb and an additional force sufficient to crush the door jamb must be applied, to create an expanded space such that the adz may be further inserted into the gap. After the door jamb is crushed, the two tools can be separated, leaving the adz in the door. Then, the ax head may be used to drive the adz deeper, up to a second notch, and possibly beyond the second notch.

It is noted that, in situations where the door is easily penetrable—such as a weaker interior door—and set up to swing towards the user, the ax handle could be reinserted, and the user may force the door open using the adz by pulling end opposite the adz toward the user. As described in the steps of the method, the composite shaft is composed of both the hollow shaft and the second shaft, such that the hollow shaft holding the adz tool is extended using the second shaft associated with the ax head. In some situations, the first tool and the second tool may not need to be secured together to exert appropriate force to separate the door from the door jamb. For example, the second shaft may be slid into the first shaft a distance, such that the shafts are not secured, but the user is provided sufficient leverage to separate the door from the doorjamb.

In one example, the step of inserting the adz further includes rotating the dial to retract the pin, separating the second tool from the first tool by sliding the second shaft out of the hollow shaft, and striking the first tool using the ax head of the second tool to drive the adz deeper into the space between the door and the door jam.

In another example, the method also includes removing the adz from the expanded space between the door and the door jamb and inserting the pry fork into the expanded space between the door and the door frame up to a notch in the pry fork. Depending on the quality of the gap made using the adz, the user may need to apply additional force to the composite shaft to create a higher quality gap. The concave surface of the fork should face the door hinge if the door opens toward the user and the convex surface of the fork should face the door's hinge if the door opens away from the user. The method also includes sliding the second shaft within the hollow shaft until the pin of the quick-securing mechanism aligns with one of the at least two holes of the second shaft to provide an extended composite shaft, rotating the dial to extend the pin into the one of the at least two holes of the second shaft, and applying a second force perpendicular to the multi-purpose tool to further separate the door from the door frame.

In some versions of the present example, before the adz is removed from the door, the ax head, or a separate wedge could be used to maintain the gap between the door and the door frame, making for a more efficient process. The fork can then be inserted into the gap, following the process described above. The blade of the ax head can be removed from the expanded space after inserting the prior fork into the expanded space. This technique advantageously maintains the expanded space while the adz is replaced with the pry fork within the expanded space.

In another example, the step of inserting the pry fork further includes rotating the dial to retract the pin, separating the second tool from the first tool by sliding the second shaft out of the hollow shaft, and striking the first tool using the ax head of the second tool to drive the pry fork into the expanded space between the door and the door jam.

In another example, the method further includes viewing the alignment of the second shaft relative to the hollow shaft through one or more openings provided along the hollow shaft.

BRIEF DESCRIPTION OF DRAWINGS AND FIGURES

The above needs are at least partially met through provision of a multi-purpose tool described in the following detailed description, particularly when studied in conjunction with the drawings, wherein.

Figure 5:
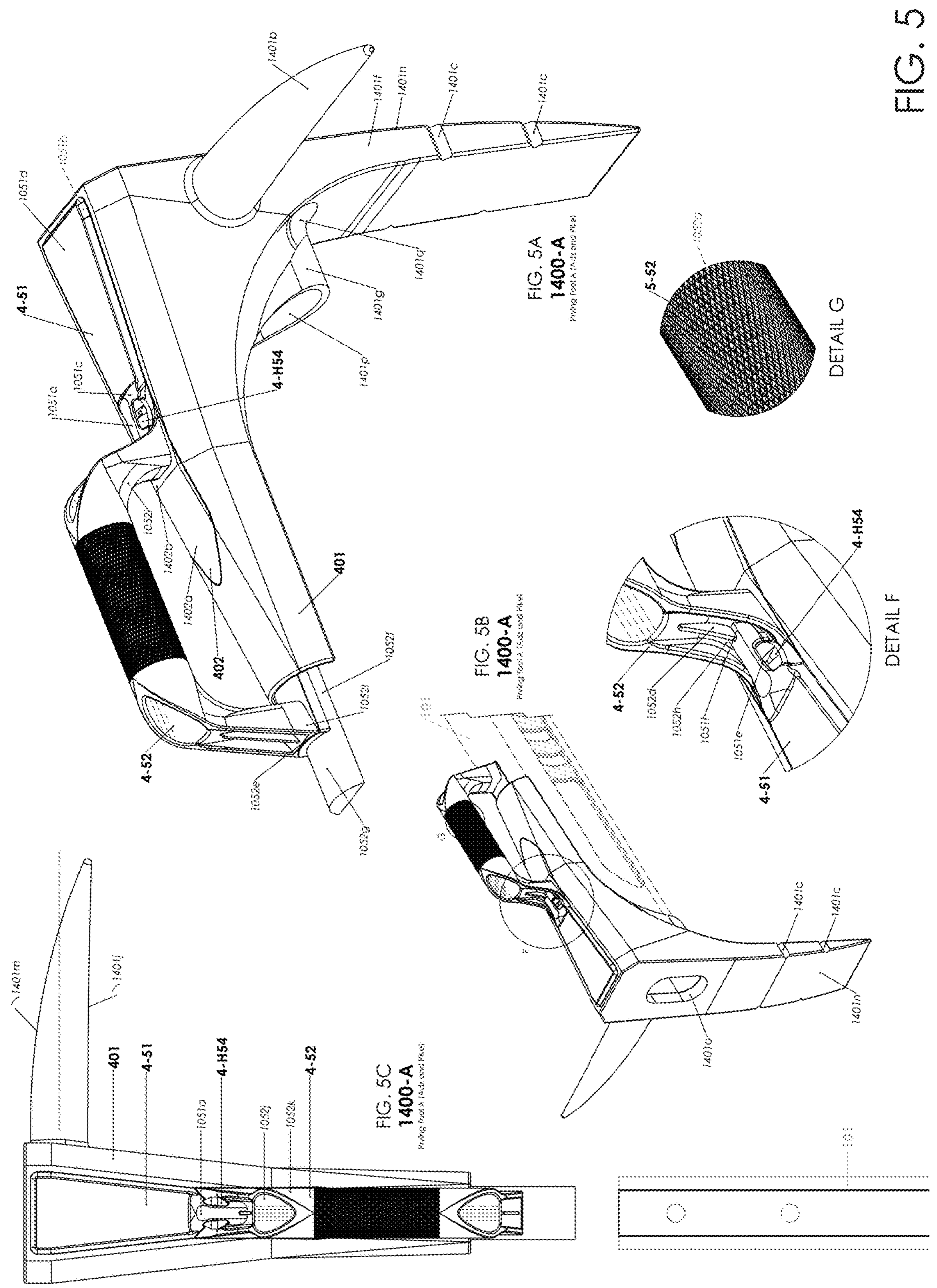

FIG. 5 includes multiple views of the adz assembly which is one of the preferred prying tools affixed to an outer shaft or Halligan-type pry bar. FIG. 5A is a main perspective view; this view illustrates a complete adz assembly. FIG. 5B is a secondary perspective view illustrating a backside of an adz assembly while affixed to a Halligan-type pry bar. Detail callouts in FIG. 5 illustrate hidden parts and details. FIG. 5C is a secondary top-down view illustrating the shape of a pike portion of a Halligan-type pry bar.

Figure 6:
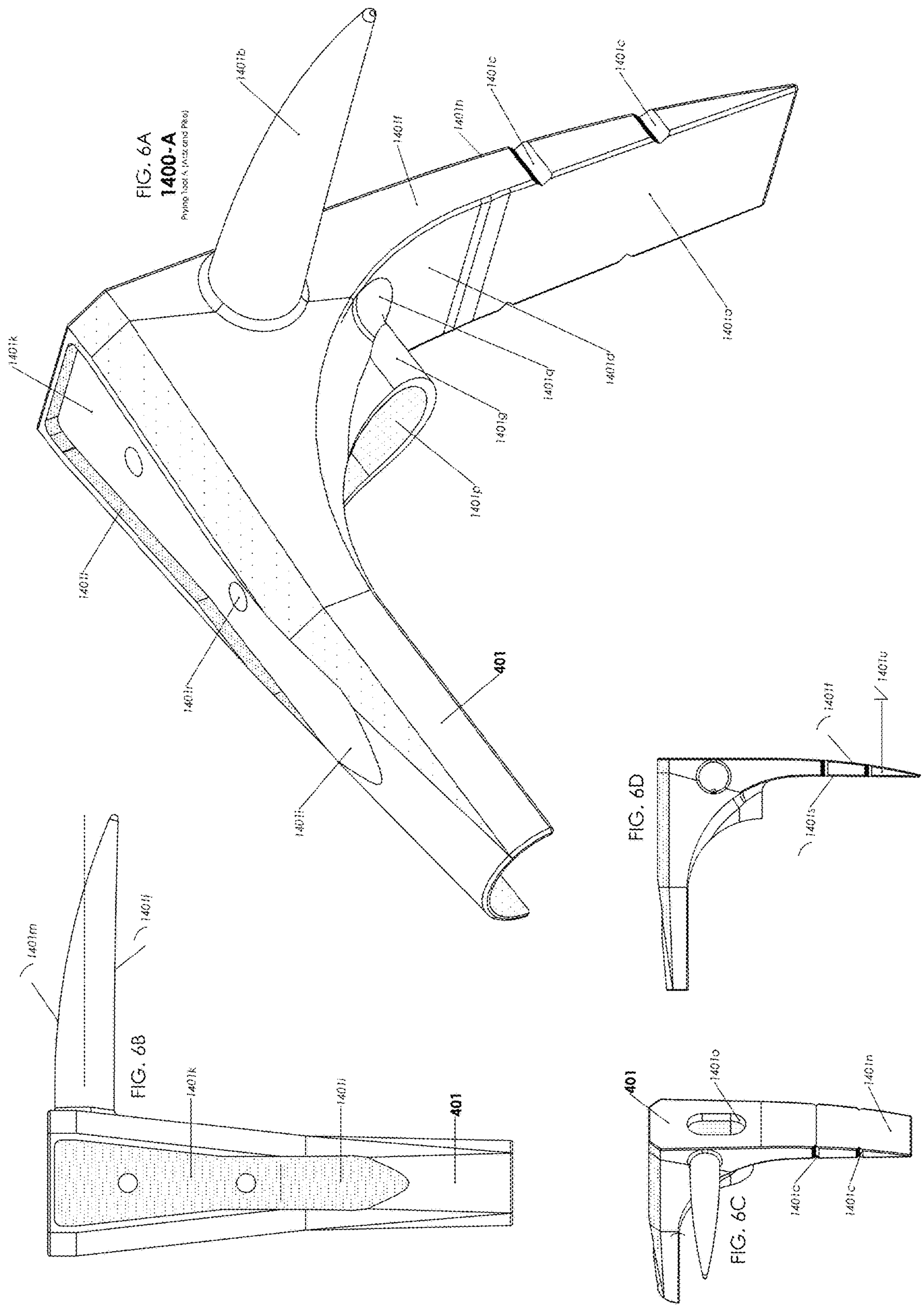

FIG. 6 contains multiple views of an adz head. FIG. 6A is a perspective view of the adz body when viewed from the top-right. FIG. 6B is a top-down view of the adz body. FIG. 6C is a perspective view of the adz assembly when viewed from the back-right. FIG. 6D is a right-side view of the adz assembly.

Figures 7, 7A, 7B:
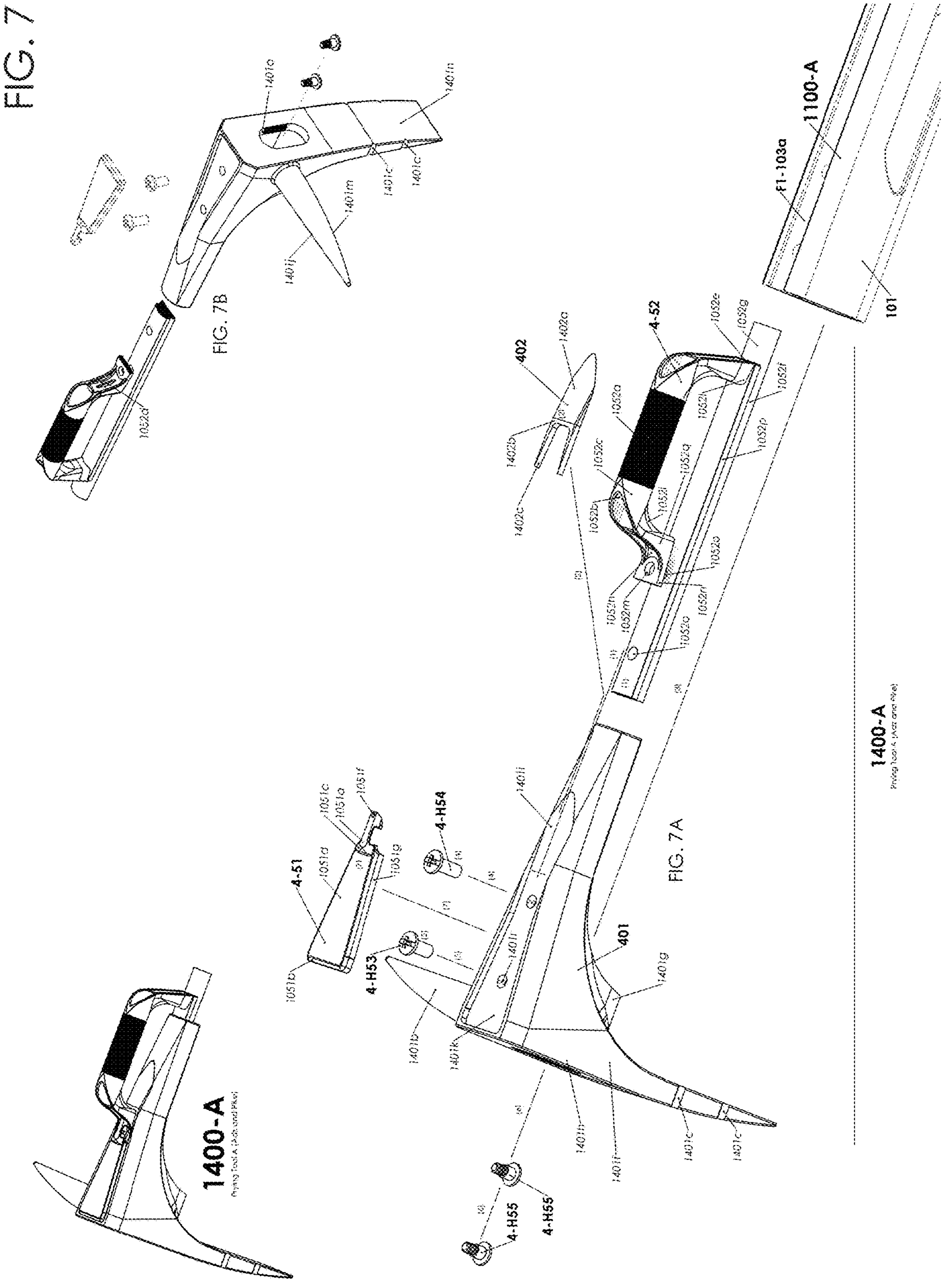
Figure 8:
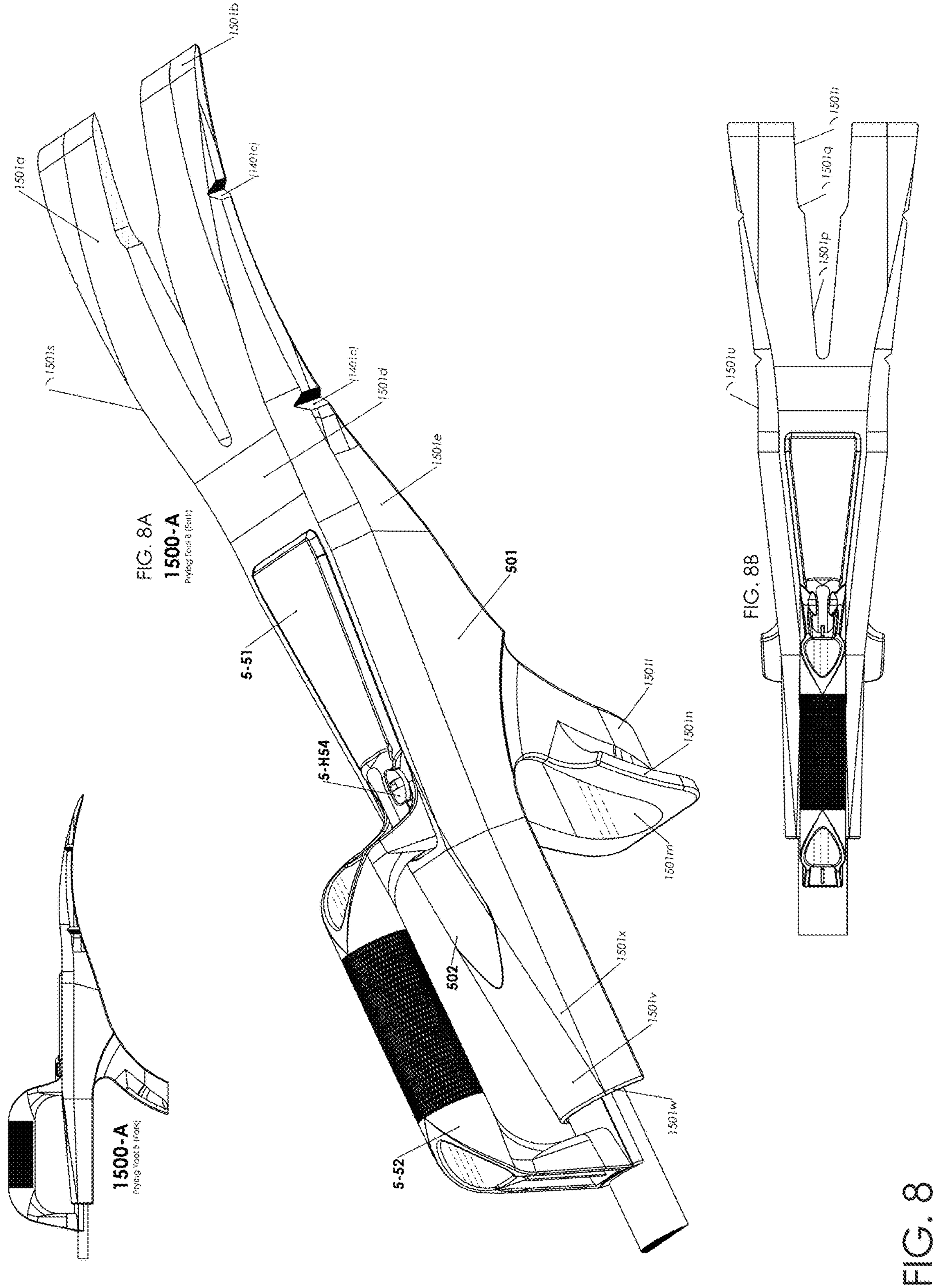

FIG. 7 includes a pair of exploded perspective views illustrating individual parts of the adz assembly illustrated in FIG. 6. FIG. 7A is an exploded perspective view of an adz assembly pry tool. A thumbnail of the fully assembled adz assembly pry tool with an identical viewing angle to the exploded assembly is included for reference. FIG. 7B is an exploded perspective view of the adz assembly pry tool from the opposite direction of FIG. 7A to better illustrate several small details and the assembly path of the binding bolts FIG. 8 contains multiple views of a fork assembly which is a second preferred prying tool to be affixed to a Halligan-type pry bar. FIG. 8A is a perspective view illustrating a complete fork pry tool assembly. FIG. 8B is a top-down view of a complete fork pry tool assembly illustrating notches cut into the fork tines.

Figure 9:
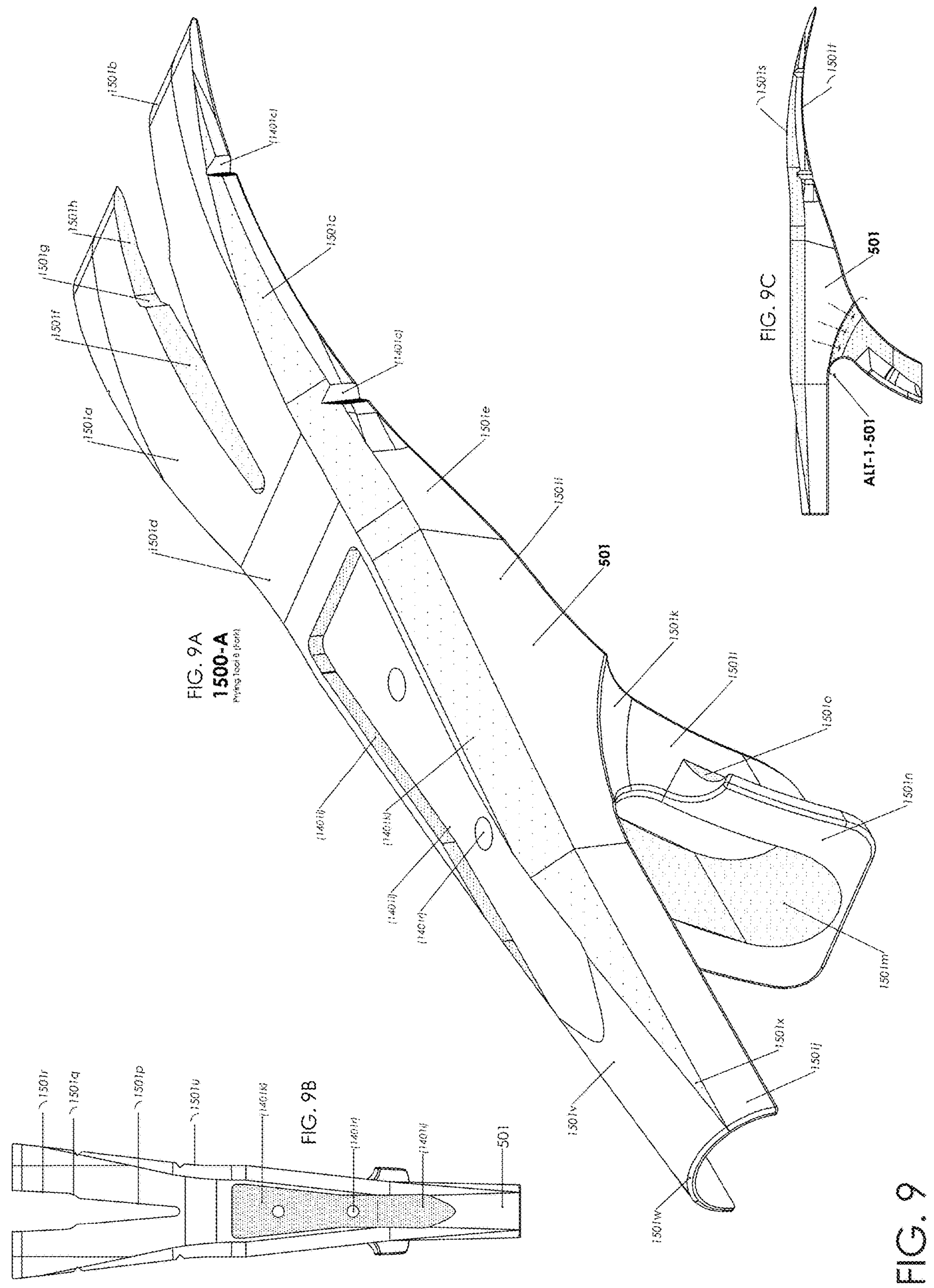

FIG. 9 contains multiple views of the fork illustrated in FIG. 8. FIG. 9A is a perspective view of the fork body when viewed from the back-right. FIG. 9B is a top-down view of the fork body. FIG. 9C is a right-side view of the fork body.

Figure 10:
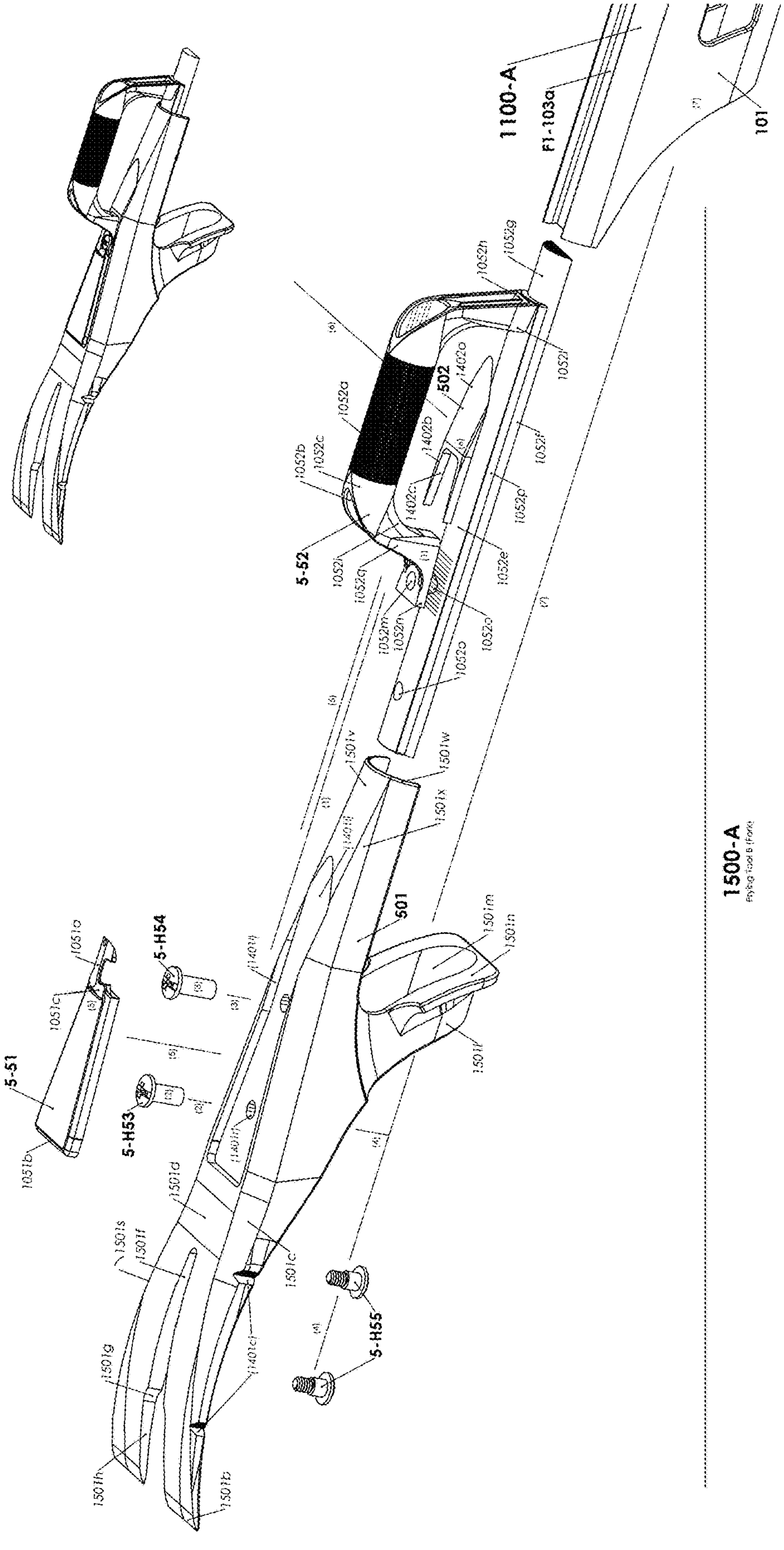

FIG. 10 is an exploded perspective view of the fork pry tool illustrated in FIG. 8. Within the exploded perspective view of FIG. 10, numbered assembly leads are included between individual parts. FIG. 10 also includes a thumbnail of a fully assembled fork pry tool with an identical viewing angle to the exploded assembly.

Figure 11:
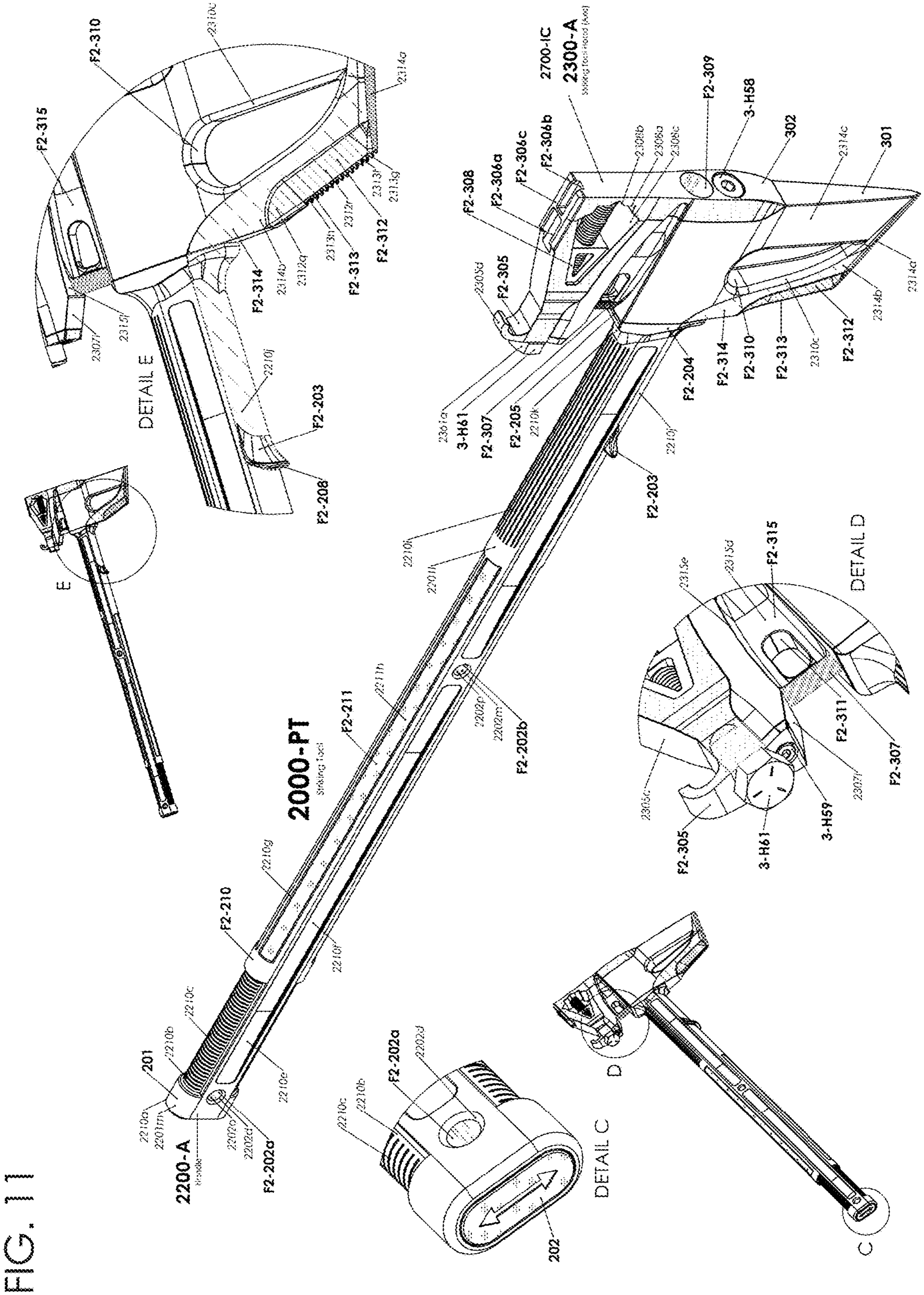

FIG. 11 is a perspective view of the inner shaft or striking tool. Detail callouts and contextual views illustrate hidden parts and details.

Figure 12:
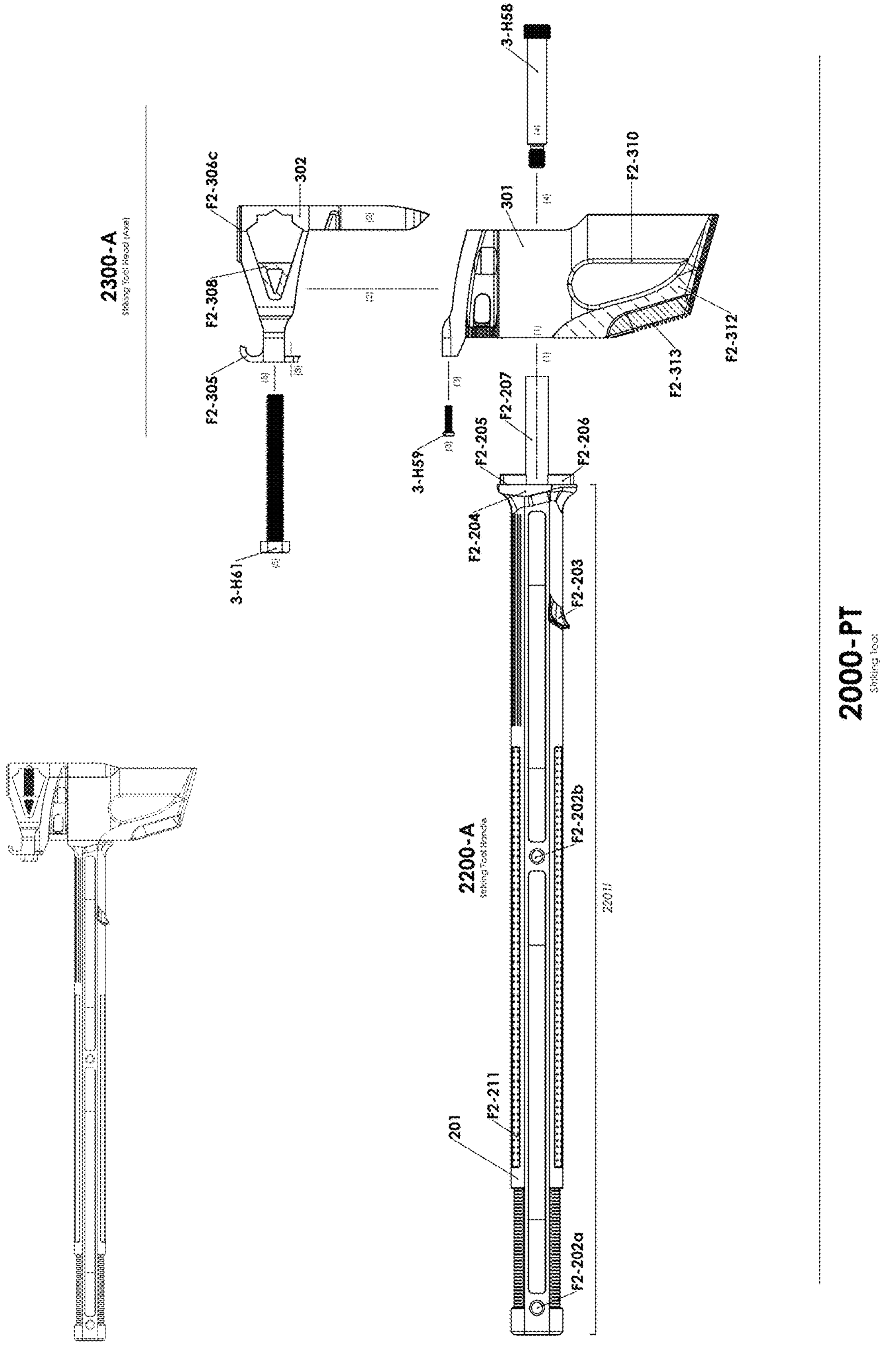

FIG. 12 is an exploded perspective view of a preferred embodiment of a striking tool, including the multi-function ax illustrated in FIG. 11. The exploded perspective view of FIG. 12 illustrates an ax head and how it connects to an inner shaft or striking tool handle, using numbered assembly leads between individual parts. FIG. 12 also includes a thumbnail of a fully assembled ax with an identical viewing angle to the exploded assembly.

Figures 13, 13A, 13B, 13C:
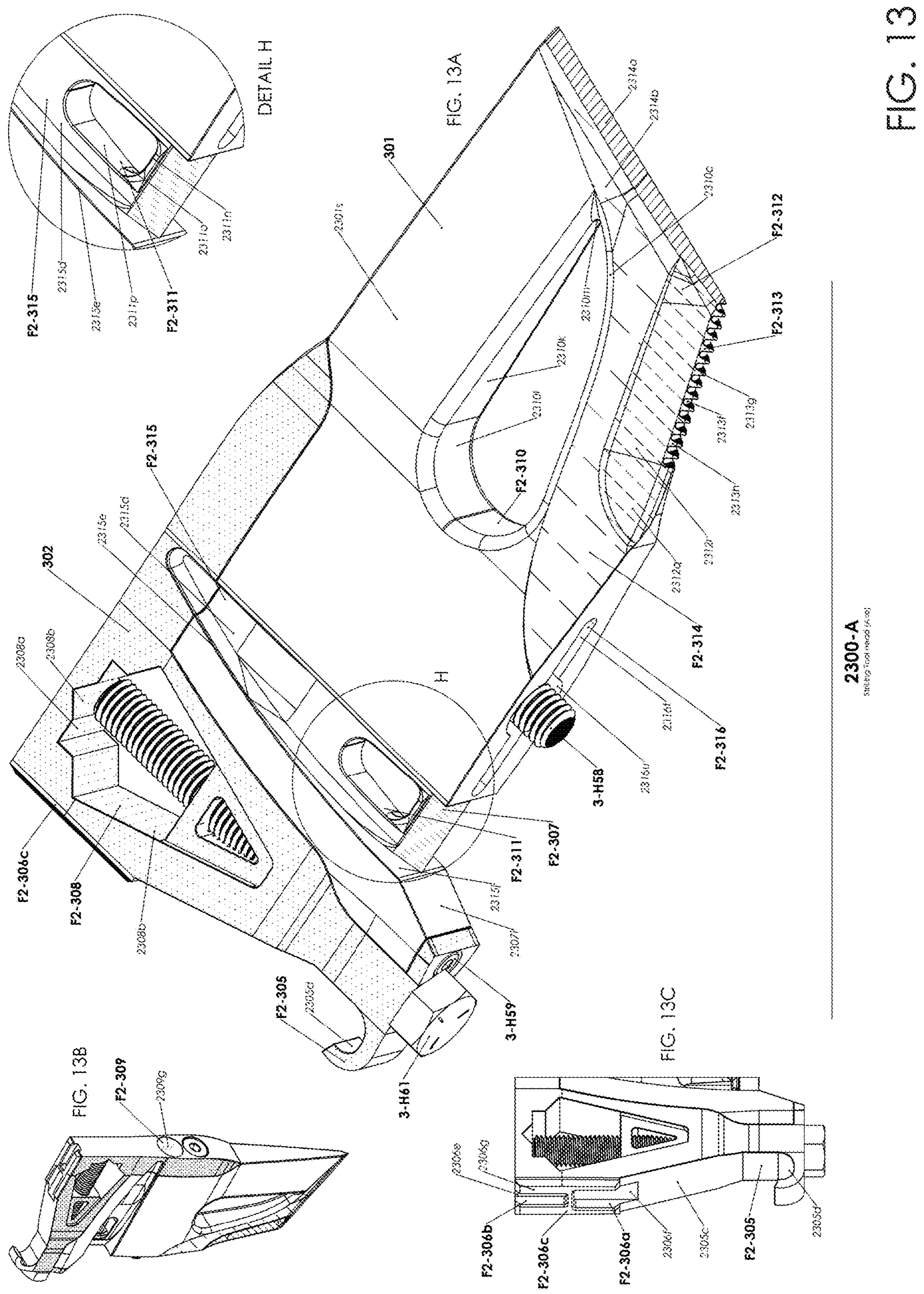

FIG. 13 includes multiple perspective views of the multi-function ax head assembly illustrated in FIG. 11. FIG. 13A is a main perspective view of the ax head striking tool assembly. Detail callout H illustrates hidden parts and details. FIG. 13B is a secondary perspective view of an ax head striking tool assembly from the top rear to highlight a hole feature on top of the hydrant tools bracket which can interface with fire hose couplings and fire hydrants. FIG. 13C is a secondary cutoff perspective view of an ax head striking tool assembly illustrating the back of a hydrant tool bracket attached to the back of an ax head.

Figure 2:
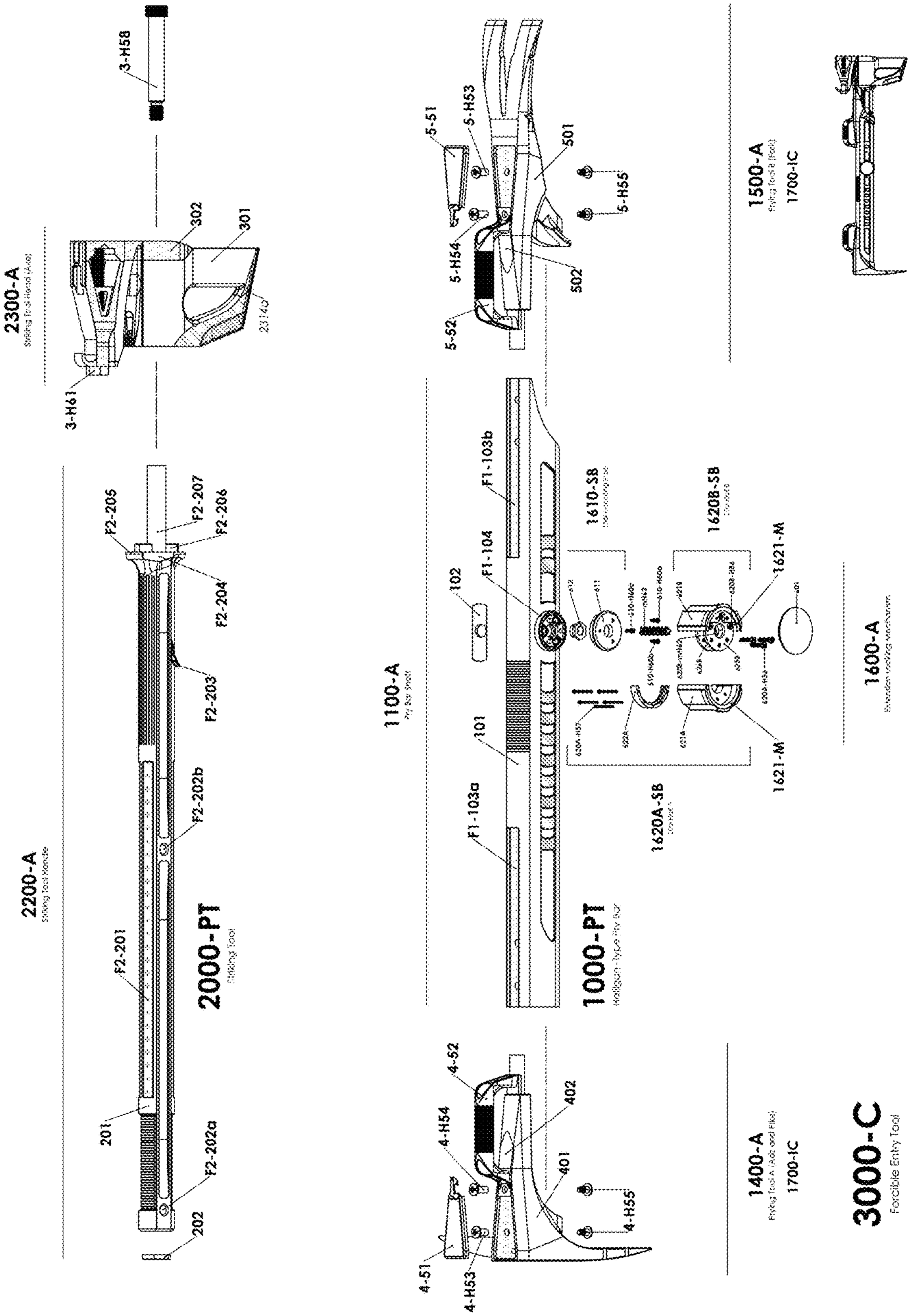
FIG. 2 is a perspective exploded view of a forcible entry tool illustrating individual assemblies and subassemblies, some of which have been further exploded to illustrate individual parts.
Figure 14:
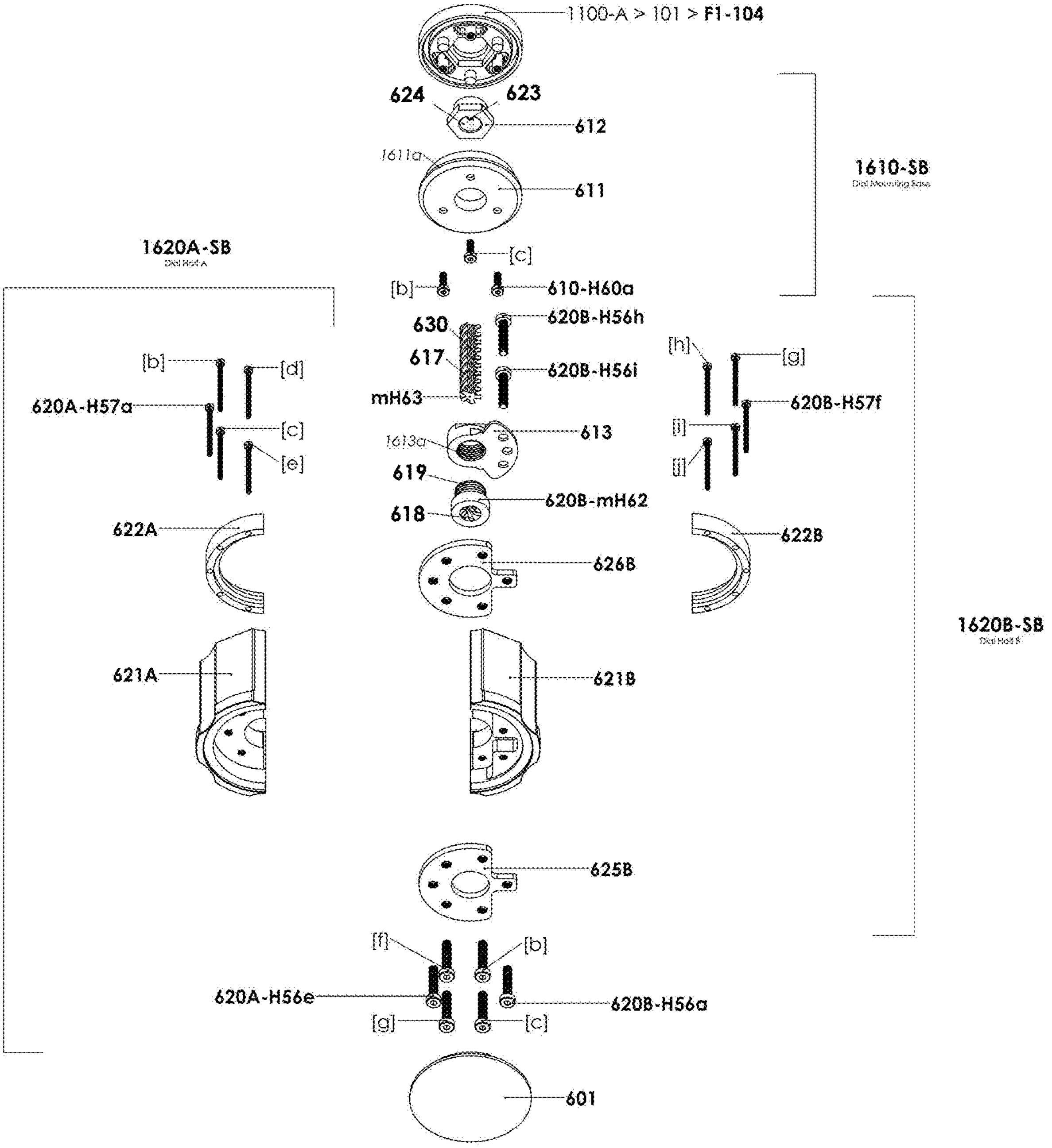

FIG. 14 is a general exploded view illustrating the extension locking mechanism illustrated in FIG. 2. FIG. 14 illustrates separate sub-assemblies of the extension locking mechanism exploded to reveal each part.

Figure 15:
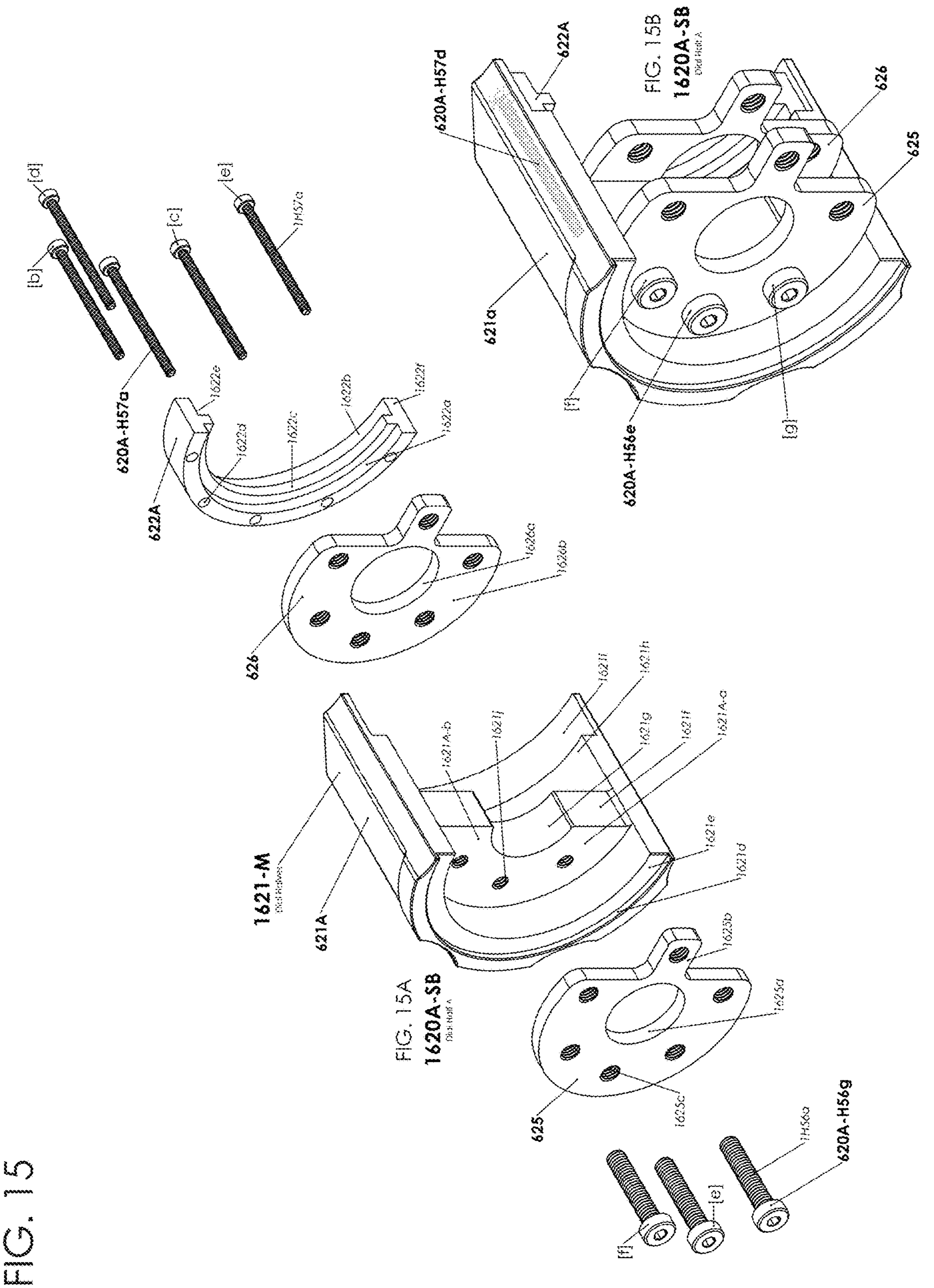

FIG. 15 includes multiple views of a first dial half of the extension locking mechanism illustrated in FIG. 14. FIG. 15A is an exploded view of a first dial half of an extension locking mechanism. FIG. 15B is a perspective view of the first dial half illustrated in FIG. 15A, illustrating an assembled view of the first dial half in the same perspective shown in FIG. 15A.

Figure 16:
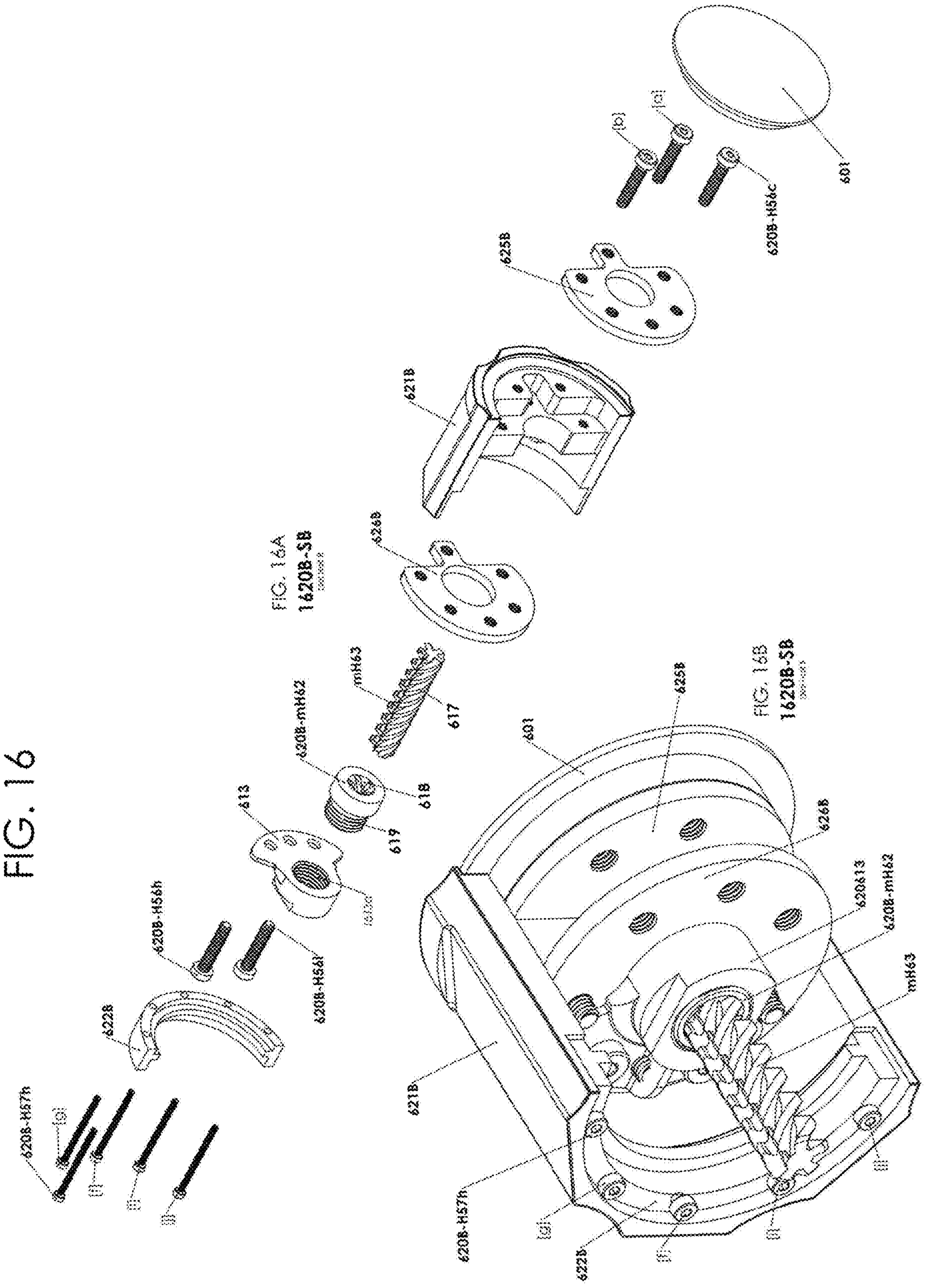

FIG. 16 includes multiple views of a second dial half of the extension locking mechanism illustrated in FIG. 14. FIG. 16A is an exploded view of a second dial half of the extension locking mechanism. FIG. 16B is a perspective view of the second dial half illustrated in FIG. 16A, illustrating an assembled view of the second dial half in a different perspective view.

Figures 17, 17A, 17B, 17C, 17D, 17E, 17F:
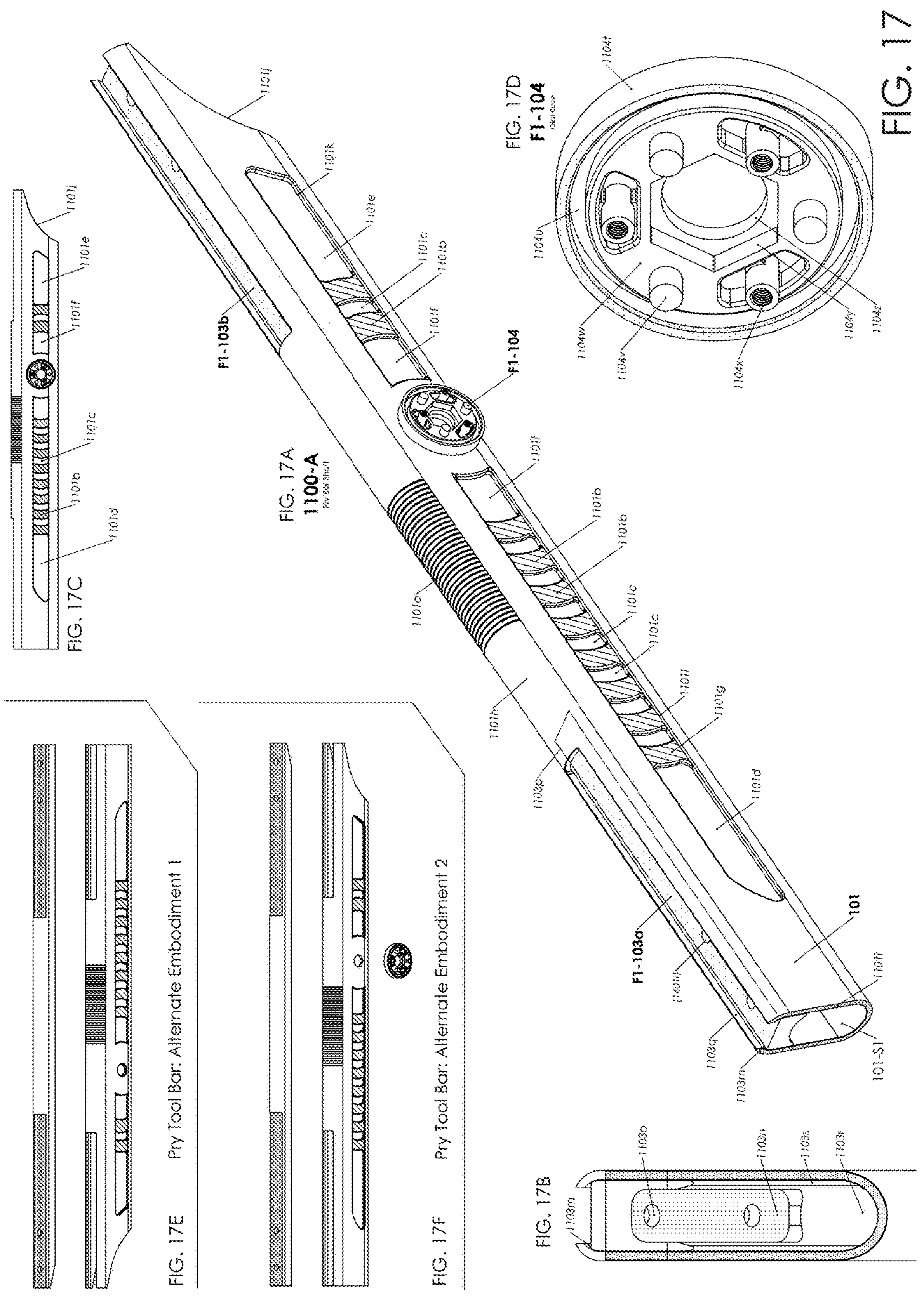

FIG. 17 contains multiple views and several embodiments of a Halligan-type pry bar shaft, including a preferred embodiment as illustrated in FIG. 2. FIG. 17A is a perspective view of the preferred embodiment of the pry bar shaft illustrated in FIG. 2. FIG. 17B is a perspective view illustrating the same pry bar shaft when viewed from the bottom right. FIG. 17C is a right-side view of the same pry bar shaft. FIG. 17D is a perspective view of a dial base. FIG. 17E is an exploded perspective view of an example of a Halligan-type pry bar shaft. FIG. 17F is an exploded perspective view of an alternate embodiment of the pry bar shaft.

Figure 18:
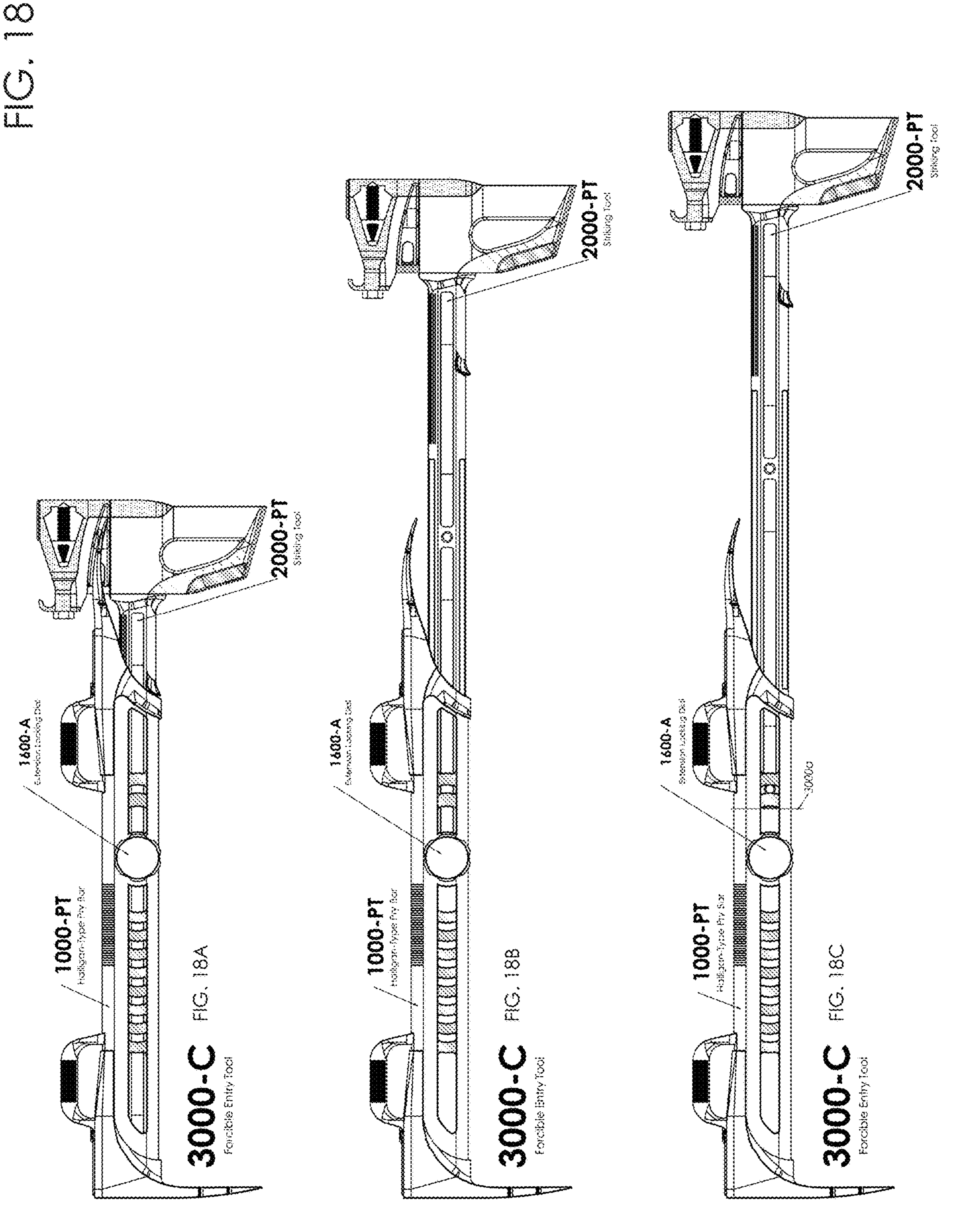

FIG. 18 illustrates a first arrangement of a forcible entry tool. FIG. 18A illustrates the forcible entry tool in a compact configuration, in which the two components can be locked or unlocked. FIG. 18B illustrates the forcible entry tool in a first extended configuration, in which the two components can be locked or unlocked. FIG. 18C illustrates the forcible entry tool in a second extended configuration in which a striking tool handle does not reach an extension locking mechanism.

Figure 19:
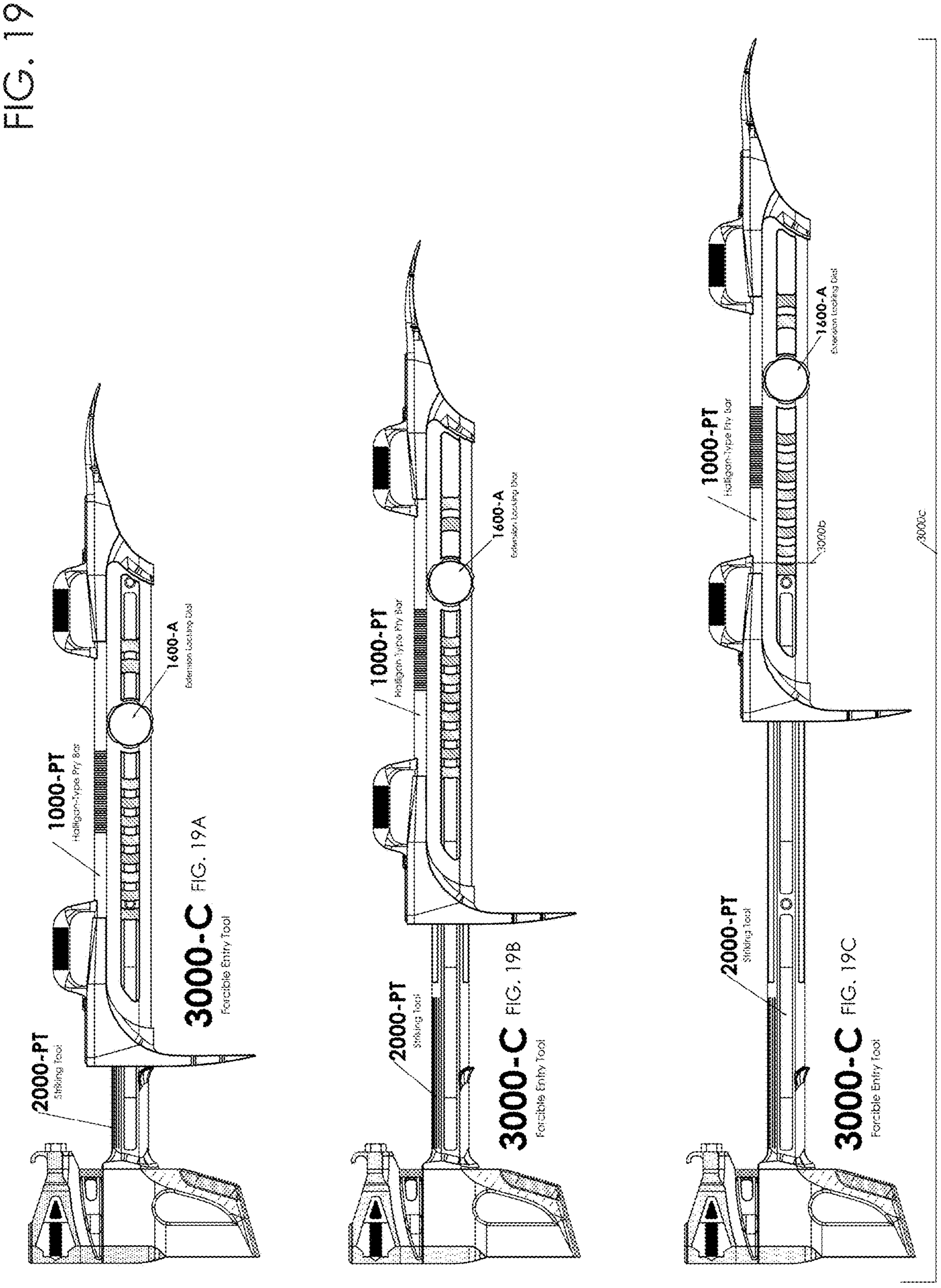

FIG. 19 illustrates a second arrangement of a forcible entry tool. FIG. 19A illustrates the forcible entry tool in a compact configuration. FIG. 19B illustrates the forcible entry tool in a first extended configuration, in which the two components can be locked or unlocked. FIG. 19C illustrates the forcible entry tool in a second extended configuration in which a striking tool handle does not reach an extension locking mechanism.

Figures 20, 20A, 20B:
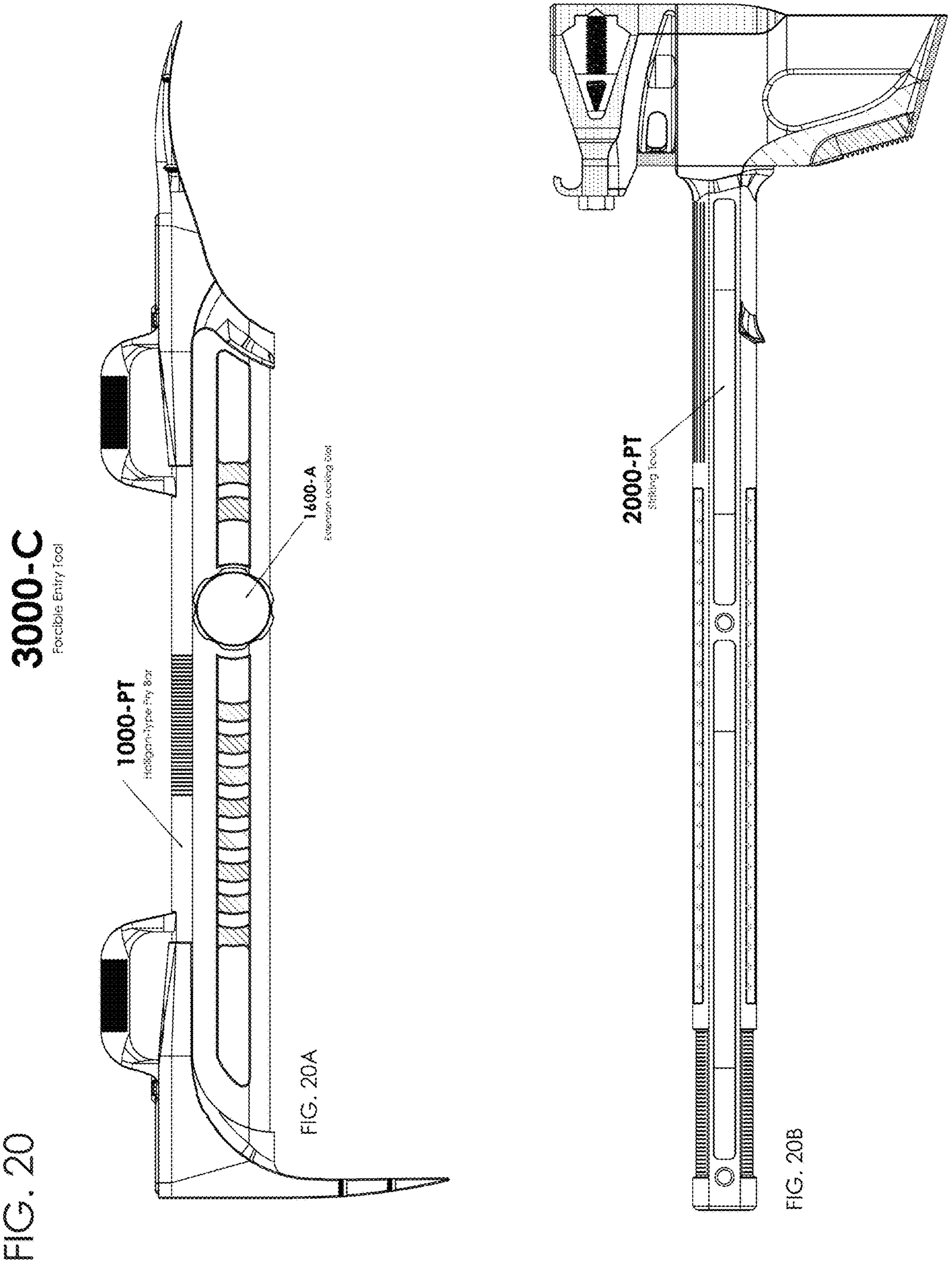

FIG. 20 illustrates the components of a forcible entry tool in an arrangement where each component is separated from the other. FIG. 20A illustrates a first component. FIG. 20B illustrates a second component.

Figure 21A:
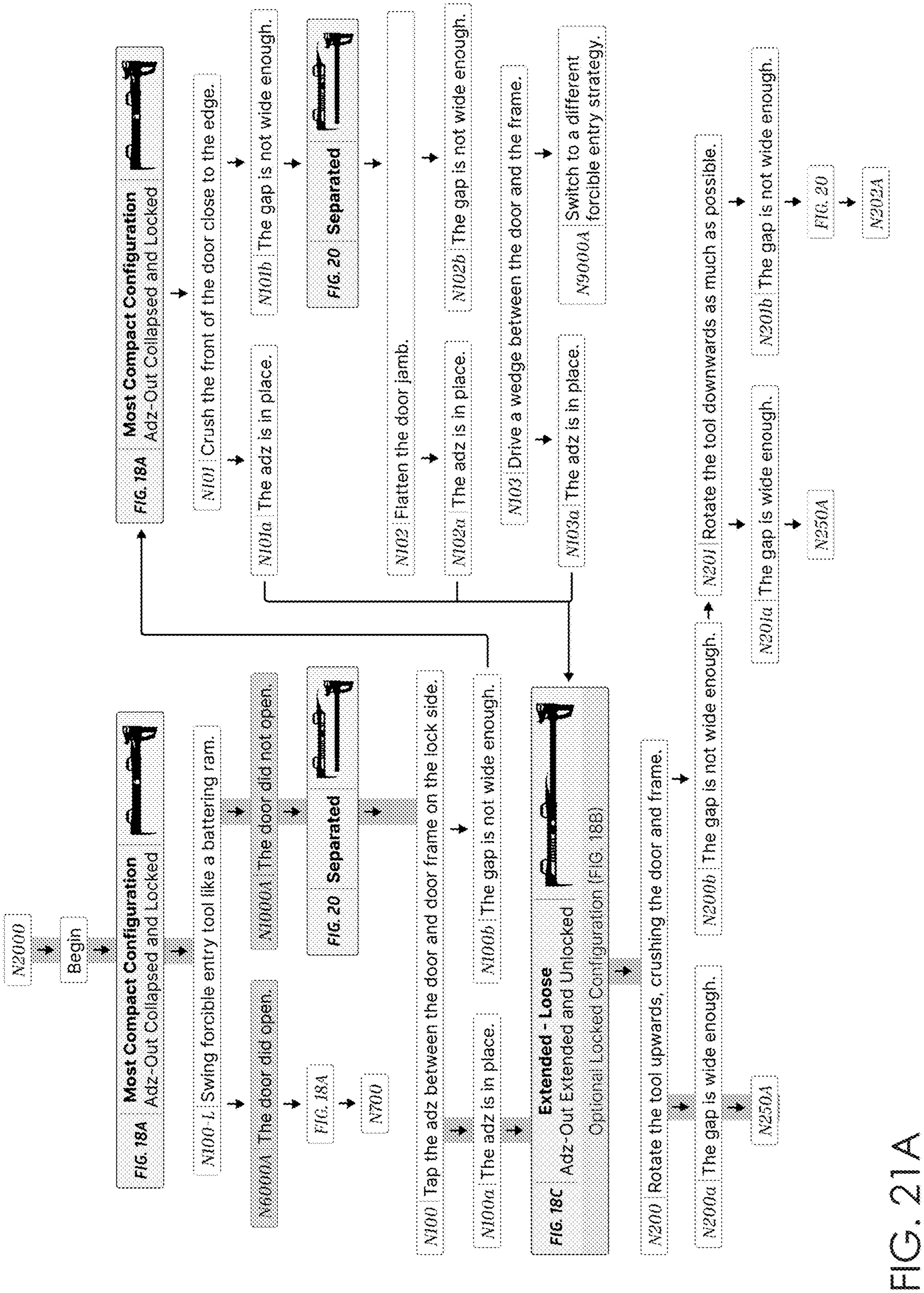
Figure 21B:
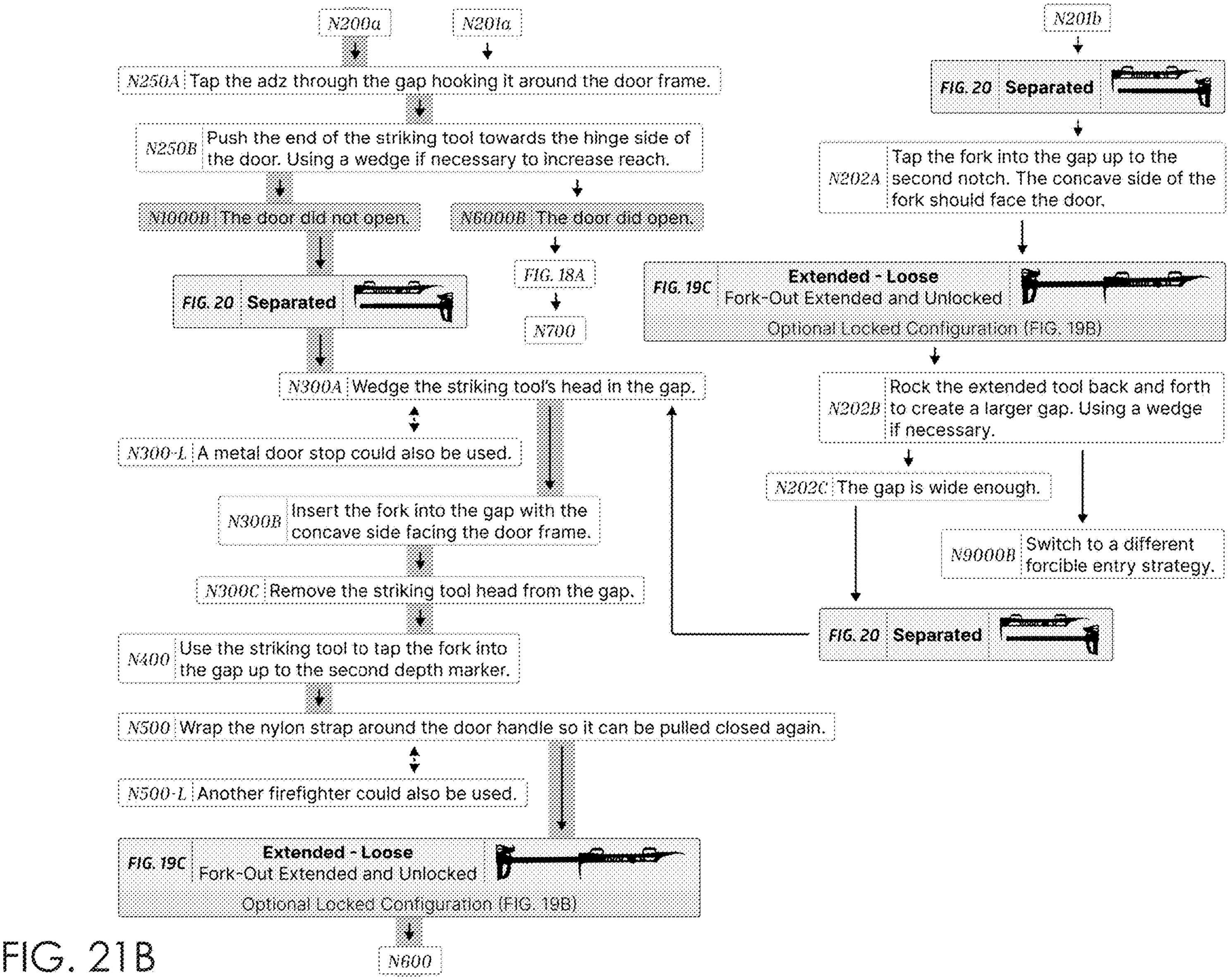
Figure 21C:
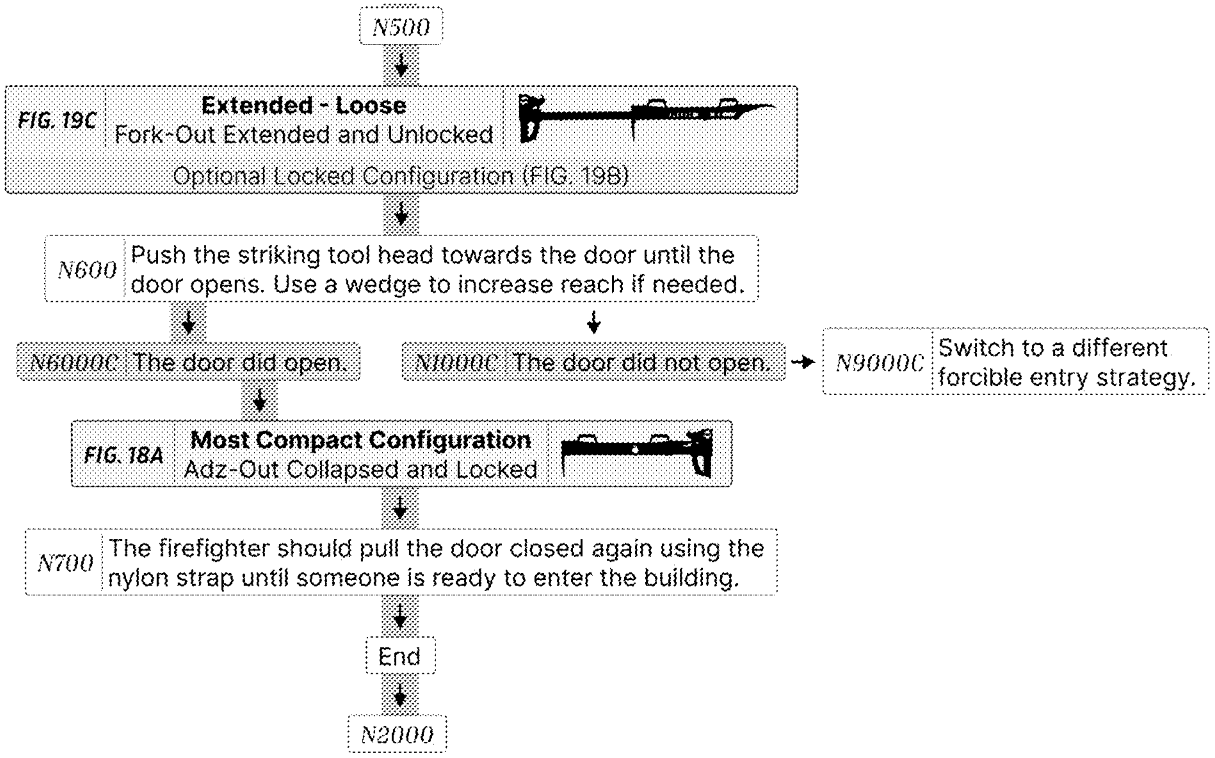

FIGS. 21A, 21B, and 21C provide a flow chart describing a method of using a forcible entry tool as disclosed herein to obtain access through an inwardly opening door.

Figure 22A:
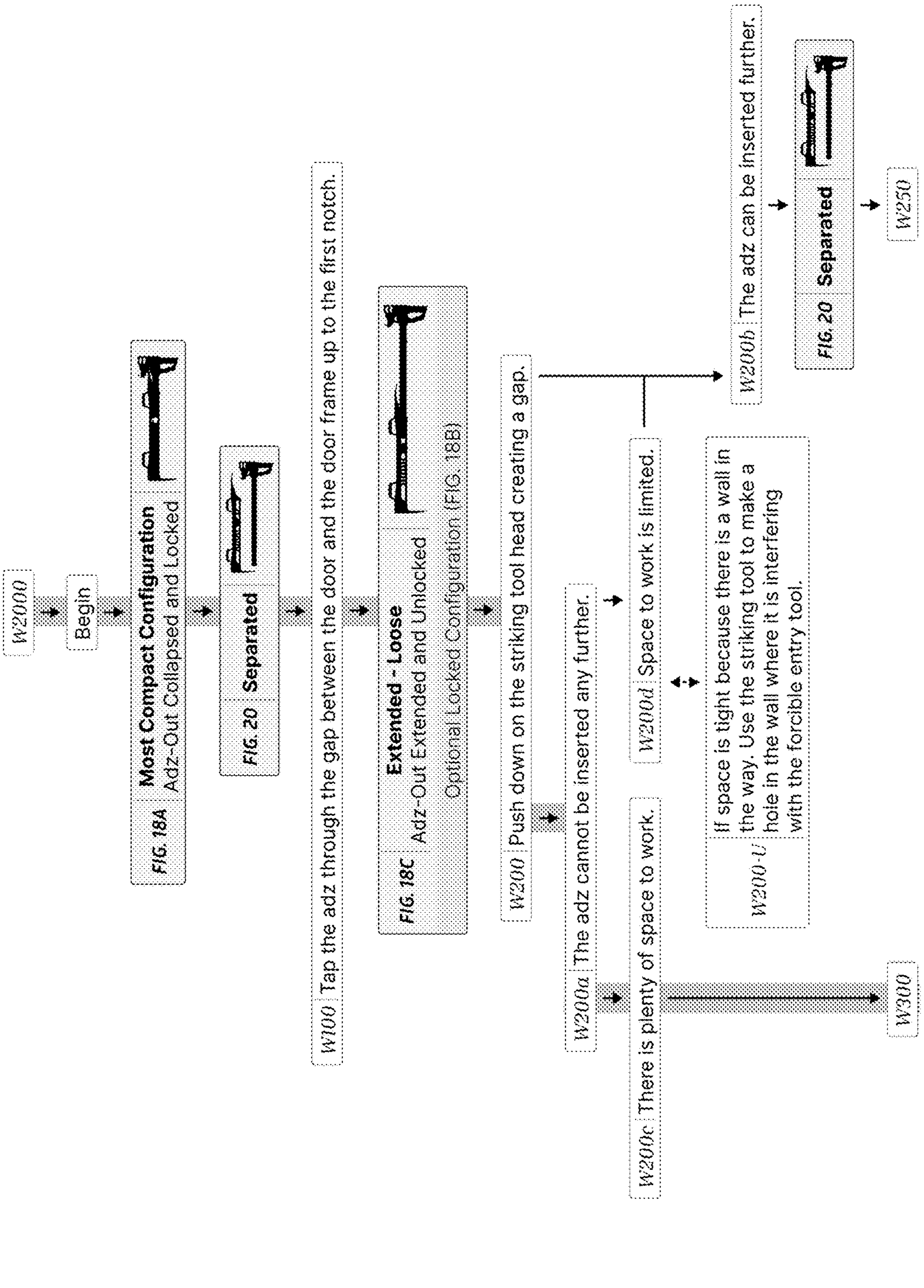
Figure 22B:
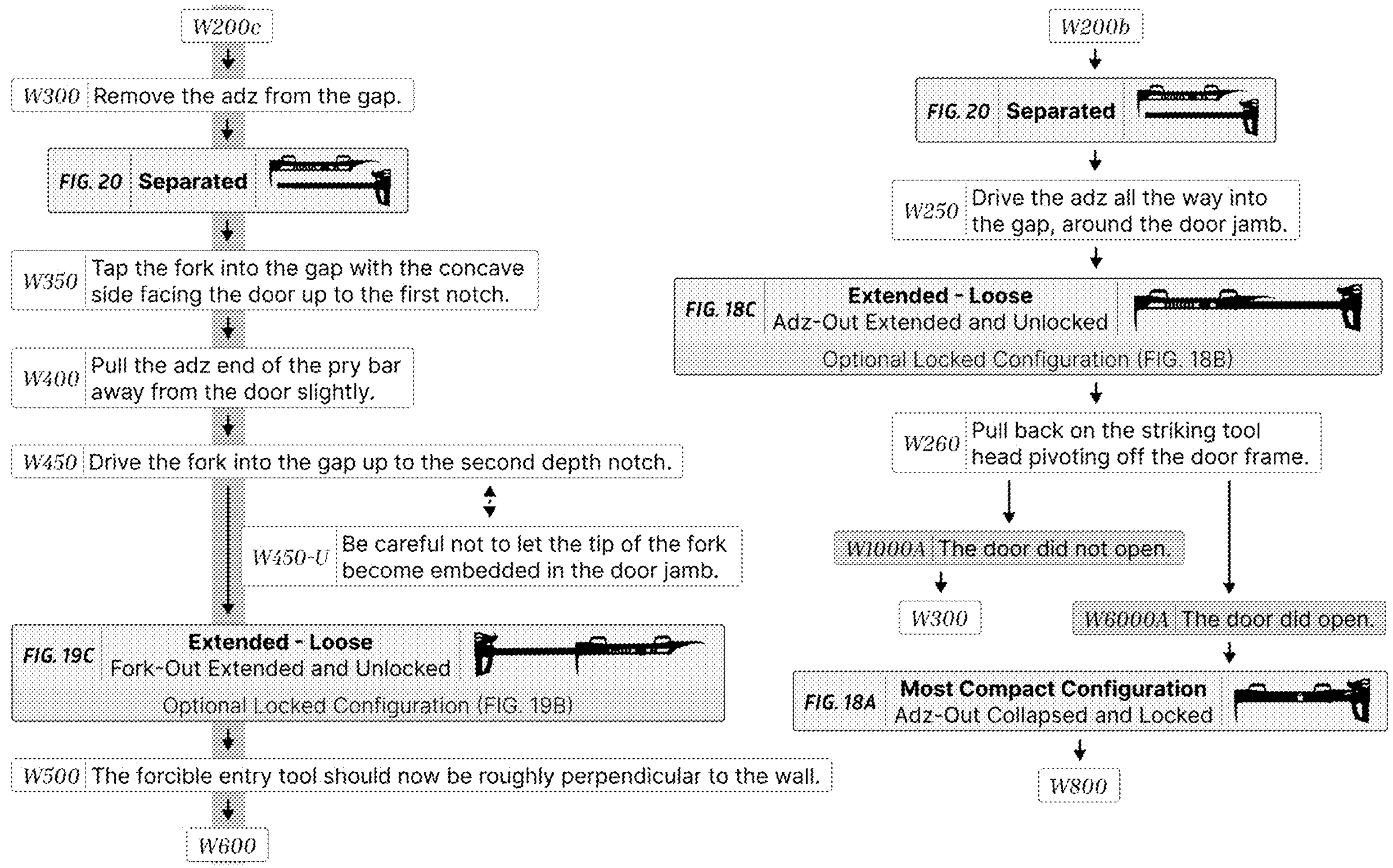
Figure 22C:
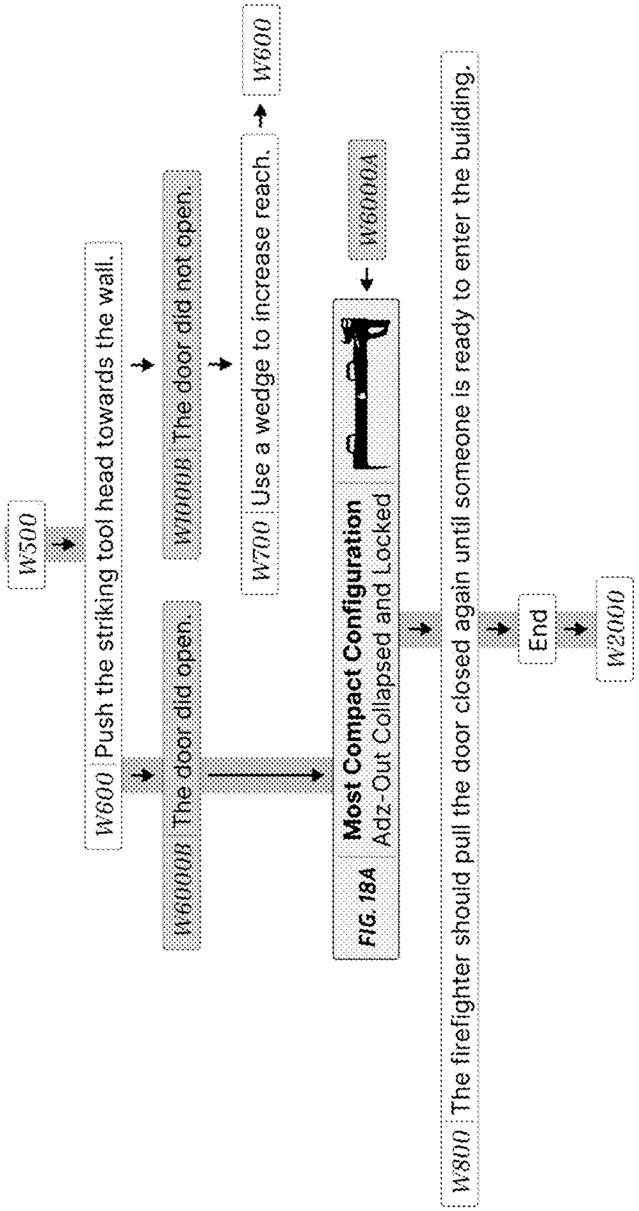

FIGS. 22A, 22B, and 22C provide a flow chart describing a method for using a forcible entry tool as disclosed herein to obtain access through an outwardly opening door.

DETAILED DESCRIPTION

A two-part multi-function forcible entry tool is disclosed herein and illustrated in FIGS. 1-20. The multi-function tool enables its user or users to gain access to any space they may need to access in order to complete their job. The multi-function tool possesses several capabilities, including, but not limited to: sliding together and locking into one compact package for transport and storage, partially sliding together to extend the tool's length for increased reach and leverage with the option to lock into this extended position, exerting a striking force by sliding a first component within a second component to strike the second component and drive one of the second component's tool implements 1700-IC into an object, and lastly, each component can be separated and used as two separate tools. Further, when locked into the extended position, the first component and the second component can be used for a variety of overhaul purposes. For example, if a user needs to reach a point out of his or her reach, the extended composite shaft can provide the necessary extension to reach the point (e.g., above his or her head, or into or through a wall). In another example, the extended composite shaft can be used to hold elevator doors open, providing a larger opening than either component alone would be capable of maintaining. Exact locations of one part relative to another in the following figures may be described using adjectives commonly used to describe anatomic positions, in which the Halligan-type pry bar 1000-PT is considered the chest of a body and the position of the grip handles 52 is considered the front or anterior.

FIG. 23 explains the hierarchy of the labeling system used to label the parts and details inside each of the two components 3000-C, discussed in further detail below. Flowing linearly from left to right with a few exceptions for secondary options, FIG. 18 illustrates an example hierarchy of parts which begins with the tool itself and ends with a repeated detail. The hierarchy of the labels is as follows; the forcible entry tool 3000-C, the two components, each of the implements designed to attach to the ends of the components organized into categories, large assemblies, sub-assemblies, parts which could also be hardware, modified hardware or an alternate embodiment of that part, a feature inside that part or a section of the part, a specific detail or element of the part and finally an external or repeated detail. Details could also be labeled to describe whole assemblies or sub-assemblies, in addition to specific parts and features. One such example of this labeling system could be; an alignment slot 1104*u* is a detail on the feature a mechanism mounting base F1-104 on the pry bar 101 part which is included in the pry tool bar 1100-A assembly on the Halligan-type pry bar 1000-PT which makes up half of the forcible entry tool 3000-C.

FIG. 24 is a figure explaining the difference between several different label types used to denote three different kinds of parts for purposes of manufacture. The first type is a normal part; a unique piece designed to function on its own or as a part of a whole. A normal part is manufactured in-house and cannot be purchased in any store. An example of a part could be a plate with a unique shape and material.

Purchased hardware is a second type of part. For example, a piece of purchased hardware is an object with a standardized design designed to hold two parts together or move between a series of different hardware parts that can be purchased in most stores. These pieces of hardware are used in an assembly without any modification.

A third type of part is a modified purchased hardware part. For example, a fastener with a standardized design that has been modified in-house to create a unique part or to serve a unique purpose.

Many of the parts in the disclosed forcible entry tool 3000-C are broken down further into features or sections. A feature is a portion of a part. It functions as its own part but shares part of its construction and design with another larger part. A feature is a part within a part, not to be confused with a detail which is a single element within a part. A section of a part is an area of a part whose function is tied to the part as a whole and not to itself. For example, one section of a part serves as a wedge, while another section serves as a striking surface to help force the wedge between two objects, while another section of the part allows the part to be mounted to a handle. Together, these three part sections make up a prying tool.

Lastly, FIG. 24 explains differences between a detail and an external detail. A detail is a single element inside of an assembly, sub-assembly, part or feature whose attributes add to or contributes to an important function of the part or assembly as a whole. An example of a detail could be the specific shape of a recession on a part that allows another part to fit perfectly inside. An external detail is a detail that exists on one part and is repeated exactly on another part, essentially, a universal detail. One such example, could be a series of depth markers shared between two parts in the same way. Instead of assigning each implementation of the detail a unique label it has the same label as the first recorded appearance in a drawing of that particular element.

Figure 1:
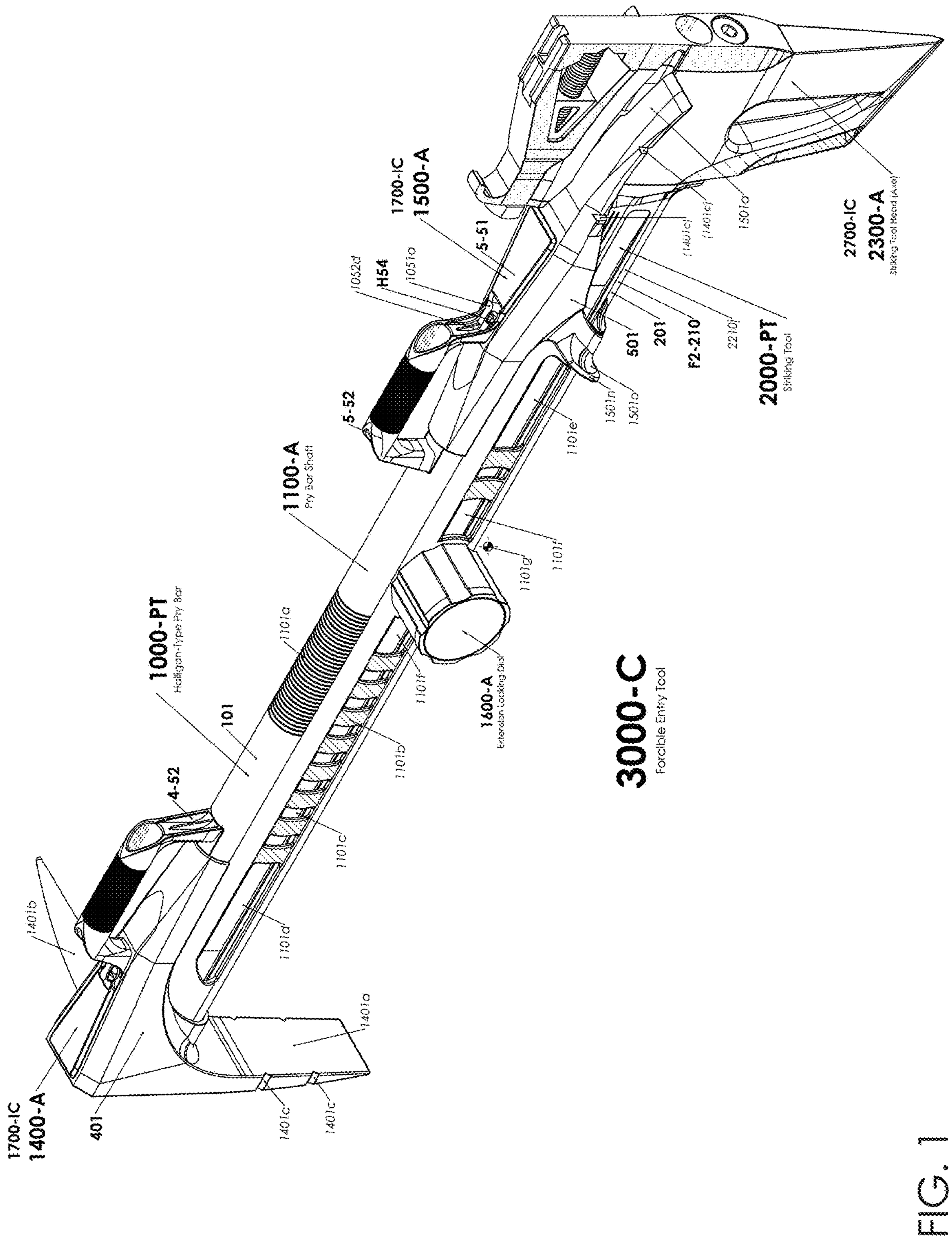
FIG. 1 is a perspective view of a preferred embodiment of a forcible entry tool having inner and outer shafts and associated tools of the forcible entry tool married together in a retracted, compact configuration for easy transport and storage.

FIG. 1 is a perspective view of an exemplary embodiment of a forcible entry tool 3000-C which is made up of a Halligan-type pry bar 1000-PT and a striking tool 2000-PT and associated tools of the forcible entry tool married together in their most compact configuration for easy transport and storage. The striking tool 2000-PT has a shaft 201 that can be received inside a shaft 1100-A of the pry bar 1000-PT, such that the two may be combined in the configuration shown in FIG. 1. As illustrated in FIG. 1A, a mark 1101*g* illustrates the center of gravity for this embodiment when the forcible entry tool 3000-C is in the illustrated retracted position. The handle 5-52 is advantageously located proximate to the center of gravity 1101*g* of the forcible entry tool 3000-C. This handle position balances the tool in a position that is more horizontal than vertical, such that a firefighter can easily carry the tool using a single hand. A vertical carry position is disadvantageous because the tool is prone to drag on the ground or catch on stairs or other obstructions Each part of the forcible entry tool 3000-C may be manufactured using traditional techniques. In various embodiments, each part may be manufactured using 3-D manufacturing techniques and casting processes, including but not limited to, investment casting, or lost PLA (in which a polylactic acid part is used to form a mold). In other embodiments, any combination of other manufacturing processes may be combined or conducted separately with the casting processes including, molding, forming, machining, composite manufacturing, 3-D printing technologies such as stereolithography, and any other method of manufacturing. In at least one embodiment, parts made from metal or composites may be treated to improve their material properties during the manufacturing process.

In this illustrative embodiment, the forcible entry tool 3000-C is made up of an inner shaft to be referred to herein as the striking tool 2000-PT, and the outer shaft which will be referred to as a Halligan-type pry bar 1000-PT. FIG. 1 depicts the tool 3000-C in its most compact configuration and highlights key details on the Halligan-type pry bar 1000-PT which are most relevant when the tool 3000-C is in the illustrated configuration.

In this example, a Halligan-type pry bar is comprised of a pry bar shaft 1100-A which serves as the base for a pair of various implements 1700-IC. In some embodiments, these implements 1700-IC may connect to the pry bar shaft 1100-A or be a synergistic singular element consisting of both the pry bar shaft 1100-A and the implements 1700-IC. In a preferred embodiment of the tool, the implements 1700-IC are an adz assembly 1400-A which may also be referred to as pry tool A or as an adz (further illustrated in FIGS. 5-7), and a fork assembly 1500-A, which may also be referred to as pry tool B (further illustrated in FIGS. 8-10). In various embodiments, adz 1400-A is positioned at the caudal end of the forcible entry tool 3000-C, while the fork assembly 1500-A is positioned at the proximal end of the forcible entry tool 3000-C. In each embodiment, like the relationship between the implements 1700-IC and the pry bar shaft 1100-A the individual parts of the implements 1700-IC may be connected to each other as an assembly or each implement 1700-IC could be a singular component by itself and not be comprised of any additional parts beyond what may be needed to secure it to the pry bar shaft 1100-A.

Additionally, the forcible entry tool has an extension locking mechanism 1600-A which is positioned proximal to the fork assembly 1500-A on a lateral side of the pry bar shaft 1100-A. In operation, the extension locking mechanism 1600-A holds the inner and outer shafts of the forcible entry tool 3000-C together in various configurations. In this preferred embodiment, the extension locking mechanism 1600-A is a dial which must be rotated to secure or release inner and outer shafts.

In this preferred embodiment, both implements 1700-IC share common parts that attach to a base part which carries the majority of the implement's functionality. These common parts use the sequential two-digit element numbers 51 through 63. These numbers may be prefaced with another number separated by a dash that signifies the information regarding that part is unique to that part as well as its relationship to that assembly. FIG. 1 highlights two common parts, the first of which is a grip and swing handle 52. In operation, these handles may be used for transporting the tool, positioning the implements 1700-IC between objects, a grip for prying, or to swing the forcible entry tool 3000-C, in the illustrated configuration, as a battering ram. The tool 3000-C is tuned so that its center of gravity 1101*g* is positioned close to the handle 5-52 on the fork assembly 1500-A allowing the user to carry the forcible entry tool 3000-C around their work area with one hand. Hardened striking plates 51 are also included on each of the implements 1700-IC. These striking plates 51 can still be used even when the tool 3000-C is in its most compact configuration; for example, when a heavier striking tool is needed or a hydraulic spreader is required to create a large enough gap, the tool 3000-C can be used without having to separate the two components first. The striking plates 51 and the grip handles 52 slightly overlap each other on top of their implements 1700-IC. The proximal end of each striking plate 51 covers the flat bottom part of the distal arm on each of the grip handles 52. This bridged portion 1051*a* of the striking plate 51 covers the exposed head of a tall binding post 1154 protecting the Philips head from being hit and deforming. The proximal end of the bridge is secured in place by fitting over an alignment fin 1052*d* built into the grip handle 52, the way in which the two pieces fit together will be explained in greater detail later in the description. The alignment fin 1052*d* serves two key purposes, the first is serving as an alignment key, as previously discussed, which may also help to protect portion of the striking plate from significant deformities after repeated use. The alignment fin's 1052*d* second purpose is to reinforce both vertical sections 52-S2 of the handles 52.

In this illustrative embodiment, the pry bar shaft 1100-A serves as the metaphorical paracord that ties the remaining parts and components together. A grip texture 1101*a* may be added to the top of the shaft 1100-A over the fully assembled pry bar's 1000-PT center of gravity to suggest where the user should hold the bar 1000-PT with one hand to make it easier to position one of the implements 1700-IC because the tool feels balanced. In some examples, a pattern of grooves is cut across the bar in this location to prevent the user's hand from sliding along the shaft, suggest balance, and to serve as the grip aid 1101*a*.

In some examples, a series of ribs 1101*b* may be cut into each of the lateral sides of the shaft 1100-A on either side of the extension locking mechanism 1600-A. In some examples, these ribs could vary in size and have any shape ranging from vertical strips to hexagons. In a preferred embodiment of the tool, each of the ribs are the same size. In operation, these ribs allow the user to see the inner shaft 2000-PT as it slides through the pry tool 1000-PT helping them line up the two components to lock them in position and to reduce the component's 1000-PT weight. Each rib's spacing 1101*c* from one rib to another is identical, except for the first gap 1101*f* on either side of the extension locking mechanism 1600-A in some embodiments. In many examples, the large cutouts 1101*d* and 1101*e* in the pry bar shaft 1000-A under the adz assembly 1400-A and the fork assembly 1500-A respectively are intended to be a handle large enough for someone wearing thick gloves to easily be able to grip the pry bar 1000-PT from the anterior or the posterior. A preferred embodiment of the tool uses a larger amount of space in the first gap 1101*f* between either side of the extension locking mechanism 1600-A and the first rib to further reduce the amount of effort it takes for the user to lock the two components 3000-C together. Additionally, the increased rib spacing 1101*f* may make it easier to keep the mechanism clean.

In a preferred embodiment of the forcible entry tool 3000-C, the adz assembly 1400-A attaches to the caudal end of the pry bar shaft 1100-A using hardware and possibly a structural adhesive which requires heat or exposure to a specific chemical to release to increase the strength of the bond between the two parts. An adz with a pike body 401 make up the base of the adz assembly 1400-A the adz and pike body 401 is made up of an adz 401-S2, plus a body 401-S1 and a mounting base 401-S3, both discussed in detail below. The flat wedge portion 1401*a* of the adz 401 has a long reach to help the instrument 401-S2 gain a strong foothold on the frame of a door or another object. At the tip, the adz 401-S2 is thin and then grows to be thick enough to pry with without being too thick that it takes too much time to drive it sufficiently deep enough between the two objects. Additionally, the pike 1401*b* is positioned close to the back face so it can be used as an anchor in addition to being used as another prying or spreading tool. In several examples illustrated in FIGS. 5-7, on both lateral sides of the adz 401 depth markers may be added in the form of two sets of triangularly shaped grooves at specific distances from the tip of the adz according to firefighting best practices, these depth marker grooves 1401*c* may also appear on any other of the other implements 1700-IC with their locations being based off of the same measurements. In a preferred embodiment, the first depth groove 1401*c* is 1¾ inches proximal from the tip of the adz 401 or another prying tool. In operation, this distance is the most common thickness of doors. Once rescue personnel see they are approaching this notch as they are driving the pry tool between the wall and the frame, they should start to work their pry tool around the doorjamb. When they are trying to force open outward swinging doors, this first depth notch 1401*c* can help to speed up rescue operations and prevent unnecessary damage to the door and jamb. In many embodiments, the second depth notch 1401*c* is 3¾ inches proximal from the tip of the pry tool. When in operation in several embodiments, when this depth notch 1401*c* lines up with the beginning of the door jamb and it informs emergency services personnel the tool has been driven far enough between the door and the frame to begin prying the inward opening door open.

In the forcible entry tool 3000-C shown in in FIG. 1, the fork assembly attaches to the cephalic end of the pry bar shaft 1100-A. A fork body 501 makes up the base of the fork assembly 1500-A. The tines 1501*a* of the fork 501 have the depth markers 1401*c* on their lateral sides. The cuts to create the marks and their spacing are all identical to those on the adz 401. Like the opposite implement 1700-IC, hardware is used to secure the fork assembly 1500-A to the shaft 1100-A. In some examples, structural adhesive which could require some combination of heat or exposure to a specific chemical to release from the pry bar shaft 1100-A to increase the strength of the bond between the two parts. In various embodiments, the fork body 501 is made up of two wide and slightly curved tines 501-S2, plus a body 501-S1 and a mounting base 501-S3 both of which will be discussed in greater detail later. In the illustrated embodiment, the fork's 501 tines 1501*a* decrease in thickness as the overall width of the tine 1501*a* increases as they move away from the main body. Additionally, the ends of each of the tines 1501*a* converge into a dull edge. In many embodiments, the bottom of the fork 501 is home to a lower striking surface 1501*n* the backside of which, distal to the pry bar shaft 1100-A, is a large fillet 1501*o* this fillet increases the strength of the wings which create the striking surface and blends them with the rest of the tool mounting body. In its operation, the fillet 1501*o* also frames one of the grip aids F2-210 on the handle's shaft 201. Which makes it more comfortable for the user to hold the forcible entry tool 3000-C in this configuration from the bottom of the tool 3000-C by the forward grip area 2210*j* on the exposed portion of the striking tool's shaft 201.

In some embodiments, the implements, such as the pry fork 501 and adz 401 may be made of multiple pieces secured together, and then secured to the pry bar shaft 1100-A. In another embodiment, the pry fork 501 and adz 401, may be cast together and then attached to the pry bar shaft 1100-A.

The pictured configuration of tool 3000-C is intended to be used for transporting the tool 3000-C and using the tool 3000-C as a battering ram. When the tool 3000-C is in this configuration it can be compact enough to store in a compartment on a fire truck of any size or mounted inside the cabin. Ideally, this tool 3000-C would be used in a smaller rapid response vehicle designed to be faster and more maneuverable than the standard fire apparatus. This allows the vehicle to be first on scene, so the crew may complete an initial assessment, gain access to the structure, and prepare a water source before any other emergency response vehicles arrive on scene. For many interior doors and lightweight exterior doors, the forcible entry tool 3000-C can be swung like a battering ram using both grip handles 52 and the back of the adz 401 to force open some doors faster.

One advantage of the multi-tool 3000-C is that the two tools can slide relative to each other while unlocked, allowing the ax handle 201 to slide freely within the outer shaft 101. In use, the weight of the tool 2000-PT can be used to drive the tool 1000-PT by pulling the axe handle 201 partially out of the outer shaft 101 and then slamming it back in like a slide hammer. Tines of the fork 501, for example, can be driven by the sudden impact of the slide stop f2-208 hitting the outer shaft 101 or the back of the adz 401.

FIG. 2 is a perspective view of the forcible entry tool 3000-C with components 1000-PT and 2000-PT separated into assemblies and subassemblies, some of which have been further exploded into individual parts. The forcible entry tool 3000-C can be separated into two major components; a striking tool 2000-PT, and a Halligan type-pry bar 1000-PT. The illustration is intended to communicate the basic construction of the tool 3000-C and the relationship between the two components and their subassemblies.

In FIG. 2, the pry bar 1000-PT is comprised of four separate subassemblies; the first of which is the pry bar shaft 1100-A which also serves as the base for which all the remaining assemblies attach to. On either side of the shaft 1100-A are mounts F1-103 for attaching the implements 1700-IC. In the illustrated embodiment, the pry fork assembly 1500-A on the right at the head of the pry bar 1100-A is considered to be the main or cephalic implement 1700-IC while the adz and pike assembly 1400-A on the left or tail side of the pry bar 1100-A is considered the secondary or caudal implement 1700-IC. Both of the implements 1700-IC are most commonly used for prying. Additionally, in the middle of the pry bar shaft 1100-A (measured from the pry bar's 1000-PT overall length) which includes both implements 1700-IC is an extension locking mechanism 1600-A which can hold the two components together in various positions.

In some examples, the pry bar 101 has two cutouts F1-103*a* and F1-103*b*, preferably rectangular in shape, on top of the bar beginning at each end and cutting into a solid portion of the bar 101 and under the surface continuing inside the inner bar for a distance. In many embodiments, these cutouts create a long slot which functions as a tool mount and allows an implement 1700-IC to slide in and be locked in place. FIG. 2 illustrates the mounting slot F1-103*b* for the fork assembly 1500-A and the mounting slot F1-103*a* for the adz assembly 1400-A, and the inner bar or solid portion is itself known as F1-103 (illustrated in FIG. 17A).

In the illustrated device, each of the implements 1700-IC require partial assembly before being attached to the pry bar 1100-A. Both the fork assembly 1500-A and the adz assembly 1400-A are attached in substantially the same way. The assemblies of each implement 1700-IC and their parts are illustrated and labeled in FIGS. 3-10 and discussed below.

A mechanism mounting base F1-104 (detailed in FIG. 17D) is disposed on one of the lateral faces of pry bar shaft 1100-A. The mounting base F1-104 may be positioned slightly off center on both the relative X and Y axis. Opposite the mechanism mounting base F1-104, is a name plaque 102 which fits over a hole on the side of the hollow portion 101-S1 of the shaft 1100-A which could be either circular or hexagonal in shape. As illustrated, the mechanism mounting base F1-104 provides the necessary connection points to allow the extension locking mechanism to attach to the shaft 1100-A. In a preferred embodiment, the extension locking mechanism 1600-A comes in the form of a dial, such that the user turns the dial in one direction to lock the composite shaft in an extended position, and another direction release the two components 3000-C. In this embodiment, the dial requires no more than a half turn to fully lock or release the two components 3000-C. In the illustrated tool, the extension locking mechanism assembly 1600-A is made up of another assembly and a subassembly. FIG. 2 provides an exploded view of the extension locking mechanism assembly 1600-A, which is also illustrated and labeled in greater detail in FIG. 14-17 and discussed below.

As shown in FIG. 2, the second component of the forcible entry tool 3000-C is the striking tool 2000-PT. In a preferred embodiment, the striking tool 2000-PT features a multi-function ax head 2300-A as the implement 2700-IC affixed to the end of the handle 2200-A. The striking tool 2000-PT is made up of two assemblies: a striking tool handle 2200-A and a striking tool head 2300-A, which is also called the ax head. The striking tool head 2300-A is designed to slide over the striking tool handle 2200-A and then be secured in place by an ax head bolt 3-1158. The striking tool as a whole, as well as its individual assemblies and parts will be discussed in greater detail later in the detailed description.

The handle 2200-A includes a handle body 201, which further includes a hand-grip portion F2-201 The handle body 201 further includes a hand rest F2-203, a handle to implement head transition F2-204, an implement back stop F2-205, an implement stabilizer F2-206, an implement bolt shaft F2-207, and a slide stop F2-208, all of which illustrated in and labeled in FIGS. 11-12 and discussed below.

An ax-head assembly 2300-A is mounted to the handle 2200-A by a bolt 3-1158 that threads into the bolt shaft F2-207. The ax head may additionally or alternatively be attached by means including but not limited to adhesive, press fit, or a pin running perpendicular to the bolt shaft F2-207. In a preferred embodiment of the forcible entry tool 3000-C this striking implement 2700-IC is a multifunction ax head assembly 2300-A. In this preferred embodiment, this assembly is made of an ax head 301, a hydrant tools bracket 302. A bolt 3-1161 is threaded into the wrench bracket 302 such that a fire hydrant valve or large fastener can be secured in the wrench 302. The bolt 3-1161 allows the wrench 302 to fit a substantially broad range of valves or fasteners, regardless of whether they possess four, five, or six-sides. The ax head assembly 2300-A and its parts are illustrated and labeled in FIG. 13 and discussed below.

Figure 3:
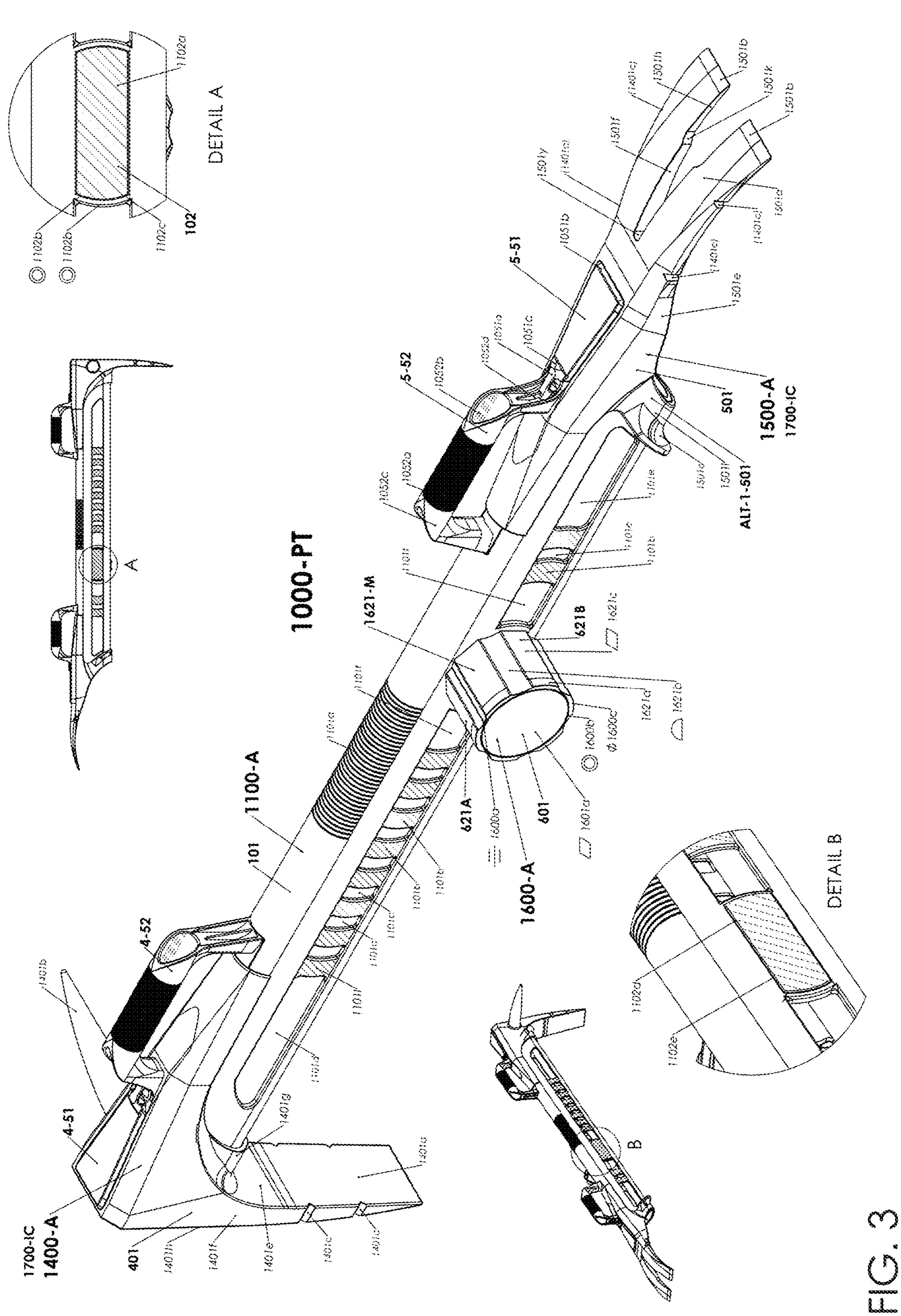
FIG. 3 is a perspective view of an outer shaft or Halligan-type pry bar, associated tools, and extension locking mechanism. Detail callouts and contextual views illustrate hidden parts and details.

FIG. 3 is a single perspective view with several detail cutouts and associated contextual views to illustrate hidden parts and details on a preferred embodiment of the Halligan-type pry bar 1000-PT which is comprised of an outer shaft or pry bar 1100-A, assembly 1400-A, fork assembly 1500-A, and extension locking mechanism 1600-A. Many of the details illustrated in FIG. 3 are also discussed above with respect to FIG. 1. Like labels in FIG. 3 refer to the parts described above and will not necessarily be described again here.

In some examples, the pry bar shaft 1100-A has a series of cutouts or ribs 1101*b* which may be used for a variety of things including; helping the user see the striking tool handle 2200-A or reducing weight. In a preferred embodiment, the ribs 1101*b* are set back a distance 1101*l* from the outside face of the outer bar 101 and the edges of each rib 1101*b* have been rounded over into a fillet to reduce the likelihood they will catch on clothing or other surfaces. In some examples, the distance each rib 1101*b* is recessed 1101*l* could be shallower or deeper than what is shown in this preferred embodiment and could even vary between each rib 1101*b* depending on the desired aesthetic, weight savings, or function. Additionally, the rib's 1101*b* recession 1101*l* could also protect their finish and allow them to be painted or covered in a reflective or luminescent material to make the tool 3000-C easier to find in dark environments. These ribs 1101*b* could be included on one or both sides of the outer bar 101. On one side of the outer bar 101 the extension locking mechanism 1600-A is attached, on the opposite side (directly across from the extension locking mechanism) 1600-A is an access hole 1101*aa*, and positioned inside and over the top of the hole 1101*aa* (which could be round or hexagonal in shape) is a name plaque 102 that may cover most of the available space on that side of the outer bar 101 between each set of ribs 1101*b*. The name plaque 102 illustrated in detail callouts A and B may be glued, fastened with exposed or hidden fasteners, or any combination of glue and fasteners. In a preferred embodiment the name plaque 102 is glued in place. Additionally, in detail callout A, the face of the name plaque 102 is completely flat 1102*a* and may be polished to a shine allowing room for the product logo to be printed or engraved on this surface. In some embodiments, extra finishes may be applied to the flat surface 1102*a* of the plaque 102 to preserve the logo or change the color of the engraved graphics. In this preferred embodiment and others, the name plaque's 102 lateral sides 1102*b* are concentric with the beginning of the first cutout 1101*f* of either side of the plaque 102. In some examples, the name plaque 102 may go right up to the beginning of the first cutout 1101*l* or stop short. Additionally, the top and bottom edges 1102*b* of the name plaque 102 may be colinear with the respective edges on the first cutout 1101*f* or they could stop short or extend beyond their respective edges on the cutouts 1101*f*. In a preferred embodiment, all four sides 1102*c* of the name plaque 102 stop just short of lining up with their respective lines on the first set of cutouts 1101*f*. In detail callout B, between each of these sides and the top face 1102*a* a small chamfer 1102*d* surrounds the face of the name plaque 102 for aesthetic reasons and to smooth the transition between the lateral face of the outer bar 101 and the plaque 102. Additionally, in many examples including a preferred embodiment, the name plaque 102 has a thin profile 1102*e* and does not stick out very far from the outer bar 101.

On the other side of the tool 3000-C from the name plaque 102 is the extension locking mechanism 1600-A. In many examples, the top of the mechanism 1600-A is covered by a top plate 601. In a preferred embodiment, the top plate 601 is flat 1601*a* to allow graphics or engravings to be added easily. In a preferred embodiment, the fit is engineered to be seamless and smooth between the two halves of the dial assembly 1621-M of the extension locking mechanism 1600-A. Only the smallest of seams 1600*a* is visible to user. Between the top plate 601 and the outside rim of the dial assembly 1621-M there is a small gap 1600*b* to allow for a flat head screwdriver to be able to slip inside to lift off the top plate 601 and access the inside of the cap. Additionally, the overall diameter 1600*c* of the assembly 1621-M is sufficient enough for someone wearing stiff and thick gloves to easily grip and turn.

In an illustrative embodiment, the adz assembly 1400-A sits at the caudal end of the pry bar shaft 1100-A, and, as previously mentioned, the adz 401 serves as the base in which all the remaining parts in the assembly attach to.

Figure 4:
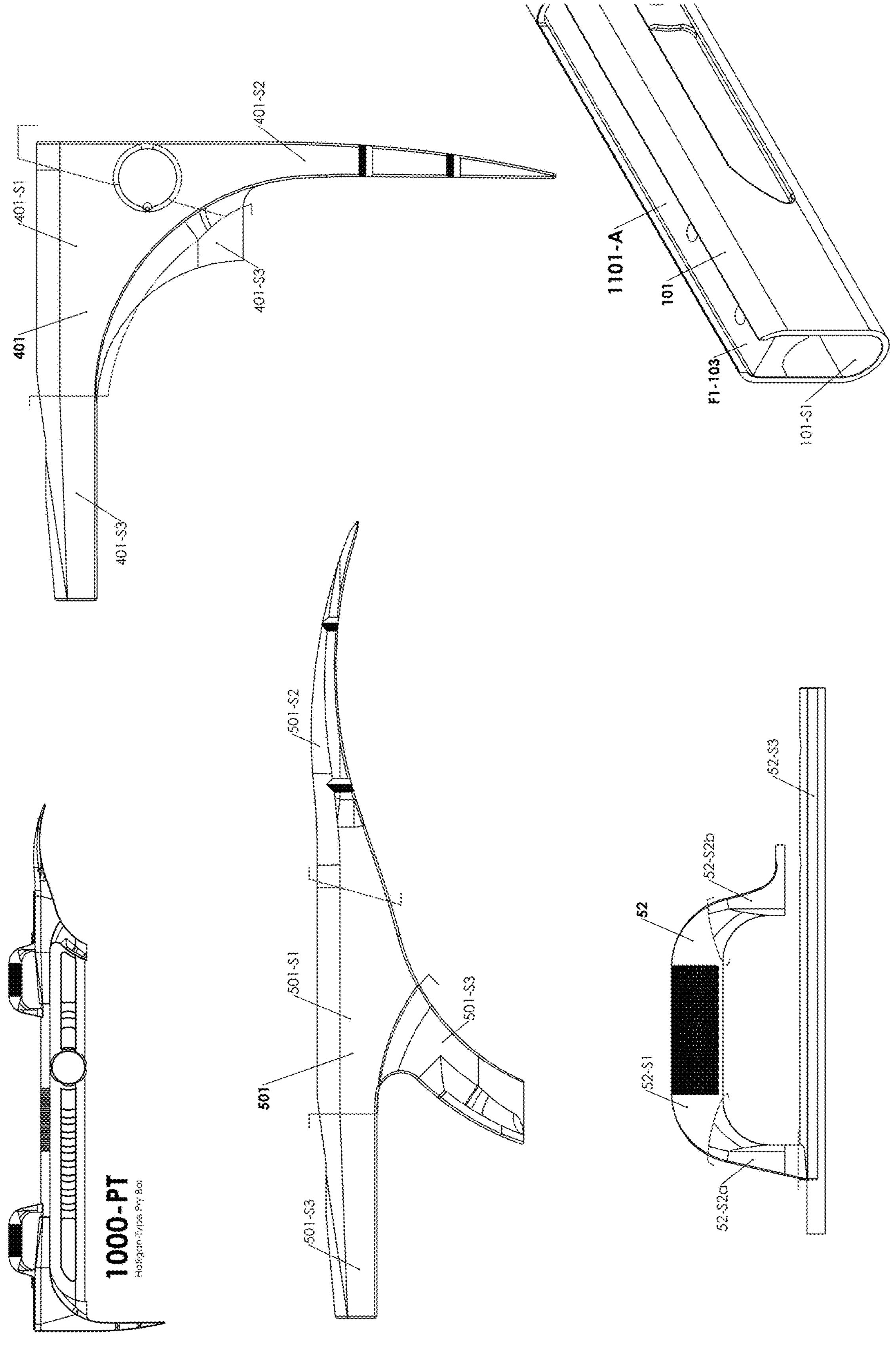
FIG. 4 is a series of right-side views and a perspective view of select parts in a Halligan-type pry bar.

FIG. 4 illustrates the adz body 401 and the fork body 501, and illustrates various sections of these two bodies. In a preferred embodiment, as illustrated in FIG. 4, the part of the tool mount section 401-S3 of the adz 401 surrounds 1401*g* the last few inches of the outer shaft to increase the tool's prying strength without risk of breaking (also illustrated in FIG. 6). Referring back to FIG. 3, The surround 1401*g* gradually transitions from the body 401-S1 of the adz 401 into the surround 1401*g* which is similar in thickness to the outer bar 101. Also, in this preferred embodiment, beginning in the tool mounting section 401-S3 of the adz is 401 at the surround 1401*g*. The area of transition between the surround 1401*g* and the actual adz 1401*a* is a thicker portion 1401*e* which can be used like a wedge when the lower portion adz 1401*a* is unable to lift an object enough to complete the operation. In operation, this wedge or transition area 1401*e* can be used to lift heavy objects off the ground by driving the adz under the object all the way up to the pry bar shaft 1100-A. If even more lift is needed, the striking tool 2000-PT can be used to elongate the tool creating enough leverage to tilt the tool 3000-C to the right rotating the adz assembly 1400-A onto its side and therefore lifting the object higher off the ground. In some examples, the back of the body of the adz 401 may have faces which are canted inward 1401*f* slightly to help prevent the body of the tool 401 from getting caught on an obstacle. In a few examples, the edges of the adz 401 between the lateral sides and the back face 1401*h* are rounded to prevent users from getting cut and to help prevent burs from developing.

In various examples, the fork assembly 1500-A is attached to the pry bar shaft 1100-A at its cephalic end. As discussed earlier, the fork body 501 serves as the base in which the remaining parts in the assembly attach to. In a preferred embodiment illustrated in FIG. 4, like on the adz 401, the lower portion of the fork body's 501 tool mount section 501-S3 wraps all the way around 1501*l* the outer shaft 101 to create a stronger and more stable connection. Although not clearly illustrated in this figure, the corresponding end of the outer shaft 101 is cut to match the profile of the fork body 501, which will be discussed later. Referring back to FIG. 3, the illustrated embodiment features the lower portion 1501*l* of the tool mount section 501-S3 of the fork body 501 incorporated into the rest of the fork 501 as a single body. In an alternate embodiment, pictured in FIG. 9, the two parts discussed above are separated ALT-1-501 for easier manufacturing. The portion of the fork body 501 that wrap around 1501*l* would be secured ALT-1-501 to the rest of the fork 501 using a combination of fasteners, adhesives or welding that would take up the space currently used as a profile transition and hand grip described by 1501*k* in FIG. 9A.

Referring again to FIG. 4, in many examples, on the body section 501-S1 of the fork 501 between the top of the tool mount section 501-S3 and the beginning of the instrument section 501-S2 the fork body 501 slightly narrows 1501*e* to help make the fork assembly 1500-A easier to twist when fully inserted between two objects. In other embodiments, the tips 1501*b* at the edge of the fork 501 tines flatten out to become a slightly dull edge. In alternate examples, the tines could gradually transition into round or flat points. In more alternate examples, the tips 1501*b* could be sharpened from a dull edge or point to become sharp. In a preferred embodiment, one requirement for the manufacture is the option for emergency services personnel to be able to sharpen the tips 1501*b* on the fork assembly 1500-A of their forcible entry tool 3000-C to a sharp edge or blade or any other modification they may find useful, given that the tool demands from one fireground or operating area to another may be different and difficult to predict. In several embodiments, between the fork tines 1501*b* is a large slot which is broken up into several sections.

In a preferred embodiment, the root of the slot 1501*y*, which is the bottom of the slot where two tines join, is rounded off as illustrated in FIG. 3 instead of coming to a point. Rounding the root of the slot 1501*y* advantageously avoids the tool 3000-C getting stuck on an object like rebar or from pinching the user's fingers. In an alternate example, the root of the slot 1501*y* may have impact driven metal sheers built into them. In operation, this would require the piece of metal that requires cutting to be placed between the tines and then the opposite end of the tool 3000-C is struck to drive the cutting surface into the metal, breaking it apart. In various examples, the narrowing portion of the slot 1501*f* above at the root 1501*y* helps the fork to grab onto smaller objects and break the shackles on padlocks. In many examples, the slot begins to widen 1501*k* after the narrowing portion 1501*f* of the slot. This transition area uses a large fillet to help the widest section 1501*h* grip objects. The widest portion of the slot 1501*h* is exactly wide enough to grab onto or get behind most door handles or knobs, and deadbolt assemblies or locking cylinders. The widened gap narrows slightly as it moves in from the tip of the tines to help the widened slot 1501*h* grip the lock hardware.

In operation, the pike 1401*b* portion of the adz assembly 1400-A is also suited for breaking open locks. To do so, the pike 1401*b* is inserted into the shackle as far as it can go and the side of the adz 1400-A opposite of the pike 1401*b* is struck with a striking tool driving the pike 1401*b* in further and further until the shackle or the lock body fails.

As illustrated in FIG. 3, a hardened striking plate 4-51 or 5-51 may be positioned at the top of each implement 1700-IC. In operation, the striking plate 5-51 of the fork assembly 1500-A mostly serves as a plate to protect the rest of the fork body 501 from damage when it is pushed against a fulcrum such as the striking tool's 2000-PT head 2300-A or handle 2200-A. As further illustrated in FIGS. 5, 7, 8, and 10, the striking plate 4-51 or 5-51 sits above its implement 1700-IC to protect it from impacts, and the transition is smoothed with a large chamfer 1051*b* to eliminate sharp corners. In several examples including a preferred embodiment, the bridge portion 1501*a* sits above the rest of the striking plate, the transition between the two parts is smoothed and strengthened using a series of fillets 1051*c*.

In the device illustrated in FIG. 3, the grip and swing handles 4-52 and 5-52 are positioned on top of each implement 1700-IC. In most examples, including a preferred embodiment, these handles 4-52 and 5-52 are identical. While details are only labeled on the grip handle 5-52 of the fork assembly 1500-A, the information applies to both handles 4-52 and 5-52. In many embodiments, the handles 4-52 and 5-52 feature a grip aid 1052*a* which could be integrated into the handle 52 itself in the form of knurling or a pattern of grooves. Alternatively, this grip aid 1052*a* could be added as an additional process such as a wrap with paracord, leather, another similar material or textured paint. In a preferred embodiment, the grip aid 1052*a* comes in the form of a fine-toothed knurling. In yet more examples, the inside of the handle 52 could be hollow 1052*b* to save weight. In a preferred embodiment, the handle 52 is hollow all the way through, but alternative embodiments may require the handle to only be partially hollow with one or both ends partially or completely obstructed to make room for fasteners or mounting brackets. In some embodiments, these additional brackets or hardware may be used to separate the grip handle 52 into two pieces; speculatively, these two pieces could be the handle with both its legs and then the horizontal portion 52-S3 of the grip handle 52 designed to slide into the tool mount F1-103 on the pry bar shaft 1100-A. The handle's 52 grip area 52-S1 has a large enough diameter 1052*c* to allow the handle 52 to be easily gripped by someone wearing thick gloves.

FIG. 5 contains multiple views of the adz assembly 1400-A which is one of the implements 1700-IC affixed to the pry bar 1000-PT in a preferred embodiment. Certain components of the adz head 401 are illustrated in FIG. 6, and certain components of the adz assembly 1400-A are further illustrated in FIG. 7.

FIG. 5A is a main perspective view of the complete adz assembly 1400-A. FIG. 5B is a secondary perspective view illustrating the backside of the adz 401-S2 (as labeled in FIG. 4) while affixed to the shaft 101 and focuses on the pass-through for the striking tool handle 2200-A and small details on the grip handle 4-52. Detail callouts F and G illustrate hidden parts and details. FIG. 5C is a secondary top-down view illustrating the size and shape of the pike 1401*b* as well as the relative size of the hardened striking plate 51 on the adz's body 401-S1 (as labeled in FIG. 4).

In the embodiment depicted in FIG. 5A and FIG. 6, the opening 1401*p* on the lower portion of the adz's tool mount 401-S3 fits snugly over the pry bar assembly 1100-A without allowing the bar 1100-A to slide completely through the adz 1400-A. In preferred embodiments, this tunnel may be smooth, textured from the casting or machining process, or have fluting cut into the sides to allow room for adhesive to flow and expand. In some embodiments, the transition between the lower portion of the adz's tool mount 401-S3 (labeled as 1401*g* in FIG. 6) and the adz tool 401-S2 (labeled as 1401*d* in FIG. 6) is smoothed by an oversized fillet or chamfer 1401*q* to help streamline the intended investment casting to CNC machining manufacturing process. In FIG. 5B the opening 1401*o* on the back of the adz 401-S2 (as labeled in FIG. 4) is meant to receive the striking tool handle 2200-A and work in conjunction with the opening on the opposite side to allow the striking tool 2000-PT to slide into the pry bar 1000-PT from either side. In this preferred embodiment, the backside of the adz 401-S2 tip curves inward 1401*n* to a point that is almost sharp allowing the adz 401-S2 to be easily wedged between objects. This portion of the adz typically will not be painted because it would wear away too quickly to be worthwhile. In some examples, the tip 1401*n* of the adz 401-S2 may also be fluted to decrease surface friction and make it easier to drive the tool into a gap. These channels could also be made deeper, wider and longer to work with a series of mini fins or a disruptor at the very tip of the adz 401-S2 to allow for a stream of water to be sprayed on the adz 401-S2. Doing so would redirect most of the water along the length of the tool and through the gap the adz 401-S2 created in the structure to transport the water to the fire. This function could be especially useful for rapid response teams and preventing flashovers, particularly in commercial buildings where doors can be much harder to force open. Ordinarily, this function typically requires extra expensive equipment such as a piercing nozzle, a Hydrovent™ attachment (believed to be sold by Hydrovent LLC, 1014 Wheatland Dr., Crystal Lake, Illinois 60014), or a Pyrolance™ (sold by PyroUHP LLC, 7731 SE 59th Court, Unit 100, Ocala, Florida 34472).

As depicted in FIG. 5C, in a preferred embodiment, the pike's 1401*b* upper profile curve 1401*m* has a sharper radius than its lower profile curve 1401*j*. Initially the pike 1401*b* extends straight out before curving steeply down into the middle section and straightening out at the end. The lower profile curve 1401*j* is mostly straight roughly until the last third in which it curves down slightly. This curvature makes it easier to pry with the pike 1401*b*, however, some examples of the adz 401 could include a pike 1401*b* which is conical and more like a spike.

In the illustrated embodiment, between the underside of the grip section of the grip handle 52-S1 (labeled in FIG. 4) and the vertical arms of the handle 52-S2 (labeled in FIG. 4) is an oversized fillet 1052*i* that makes the handle 52 stronger and more comfortable to hold. Moving to the lower horizontal portion of the grip handle 52-S3 (labeled in FIG. 4), the top of this section is curved 1052*e* to match the shape of the underside of the implement 1700-IC and sit flush with the curved top of the pry bar, leaving only a small gap between the two parts. In some alternate examples, the bottom 1052*l* of the vertical portion of the handle 52-S2*a* (labeled in FIG. 4) may connect to the horizontal portion of the handle 52-S3 using fastener hardware or adhesive instead of being produced as a single piece. In many embodiments, to provide additional rigidity when mated to the pry bar 1100-A, the horizontal portion of the grip handle 52-S3 extends laterally away from the visible portion of the horizontal portion in both directions 1052*f* following the curvature of the pry bar's underside 1100-A. In many embodiments, the tongue 1052*g* at the end of the horizontal portion of the handle 52-S3 slips under the outer shaft 101 in the tool mount area F1-103 (labeled in FIG. 4) and helps to keep the implement 1700-IC in place by preventing the implement 1700-IC from rocking while it is prying on an object. The tongue also takes some strain off the hardware, adhesives or, in some examples, welds, from coming loose or breaking, keeping the implement 1700-IC in place.

As depicted in FIG. 5B, on the vertical portions of the grip handle 52-S2 (labeled in FIG. 4) a large fillet 1052*h* joins the shorter vertical 52-S2*b* (labeled in FIG. 4) section with the small base of the handle 52 to provide a smooth transition. This fillet may also support the bridge portion 1051*a* of the striking plate better than a sharp corner because of the increased surface area.

In FIG. 5C, the walls 1052*j* of the grip section of the hollow grip handle 52-S1 (labeled in FIG. 4) are thick enough to be an anchor device for ropes. In additional embodiments, supplementary equipment could be added to the tool as options to further improve the tool's rope handling features. In a preferred embodiment, the grip section of the handle 52-S1 is substantially round 1052*k* and only has grip texture in the middle of the grip between the two vertical sections of the handle 52-S2. In alternate embodiments, the handle shape could be changed to be oblong or a different geometric shape. In some alternate examples, the grip texture could extend across the whole grip area instead of just the space between the two vertical sections 52-S2 (labeled in FIG. 4).

As shown in FIG. 5A, a preferred embodiment of the striking plate 51 is a separate piece secured to the top of the implement 1700-IC using adhesive, hardware, or a combination of the two 1051*d*. It also serves as a cover to conceal 1051*d* the hardware used to secure the implement 1700-IC to the pry bar 1100-A. In examples where the plate 51 is a separate part from the implement 1700-IC, it may be made from a different material 1051*d* from the rest of the tool 3000-C, such as hardened steel. In a preferred embodiment, the flat surface of the striking plate 51 is polished, painted and finished with at least one decal 1051*d*. In other embodiments, this surface 1051*d* could be smooth, it could be left rough from the casting or machining process, or it could have a texture added artificially using chemicals, lasers, milling, or any other finishing process. The striking plate 51 could be left as bare metal or painted 1051*d*. The plate 51 could also have engraved or etched decals 1051*d* added during the finishing process for branding material or information about how the tool should be used.

As depicted in FIG. 5B the bridge portion 1051*a* of the striking plate 51 is designed to fit tightly 1051*e* over the top of the tall binding post H54 while matching the rounded profile of the head of the post H54. In many examples, the notch at the far end 1051*f* of the bridge portion 1051*a* of the striking plate 51 is designed to fit tightly around to a corresponding rib 1052*r* incorporated into the sides of the grip handle 52-S2. Additionally, in some alternate examples, this notch 1051*f* may be secured in place using some adhesive instead of being held down by the glue on the body of the striking plate 51.

The adz assembly's 1400-A handle cover 402 is the last part to be added to the assembly 1400-A. The handle cover 402 of the adz 1400-A has a curved face 1402*a* which continues the curvature on that section of the adz body. In some examples, this face 1402*a* may be used for part and manufacturing information or branding material in the form of engravings or decals. In other examples, the adz 1400-A includes a fork-like portion 1402*b* on handle bottom 402 that is designed to fit around the 'floating' end of the grip handle 52-S2*b* (labeled in FIG. 4) acting like a wedge to help keep the end 52-S2*b* in place and fill in the gap it would otherwise create. The profile of the fork-like portion 1402*b* of the handle bottom 402 also continues the profile of the adz body 401.

FIG. 8 contains multiple views of the pry fork assembly 1500-A which is one of the implements 1700-IC affixed to the pry bar 1000-PT in a preferred embodiment. Certain components of the pry fork body 501 are also illustrated in FIG. 9, and certain components of the pry fork assembly 1500-A are further illustrated in FIG. 10. FIG. 8A is a main perspective view of the complete pry fork assembly 1500-A. FIG. 8B is a secondary top view illustrating the backside of the pry fork 501-S1 and 501-S2 (as labeled in FIG. 4).

In the embodiment depicted in FIGS. 8 and 9, the opening 1501*m* on the lower portion of the pry fork tool mount 501-S3 fits snugly over the pry bar assembly 1100-A without allowing the bar 1100-A to slide completely through the pry fork assembly 1400-A. In preferred embodiments, this tunnel may be smooth, textured from the casting or machining process, or have fluting cut into the sides to allow room for adhesive to flow and expand. The pry fork 501 includes a striking surface 1501*n* adjacent to the opening 1501*m*. The striking surface 1501*n* allows the user of the pry bar 1000-PT to hammer on the pry bar 1000-PT using the striking tool 2000-PT, a hand, a foot, or any other implement to drive the pry fork into a surface.

The pry fork 501 includes tines 1501*a* intended to be wedged between objects or driven into a surface. The tines 1501*a* end in a sharpened edge 1501*b*. In some examples, depth markers 1401*c* are disposed on the sides of the tines 1501*a*, as discussed above. The tines 1501*a* of the pry fork 501 enclose a groove 1501*r*. The tool 501 can be used in the conventional manner to break bolts or other fasteners by positioning the head of the bolt within the groove 1501*r*, with tines 1501*a* on either side of the bolt. The pry fork 1500-A and the pry bar assembly 1100-A can then be used to apply leverage to the bolt. The groove includes a stepped portion 1501*q* and a narrow portion 1501*p* allowing the pry fork to extract fasteners or gain leverage on features of various sizes. The pry fork 501 includes an angled surface 1501*x*, which makes the pry fork easier to wedge into tight spaces. Beneath the handle 5-52, the pry fork slopes 1501*v* down to an end 1501*w* that forms a smooth intersection with the pry bar assembly 1100-A when the pry fork assembly 1500-A is assembled to the pry bar. A hardened strike plate 5-51 covers fasteners that connect handle 5-52 to the pry fork 501, in a manner consistent with the similar features illustrated on the adz assembly 1400-A.

FIG. 6 contains multiple views of an adz head 401 of the adz assembly 1400-A. FIG. 6A is a perspective view of the adz body when viewed from the top-right. FIG. 6B is a top-down view of the adz body. FIG. 6C is a perspective view of the adz assembly when viewed from the back-right. FIG. 6D is a right-side view of the adz assembly. The features of the adz head 401 are discussed above with reference to FIG. 5. Further, the interactions of components in the adz assembly 1400-A are discussed below with reference to FIG. 7.

Similarly, FIG. 9 contains multiple views of a pry fork 501 of the pry fork assembly 1500-A. FIG. 9A is a perspective view of the pry fork 501 when viewed from the top-right. FIG. 9B is a top-down view of the pry fork 501. FIG. 9C is a right-side view of the pry fork 501. The features of the pry fork 501 are discussed above with reference to FIG. 8. Further, the interactions of components in the pry fork assembly 1500-A are discussed below with reference to FIG. 10.

As shown in FIGS. 6A and 6B (detailing adz head 401) and FIGS. 9A and 9B (detailing pry fork 501), the top of the adz body 401-S1 (illustrated in FIG. 4) and the top of the pry fork 501-S1 (also illustrated in FIG. 4) may include a large cutout bounded by walls 1401*l*. The cutout receives a hardened striking plate 4-51 or 5-51 (illustrated in FIGS. 5 and 7 or 8 and 10, respectively). The cutout is separated into two areas 1401*i*, 1401*k* and covers most of the top of the adz body 401-S1 and the top of the pry fork 501-S1. The first part of the recession 1401*i* is proximal to the pry bar assembly 1100-A and is meant to receive the handle covers 402, 502, for the adz assembly 1400-A (illustrated in FIGS. 5-7) and fork assemblies 1500-A (illustrated in FIGS. 8-10) respectively. In some embodiments, this portion of the recession 1401*i* may be slightly deeper with a profile that matches the shape of the handle covers 402, 502, allowing the part to be secured without glue and stay in place better during the assembly process. The larger portion of the recession 1401*k* is distal to pry bar assembly 1100-A and is meant to house the hardened striking plate 4-51 or 5-51. An alternate example of the pry bar assembly 1100-A could have weight saving cutouts concealed within this recession and hidden by the hardened striking plate 51 so long as they do not interfere with the tool's mounting holes 1401*r*. The implement mounting holes 1401*r* are preferably the same size and are preferably in a standardized location on both ends of the pry bar 1100-A, inner bar F1-103, and for both the adz assembly 1400-A and fork assemblies 1500-A, respectively.

In various embodiments, the hardened striking plates 4-51 and 5-51 are designed to sit above the adz body 401 or the pry fork body 501, respectively, to protect it from damage. The distance the plate sticks up 1051*g* above the adz body 401 or the pry fork body 501 can vary. In a preferred example, the outside edge of the striking plate 4-51 or 5-51 is smoothed by a large chamfer 1051*b* which begins just above the point where the sides 1051*g* of the striking plate 4-51 or 5-51 meet the top of the adz body 401 or the pry fork body 501, meaning that the top 1051*d* of the striking plate 4-51 or 5-51 sits higher than the top of the adz body 401 or the pry fork body 501.

The implements 1700-IC of a preferred embodiment of the forcible entry tool 3000-C contain both the adz assembly 1400-A and the fork assembly 1500-A, which are assembled using mostly similar steps. In a preferred embodiment, the adz assembly 1400-A and the pry fork assembly 1500-A are designed to be interchangeable. To illustrate features allowing for this interchangeability, exploded assembly views are provided in FIGS. 7 and 10.

FIG. 7 comprises of a pair of exploded perspective views showing the adz assembly 1400-A from FIG. 5. FIG. 7A is an exploded view of the adz assembly 1400-A. Numbered connection lines are included between parts and the end of the pry bar shaft 1100-A. FIG. 7A also includes a thumbnail of a fully assembled adz assembly 1400-A with the same viewing angle as the exploded drawing. FIG. 7B is an incomplete exploded perspective view of the adz assembly 1400-A facing the opposite direction from FIG. 7A to better illustrate several small details and the connection lines for the binding bolts 4-H55.

Referring now to FIG. 7A, before the adz assembly 1400-A can be fastened to the pry bar 1100-A, the adz 401 may be placed into a jig (not shown) to keep the adz 401 in position while additional parts to be added. The adz's grip handle 4-52 is the first part to be added along connection path (1). In some alternate embodiments, the grip handle 4-52 may need some additional assembly in a separate jig to join the horizontal section 52-S3 with the handle's vertical arms 52-S2 before the handle 4-52 can be slid into the adz 401. Once together, the tall binding post 4-1154 can be inserted along path (4) to hold the two pieces together. The binding post 4-1154 may need to be temporarily removed later in the process. After the grip handle 4-52 is installed, the adz's handle cover 402 can be dropped or slid into place along path (2) on the adz body 401-S1 behind the tall vertical section of the grip handle 52-S2*a*. The partially assembled adz implement 1400-A is now ready to be slid into place inside tool mount F1-103*a* (label shown on FIG. 4) on the pry bar 1100-A along path (3). The tall binding post 4-1154 will need to be partially lifted to allow the incomplete assembly to slide into place. The short binding bolt 4-1153 can then be inserted into the second hole 1401*r* on the top of the adz 401-S1 along path (5). In some alternate examples, a grease, like Loctite, may be added to the holes 1401*r* before the binding posts are added, and to the inside of the tool mount F1-103*a* on the pry bar 1100-A. Looking down the length of the shaft 1100-A, a pair of bonding bolts 4-1155 can be inserted into their holes along path (6) inside the shaft 1100-A using another jig (not shown) and threaded into the two binding posts 4-1154, 4-1153 on the top of the adz 401-51. Once tight, the hardened striking plate 4-51 can be added along path (7) and secured in place with adhesive. Alternatively, in some examples, another set of bolts could be threaded into place from inside the pry bar shaft 1100-A to secure the hardened striking plate 4-51.

Once the entire assembly is complete, the handle cover 402 is removed briefly for adhesive to be added before it is replaced. Like the hardened striking plate 4-51, the adhesive could be supplemented for or replaced by a small bolt threaded in place from the underside of the adz body 401-51.

FIG. 10 is an exploded perspective view showing the pry fork assembly 1500-A from FIG. 8. Numbered connection lines are included between parts and the end of the pry bar shaft 1100-A. FIG. 10 also includes a thumbnail of a fully assembled pry fork assembly 1500-A with the same viewing angle as the exploded drawing.

Referring now to FIG. 10, before the pry fork assembly 1500-A can be fastened to the pry bar 1100-A, the pry fork body 501 may be placed into a jig (not shown) to keep the pry fork 501 in position while additional parts are added. The grip handle 5-52 is slid into the fork body 501 along path (1) from the back. As noted above, the grip handle 5-52 may, in some examples, require some prior assembly. The tall binding post 5-1154 can be inserted along path (3) to hold the grip handle 5-52 and the pry fork body 501 together. The binding post 5-1154 may need to be temporarily removed later in the process. After the grip handle 5-52 is installed, the handle cover 502 can be dropped or slid into place along path (6) on the pry fork body 501-S1 behind the tall vertical section of the grip handle 52-S2*a*. The partially assembled pry fork implement 1500-A is now ready to be slid into place inside tool mount F1-103*b* (opposite end of the pry bar relative to F1-103*a* label shown in FIG. 4) on the pry bar 1100-A. The tall binding post 5-1154 will need to be partially lifted to allow the incomplete assembly to slide into place. The short binding bolt 5-1153 can then be inserted into the second hole 1401*r* on the top of the adz 401-S1 along path (2). In some alternate examples, a grease, like Loctite, may be added to the holes 1401*r* before the binding posts 5-1153 and 5-1154 are added, and to the inside of the tool mount F1-103*b* on the pry bar 1100-A. Looking down the length of the shaft 1100-A, a pair of bonding bolts 5-1155 can be inserted into their holes along path (4) inside the shaft 1100-A using another jig (not shown) and threaded into the two binding posts 5-1154, 5-1153 on the top of the pry bar 501-S1. Once tight, the hardened striking plate 5-51 can be added along path (5) and secured in place with adhesive. Alternatively, in some examples, another set of bolts could be threaded into place from inside the pry bar shaft 1100-A to secure the hardened striking plate 5-51.

Once the entire assembly is complete, the handle cover 502 is removed briefly for adhesive to be added before it is replaced. Like the hardened striking plate 5-51, the adhesive could be supplemented for or replaced by a small bolt threaded in place from the underside of the pry fork body 501-S1.

Thus, in the embodiment illustrated in FIGS. 7 and 10, the grip handle 4-52 or 5-52 slides into the body (e.g., 401 or 501) of the implement 1700-IC allowing the two pieces to mate together simply and securely with minimal geometry. In some examples, one of the arms on the grip handle 52-S2*b* (labeled in FIG. 4) is shorter than the other to allow the handle 4-52 or 5-52 to slide into place on the implement 1700-IC without having to create a large slot through the middle of the body of the implement 1700-IC. The shortened arm 52-S2*b* also avoids the need to split the handle 4-52 or 5-52 into multiple pieces, which would decrease its strength. In some examples, the base of the short vertical arm 1052*q* on the grip handle 52-S2*b* gets narrower 1052*n* as it gets closer to the handle's arm 52-S2*b* to make room for the fork like portion 1402*b* of the handle cover 402, 502. The hole 1052*m* built into the short arm's 1052*q* base 1052*n* allows the front of the handle 52-S2*b* to be secured to the implement 1700-IC using the tall binding post H54. In numerous embodiments, these two implement mounting holes 1052*o* on the horizontal portion of the grip handle 52-S3 are identical to the implement mounting holes found in other parts of the forcible entry tool 3000-C. The tool mounting holes are unique on the grip handle 52 because one of the holes is split into two sections; 1052*m* on the grip handles short arm 52-S2*b* and 1052*o* on the horizontal portion of the grip handle 52-S3. These holes 1052*m* and 1052*o* allow each of the binding posts H53 and H54 shafts to pass into the inside of the pry bar 1100-A so the implement 1700-IC can be secured. In preferred embodiments, the raised area 1052*p* at the top of the horizontal portion of the grip handle 52-S3 allows the top of the handle's horizontal portion 52-S3 to sit flush with the top of the outer shaft 101.

In many embodiments, the fork like portion 1402*b* of the handle cover 402, in this preferred embodiment, comes to a point at the tip 1402*c*. However, in some alternate embodiments, with some modification to the grip handle's tall arm 52-S2*a* the tip 1402*c* of the fork-like portion 1402*b* could be rounded or squared off to create a more robust part.

In some examples, each of the implements 1700-IC is designed to stop when they are properly aligned with any mounting holes or other features that could be included in the inner shaft F1-103. In a few embodiments, before the incomplete assembly is slid onto the pry bar shaft 1100-A adhesive is added to the inside of the incomplete fork assembly's 1500-A tool mount F1-103*b* before sliding the assembly on. Once the incomplete assembly is in its tool mount F1-103*b*, a short binding post 5-1153 can be inserted into the second hole in the top of the fork body 501. While looking down the shaft 1100-A a pair of binding bolts 5-1155 can be held in place using a jig while the binding posts at the top of the assembly 1500-A can be tightened. To complete the fork assembly, in this embodiment, the hardened striking plate 5-51 is added and glued in place using a structural adhesive, which can be removed in the event repairs are needed but is capable of properly holding the striking plate 5-51 in place.

FIG. 11 is a perspective view of the inner shaft or striking tool 2000-PT. A preferred embodiment of which features an ax head 2300-A with additional tools built-in and a handle 2200-A. Detail callouts and the associated contextual views show hidden parts and details. In some embodiments, the striking tool handle assembly 2200-A contains a plurality of parts ranging from a handle shaft 201 and a reflective bottom cap 202 to, in some alternate examples, a core made of a different a material, including but not limited to, fiberglass, carbon fiber, or magnesium. Additionally, in some alternate embodiments, the inside of the striking tool handle 201 could be hollow to allow for a sliding counterweight, making the upstroke swing of the tool 2000-PT easier while greatly increasing the striking force of the tool 2000-PT; to mitigate some of the impact vibrations generated from such a strike, the handle body 201 could have slots (not shown) cut into it close to the head to absorb those forces. In at least one more alternate example, the striking handle assembly 2000-PT could be comprised of a shaft 201 and a cap 202 but the alternate material core, possibly for weight reduction or vibration absorption, includes a tool head back stop F2-205, a tool head stabilizers F2-206 and a tool head bolt shaft F2-207. Portions of the handle body 201 are all illustrated in FIG. 12. However, in a preferred embodiment, the striking tool or multi-function ax 2000-PT is comprised of two sub-assemblies: the handle assembly 2200-A, and the ax head assembly 2300-A. In a preferred embodiment, the handle assembly 2200-A is comprised of a solid titanium handle body 201 and reflective bottom cap 202.

In the illustrated preferred embodiment, each part has been split into sections based upon its features. The main part in the striking tool handle assembly 2200-A is the handle body 201. The striking tool handle 2200-A has a length 2201*l* of approximately 31 inches. The length 2201*l* is engineered to fit completely inside the 36-inch-long pry bar 1000-PT when the forcible entry tool 3000-C is in its most compact configuration. Alternate examples of the tool 3000-C could feature a handle 2200-A that is longer or shorter. Depending on the striking tool implement 2700-IC equipped on the handle 2200-A the length 2201*l* could be longer than the pry bar 1000-PT, even extending up to 12 inches past each end of the pry bar 1000-PT. Preferably, however, the length 2201*l* of the striking tool handle 2200-A should not compromise the balance of the tool 3000-C, such that it would prevent the tool 3000-C from being carried using only one of the grip handles 4-52 or 5-52. The shaft 201 of the striking tool handle 2200-A is ergonomically sized 2201*m* for someone wearing thick gloves. The handle 201 could have several different shapes 2201*m* and, in some embodiments, is not limited to one shape for its whole length. Additionally, the profile of the handle shaft 201 could range in shape from round, ovular, hexagonal, pentagonal or any other shape which can be easily grasped.

In a preferred embodiment, the striking tool handle 2200-A has two locking points F2-202*a* and F2-202*b* integrated into both sides of the handle body 201. The extension locking holes F2-202*a* and F2-202*b* may go all the way through the handle body 201 or just far enough for a locking bolt mH63, illustrated in FIG. 14, to fit inside and avoid compromising the handle's 201 strength. In a preferred embodiment, the holes F2-202*a* and F2-202*b* do not go all the way through the handle 201, are only a little deeper than what the locking bolt mH63 requires. In some examples, locking holes F2-202*a* and F2-202*b* are provided on both sides of the handle body 201. In some examples, a chamfered outside edge 2202*d* is provided on each of the holes F2-202*a* and F2-202*b*, to help guide the locking bolt mH63 into the hole. In preferred embodiments, the locking hole F2-202*a* closest to the bottom 2202*o* of the handle 201 is centered, along its center-point, below the rear edge 2210*b* of the main hand grip 2201*c*. This position 2202*o* allows the two components of the tool 3000-C to lock into an elongated configuration (see FIGS. 18B & 19B), while being positioned far enough from the bottom 2210*o* of the handle 201 that the hole F2-202*a* would not be prone to breaking. In preferred embodiments, the locking hole F2-202*b* positioned close to the middle 2202*p* of the handle body 201 allows the two components of the tool 3000-C to lock in a compact configuration, as illustrated in FIG. 1.

As illustrated in FIG. 11, a preferred embodiment of the striking tool handle body 201 also includes a series of hand grips F2-210, and reflective strips F2-211. In some examples, the striking tool handle body 201 has multiple grip areas and other features intended to help the two components 3000-C slide within each other smoothly. The bottom edge of the handle 201 is chamfered 2210*a* to make it easier for the user to guide the handle 2200-A into the hollow pry tool shaft 1000-PT. In some examples, the main hand grip 2210*c* at the bottom of the handle 201 is recessed to minimize slipping the handle 201 from the user's hand when swinging, especially if the tool is wet or dirty. The hand grip 2210*c* could be textured with channels, for example, to further increase grip and give water a path to run away from the user's gloves and hands. In some examples, a recessed region 2210*e* runs along a side of the handle 210 between the extension locking holes F2-202*b* and the handle to implement head tool transition F2-204. The recessed region 2210*e* is intended to improve grip, reduce weight, and provide a flat surface for the addition of graphics or branding material. These recessions 2210*e* may be textured differently from the rest of the handle 201, possibly sporting a rough texture added after the initial casting and machining or as a byproduct of the initial casting process. In some examples, a reflective material or paint is added to the recessions 2210*e*. In embodiments having recessions 2210*e*, the transition from the recession to the lateral face of the handle 201 is smooth to prevent the locking bolt mH63 from getting caught when the two components of the tool 3000-C are sliding inside each other. The depth 2210*f* of these recessions 2210*e* could vary, depending upon the desired function of the recessions, either focusing on weight reduction or handling stability. In alternate embodiments, the shape of the recessions could change from being rectangular to a series of smaller cutaways which could add additional functions to the striking tool handle 2200-A, such as a series of standard unit hexagonal sockets on one side of the handle 2200-A and metric on the other side. Sockets of this type would allow use of the handle 2200-A as a breaker bar. At the cephalic end of the handle 201, on the top side, there is another grip aid 2210*i* on the handle body 201 to help stabilize the user's hand when using the back of the ax head 2300-A as a hammer. Preferably, this grip aid 2210*i* uses a series of small channels like the bottom grip 2210*b* but instead of running across the width of the handle 201 they run down the length of the handle 201 and prevent the tool from twisting in the user's hand. In some examples, on the opposite side of the grip aid 2210*i* is a section of handle between the slide stop F2-208 and the implement backstop F2-204 which includes a hand rest F2-203 and functions as the main portion of the grip area 2210*j* when using the back of the ax head 2300-A as a hammer. In other examples, the steeply rounded transition between the handle body 201 and the bottom of the implement backstop F2-204 blocks the user's fingers from sliding 2210*k* into a lower blade F2-312 or a rear blade F2-307 if it is uncovered on the ax head assembly 2300-A. In various embodiments, the top and bottom sides of the middle of the handle 201 contain a narrow strip 2210*g* which break the reflective strips F2-211 into halves along the length of the handle 201. This strip protects the reflective strips F2-211 from rubbing against the inside of the pry bar 1000-PT and getting damaged.

FIG. 12 is an exploded perspective view of a preferred embodiment of the striking tool 2000-PT, including the multi-function ax 2300-A illustrated in FIG. 11. FIG. 12 also includes a thumbnail of a fully assembled ax with an identical viewing angle to the exploded assembly. The ax head 2300-A connects to an inner shaft or striking tool handle 2200-A, using numbered assembly lead (1).

FIG. 12 further illustrates components of the ax head assembly 2300-A, including an ax head 301 and a hydrant tool bracket 302 positioned at the back of the ax head 301. The hydrant tool bracket 302 serves many purposes ranging from adding additional functions to the striking tool 2000-PT to holding the ax head 301 in place on top of the handle assembly 2200-A. The hydrant tool bracket 302 connects to the ax head 301 along line (2). In some examples, the back of the hydrant tools bracket includes a striking surface F2-306*c*, which can be used, for example, to hammer the pry bar 1000-PT. In some examples, the bottom of the back of the hydrant tools bracket 302 has a small hook F2-305 for grabbing the rocker lugs on the sides of fire hose couplings to tighten or loosen the connection. The hydrant tools bracket also includes a hydrant wrench F2-308 used to clamp the valve of a hydrant or other fastener. The hydrant tools bracket 302 is designed to be replaced when worn or damaged. Screw S-1159 attaches the hydrant tools bracket 302 to the ax head 301 along connection line (3). Screw S-H58 secures the top of the hydrant tools bracket 302 to the top of the ax head 301, and also to the striking tool handle 2200-A, connecting along line (4).

The ax head 301 includes a cutting face F2-312. In a preferred embodiment, the ax head includes a serrated cutting edge F2-313. In a preferred embodiment, the ax head 301 includes a handle F2-310 constructed as a through-hole or a pocket in the ax head 301 such that a user can grasp the ax head even when wearing bulky protective gloves. These features may be combined individually or collectively.

FIG. 13 includes multiple perspective views of the multi-function ax head assembly 2300-A illustrated in FIGS. 11-12. FIG. 13A is a main perspective view of the ax head striking tool assembly 2300-A. In these examples, also illustrated in the main drawing on FIG. 11, a small hook F2-305 includes hook 2305*d* that protrudes perpendicularly from the hydrant tools bracket 302 before curving around itself. The hook extends until just before the top of the hook 2305*d* is even with the top of a rear striking surface F2-306*c*, or another rear facing feature. The hook 2305*d* stays behind the rear striking surface F2-306*c* so that it does not get damaged or deformed when the striking surface F2-306*c* is being used. In other examples, illustrated in Detail D of FIG. 11, the angled flat area 2305*c* above the hook 2305*d* helps the hook 2305*d* grab the rocker lugs and provides a fulcrum to make rotating the hose couplings easier. Referring again to FIG. 13A, the preferred hydrant tools bracket 302 includes an oversized adjustable hydrant wrench F2-308. A preferred embodiment of the hydrant wrench F2-308 is made up of two main components: the universal wrench cutout 2308*c* and a 'hydrant wrench' bolt 3-1161 that allows the wrench to adjust its size to fit any fire hydrant. This preferred embodiment uses a standard coarse threaded bolt 2361*a* as the 'hydrant wrench' bolt 3-1161, however, some examples could feature a more complicated 'hydrant wrench' bolt 1161 including a grip handle added to the head of the bolt H61 so that it would be easier to grip and turn. In other examples, the tip of the bolt 1161 could also be changed by adding a flat element that spins freely on the tip of the bolt but is limited to only sliding up and down when pushed by the bolt 1161 inside the universal wrench 2308*c*. This would allow the 'hydrant wrench' bolt 3-1161 to make close to 100% contact with pentagon nuts or 50% contact with square nuts on a fire hydrant. Another alternate example of the hydrant tools bracket 302 could feature the hydrant wrench F2-308 being replaced altogether with a ratcheting hydrant wrench in a single size chosen by the client, or as a kit with different sized ratcheting hydrant wrenches the client could swap out as needed. The universal wrench cutout 2308*c* can grip two different kinds of hydrant nuts because of the design of the notches at the top of the cutout 2308*c*. In certain examples, the first of these notches at the top of the universal wrench cutout 2308*c* is a 90-degree corner 2308*a* cut into each side of the angled sides. The second notch 2308*b* is configured to receive the tip of the pentagon shaped universal wrench cutout 2308*c* which, in some embodiments, may also have a small slit leading up from the where the point would be allowing the top corner to be rounded off into the slit, thus making it easier for the hydrant wrench F2-308 to grip round lugs on hose couplings.

Some embodiments of the hydrant tools bracket 302 feature an extended bottom by the hole for the 'hydrant wrench' bolt 3-1161 to help hook objects and funnel 2307*i* them into the rear cutting blade F2-307. A preferred embodiment of the hydrant tools bracket 302 features a smaller bottom which does not extend very far beyond the bottom of the ax head 301. This smaller guide 2307*i* is still able to guide objects into the rear cutting blade F2-307 but is small enough to not get in the way of the 'hydrant wrench' bolt 3-1161. The ax head fork cutout F2-315 is positioned above the rear cutting blade F2-307 to allow the two components of the tool 3000-C to slide together in a more compact way when one of the prying implements 1700-IC on the Halligan-type pry bar 1000-PT is a fork 1500-A. The back wall 2315*j* of the cutout F2-315 matches the curve of the fork body's 501 tines 1501*a*. In some embodiments, the outside edge of the fork cutouts F2-315 between the cutout and the rest of the ax head is smoothed by a large fillet 2315*e*. In some examples, the fillet 2315*e* could be replaced by a large chamfer or omitted altogether. The middle section 2315*d* of the fork cutout F2-315 is in the lateral center of the ax head 301 and the surface is flat and is narrow enough to fit between the fork body's 501 tines 1501*a* all the way down to the root 1501*y*. In a preferred embodiment and many others, the ax head 301 has a handle cutout F2-310 cut into the blade of the ax head 301. The outside edges 2310*c* of the cutout F2-310 are smoothed with a fillet, or a chamfer in some examples, for a comfortable grip and to allow an optional blade cover (not shown) to slide on easily. Additionally, this smoothed edge 2310*c* allows for a smooth transition as the ax head's 301 blade 2314*a* becomes thinner to help the lower half of the blade glide easily through the object it is cutting after the top half of the blade 2314*a* makes an initial piercing impact.

In many embodiments, the blade features F2-312-F2-314 of the ax head 301 include a unique raked variable profile blade design, illustrated in Detail E within FIG. 11, which allows the ax 301 to cut through most surfaces with ease. In some alternate examples, a traditional fire ax head could be made available as an option, such as an ax head with a curved blade or an ax head with a small pike on the back. In a preferred embodiment, the ax head and the blade transition into a thinner profile F2-314 on the lower half of the ax head 301. The ax head's 301 primary blade 2314*a* is long and thin for easy cutting. The blade's edge 2314*a* is sharply raked forward to focus all of the momentum of the swing to a single point for maximum penetration; to facilitate this further, the top third of the ax head 301 is much thicker and heavier 2314*c* than a traditional ax head and more closely resembles the head of a maul. To avoid creating excess drag the lower half of the ax head becomes much thinner 2314*b* than the top section 2314*c*. In most embodiments, the thin portion of the ax blade 2314*b* covers the bottom half of the main blade 2314*a* and the bottom of the ax head most of the way back to the hole 2312*q* for the striking tool handle 2200-A before gradually becoming wider 2312*q* to accommodate the handle 2200-A. In a preferred embodiment, the bottom of the ax head 301 thins even more to make room for a bidirectional saw blade F2-313 and angles slightly upward such that the saw blade F2-313 contacts the object at the proper angle. In some embodiments, the thin profile F2-312 of the saw blade F2-313 continues what was started by the ax head's 301 thinning profile F2-314, and this transition brings the ax head's 301 thickness down to a thickness appropriate for a saw blade 2312*r*. In this preferred embodiment, the ax head's saw blade F2-313 helps the ax 301 cut through harder materials such as shingles; in softer materials the short saw blade F2-313 extends the length of the cut generated from each swing of the striking tool 2000-PT. In various embodiments, the saw's F2-313 teeth 2313*g* decrease in width as they get taller instead of hooking forward or backwards to allow for gentler cutting, preventing the ax head 301 from getting stuck as it plunges into an object. A deep gullet 2313*f* between each tooth allows for plenty of room for chips to gather. In several embodiments, the saw's F2-313 teeth have a pyramid-like shape 2313*h* making it easier for them to cut on impact as they are driven into the material.

Detail callout H in FIG. 13 illustrates features of the cutting blade F2-207, including a pocket F2-315 designed to receive the tines 1501*a* of a pry tool assembly 1500-A. A blade cover recess F2-311 is positioned just inboard of the cutting edge F2-307, such that a cover can be snapped into place over the blade F2-307. The recess F2-311 can be a through-hole 2311*p* or, in alternative examples might be a pocket.

FIG. 13B is a secondary perspective view of an ax head striking tool assembly 2300-A from the top rear, highlighting a hose/hydrant interface F2-309 including a hole feature 2309*g* on top of the hydrant tools bracket 302 that can interface with fire hose couplings and fire hydrants, this face and hole feature 2309*g* also serves as a striking surface for forcible entry operations.

FIG. 13C is a secondary cutoff perspective view of an ax head striking tool assembly illustrating the back of a hydrant tool bracket 302 attached to the back of an ax head. The striking surface F2-306*c* includes pockets F2-306*a* and F2-306*b* such that the hydrant tool bracket 302 can be used to twist standard natural gas valves open and closed. Preferably, pocket F2-306*a* includes a relatively larger and deeper groove 2306*f* compared to pocket F2-306*b*, which has a narrower and shallower groove 2306*e*. The relative sizes of the pockets F2-306*a* and F2-306*b* could be reversed, but the relative size difference provides flexibility in the different types of valves that can be operated by the hydrant tool bracket 302.

FIGS. 14-17 illustrate a locking mechanism 1600-A further comprising dial assembly 1621-M, dial-mounting base 1610-SB, and pin mH63. FIG. 14 is a general exploded view and parts list illustrating the extension locking mechanism 1600-A illustrated in FIG. 2. FIG. 14 further illustrates separate sub-assemblies of the extension locking mechanism exploded to reveal each part.

FIG. 15 includes multiple views of a first dial half 1620A-SB of the extension locking mechanism 1600-A illustrated in FIG. 14. FIG. 15A is an exploded view of a first dial half 1620A-SB of an extension locking mechanism 1600-A. The exterior surfaces of the dial 621A are one part of the symmetrical whole described as the dial halves 1621-M. FIG. 15B is a perspective view of the inside of the assembled first half (dial half A 1620A-SB) of the user interfaceable portion of the extension locking mechanism 1600-A when viewed from the top right. One set of screws 620A-1157 in the subassembly is completely hidden by other parts in the assembly 1620A-SB. The screw 620A-H57*d* is illustrated in hidden view in its proper position, however.

FIG. 16 contains multiple views of the second half (Dial Half B 1620B-SB) of the user interfaceable portion of the extension locking mechanism 1600-A illustrated in FIG. 14. FIG. 16A is an exploded view of the second half (Dial Half B 1620B-SB) of the user interfaceable portion of the extension locking mechanism 1600-A. The exterior surfaces of the dial are one part of the symmetrical whole described as the dial halves 1621-M. FIG. 16B is a perspective view of the inside of the assembled second half (Dial Half B 1620B-SB) of the user interfaceable portion of the extension locking mechanism 1600-A when viewed from the bottom left. The top plate 601 is not part of the subassembly but is included for reference.

FIGS. 14-16 illustrate a user interfaceable portion of the extension locking mechanism 1600-A is made up of a dial assembly 1621-M which is split into a pair of subassemblies 1620A-SB and 1620B-SB representing each of the dial halves. In some examples, these dial halves are identical on the outside, but different on the inside based on the additional parts required to make the mechanism 1621-M function. A first dial half subassembly is represented as dial half A 1620A-SB, illustrated in greater detail in FIG. 15. The second subassembly is represented as dial half B 1620B-SB, illustrated in FIG. 16, which is also considered the main dial half because it is designed to hold additional parts required to make the dial work properly. To complete the assembly 1600-A in this embodiment, one final subassembly is required, which is represented as the dial mounting base 1610-SB. This subassembly completes the mechanism mounting base F1-104 feature built into the pry bar shaft 1100-A.

The two halves of the dial assembly 1620A-SB and 1620B-SB include twist half caps 621A and 621B and cap track halves 622A and 622B. Twist half cap 621A is fastened to cap track half 622A by track screws 620A-H57*a*-620A-H57*e*. Twist half cap 621B is fastened to cap track half 622B using track screws 620B-H57*f*-620B-H57*i*. Dial half 1620B-SB further comprises a small plate 625B, large plate 626B, twist bracket 613, recast metal nut 620B-mH62. The twist half caps 621A and 621B are held together by small plate 625B and large plate 626B, and the corresponding fasteners 620B-H56*a*-620B-H56*g*. The small plate 625B is fastened to dial half 621A using bracket screws 620A-H56*e*-620A-H56*g*. Small plate 625B is fastened to dial half 621B using bracket screws 620B-H56*a*-620B-H56*c*.

Twist bracket 613 is threaded on the interior, the threads 614 complementing threads 619 on nut 620B-mH62, such that twist bracket 613 can receive nut 620B-mH62. Nut 620B-mH62 has interior threads 618 that complement external threads 617 on pin mH63. In a preferred embodiment, pin mH63 includes a smooth portion configured to insert into the holes F2-202*a* and F2-202*b* in the striking tool handle 2200-A. Alternatively, as shown, the pin mH63 includes threads 617 running the length of the pin. Bracket screws 620B-H56*h* and 620B-H56*i* are inserted into holes in twist bracket 613, and threaded into the twist half cap 621B. Bracket screw 620B-H56*a* is inserted into a hole in small plate 625B, through large plate 626B, and through a hole in twist bracket 613, thus connecting small and large plates 625B, 626B with the twist bracket 613.

The dial mounting assembly 1610-SB further includes twist base cap 611 fastened to dial mounting base F1-104 using cap screws 610-H60*a*-610-H60*c*. The dial mounting assembly 1610-SB further comprises keyed nut 612. Both the twist base cap 611 and the keyed nut 612 are rotatably fixed to the mounting base F1-104. Keyed nut 612 includes a substantially circular through-hole 624. A protrusion 623 projects into the through-hole 624, which is received in a groove 630 on pin mH63. Because of the interaction between the protrusion 623 and the groove 630, the pin mH63 is rotatably fixed, but free to translate inwardly and outwardly from the keyed nut 612. Nut 612 is hex shaped such that it is received in a hex shaped pocket 1104*y* in dial mounting base F1-104 (see, e.g., FIG. 17).

As illustrated in FIG. 15A, the cap track half 622A is substantially semi-circular, forming half of a ring completed by the cap track half 622B (illustrated in FIG. 14). Each of cap track halves 622A and 622B include inner surfaces 1622*a* and 1622*b*, separated by an annular ridge 1622*c*. When cap track halves 622A is assembled into the dial half 621A, the annular ridge 1622*c* captures an upper lip 640 of the twist base cap 611. Because the cap track half 622B includes the same annular ridge 1622*c*, the twist base cap is captured within the assembled dial halves 1620A-SB and 1620B-SB. The assembled dial halves 1620A-SB and 1620B-SB remain free to rotate relative to the twist base cap 611, but they cannot slide inward or outward from the twist base cap 611.

Twist base cap 611 is connected to dial mounting base F1-104 by cap screws 610-H60*a*-610-H60*c*. Dial mounting base F1-104 has holes 1104*v*-1104*x*, for receiving cap screws 610-H60*a*-610-H60*c* (see FIG. 14). Twist base cap 611, thus remains stationary upon rotation of dial assembly 1621-M, as it bears against the annular ridge 1622*c* formed by cap track halves 622A and 622B.

Thus, in operation when the dial assembly 1621-M is rotated, the threads 618 in nut 620B-mH62 operate against the threads 617 of pin mH63, as the pin mH63 does not rotate because protrusion 623 maintains pin mH63 in substantially rotatably fixed relative to the nut 612, which is rotatably fixed to the dial mounting base F1-104 and the pry tool shaft 1100-A. However, the threads 618 in nut 620B-mH62 operate to translate the pin mH63 inwardly and outwardly relative to the dial mounting base F1-104 and the pry tool shaft 1100-A. The pin mH63 is therefore capable of selectively engaging the holes F2-202*a* and F2-202*b* in the striking tool handle 2200-A depending upon whether the extension locking dial 1600-A has been rotated to a first position or a second position. In a preferred embodiment, the extension locking dial 1600-A needs only to be rotated a quarter turn clockwise to extend the pin mH63, and a quarter-turn counter-clockwise to retract the pin mH63.

In operation of the tool, the adz 501 is inserted into a space between the door and a door jamb up to a first notch in the adz 501. Extension of the composite shaft may be required at that point. When the striking tool handle 2200-A is extended relative to the pry bar shaft 1100-A, and the pin mH63 is aligned with the hole F2-202*a*, the pin mH63 can be extended to secure the shafts 2200-A and 1100-A relative to each other, providing greater leverage.

The user then applies a first force perpendicular to the multi-purpose tool to separate the door from the doorjamb, meaning the doorjamb is crushed. In some situations, the first force may not be sufficient to crush the doorjamb, so an additional force sufficient to crush the door jamb is applied to create space to insert the adz further into the gap. After the door jamb is crushed, the pin mH63 can be disengaged from the hole F2-202*a*, and the two tools can be separated, leaving the adz 501 in the door. Then, the ax head 2300-A may be used to drive the adz 501 deeper, up to a second notch, and possibly beyond the second notch. It is noted that, in situations where the door is easily penetrable—such as a weaker interior door—and set up to swing towards the user, the ax handle 2200-A could be reinserted, and the user may force the door open using the adz 501 by pulling end opposite the adz toward the user. Otherwise, the crushing operation is performed again. Then, the adz 501 may be removed from the door. Before the adz 501 is removed from the door, the ax head 2300-A, or a separate wedge could be used to maintain the gap between the door and the door frame, making for a more efficient process.

The fork 401 can then be inserted into the gap, following the same process as that described for the adz 501 above. Depending on the quality of the gap made using the adz 501, the user may need to apply additional force to the composite shaft to create a higher quality gap. The concave surface of the fork 501 should face the door hinge if the door opens toward the user and the convex surface of the fork 501 should face the door's hinge if the door opens away from the user.

If desired, the ax 2000-PT may then be reinserted into the pry bar shaft 1100-A and locked in the extended position before applying a pulling force or a pushing force, depending on the way the door swings, to force the door open. As described in the steps of the method, the composite shaft is composed of both the hollow shaft and the second shaft, such that the hollow shaft holding the adz tool 501 is extended using the second shaft associated with the ax head 2300-A. In some situations, the striking tool 2000-PT and the pry bar 1500-A may not need to be secured together to exert appropriate force to separate the door from the door jamb. For example, the second shaft may be slid into the first shaft a distance, such that the shafts are not secured, but the user is provided sufficient leverage to separate the door from the doorjamb.

Further, in some situations, the striking tool and the pry bar may be secured together in an extended position for overhaul purposes. For example, if a user needs to reach a point out of his or her reach, the extended composite shaft can provide the necessary extension to reach the point (e.g., far above his or head, or into or through a wall). The first tool and second tool may be extended to hold elevator doors open in some situations.

In some applications of the multi-purpose tool, the extension locking mechanism 1600-A does not need to be engaged. It is possible to slide the first shaft into the second shaft, without engaging the extension-locking mechanism, and still provide the necessary leverage to separate a door from its jamb and door frame.

FIG. 17 contains multiple views and several embodiments of the pry bar shaft featuring a preferred embodiment 1100-A as illustrated in FIG. 2. Some hidden lines are included for reference. FIG. 17A is a perspective view of a preferred embodiment of the pry bar shaft 1100-A illustrated in FIG. 2, which combines the pry bar shaft 101, Inner Pry Bar F1-103, and the Dial Base F1-104 into a single part. As shown in FIG. 17A, the pry bar shaft 1100-A is a single bar 101 with a solid section also known as an inner bar F1-103 and a hollow section 101-S1 which both run the whole length of the bar. FIG. 17B is a perspective view illustrating a preferred embodiment of the pry bar shaft when viewed from the bottom right to illustrate the recession intended to keep the heads of the binding bolts 1155 out of the way of the striking tool's handle. FIG. 17C is a right-side view of a preferred embodiment of the pry bar shaft. FIG. 17D is a perspective view of the dial base isolated from the pry bar shaft 101. FIG. 17E is an exploded perspective view of an alternate embodiment of the pry bar shaft. This embodiment has the pry bar shaft 101 combined with the dial base F1-104 as one part and the inner pry bar F1-103 as a separate part secured to the pry bar shaft with hardware and structural adhesive. FIG. 17F is an exploded perspective view of an alternate embodiment of the pry bar shaft. This embodiment has the pry bar shaft 101, inner pry bar F1-103 and dial base F1-104 all as separate parts. Although not shown, to aid in the alignment of the dial base, the hole in the pry bar shaft may be shaped like a hexagon with a raised hexagon-shaped boss on the backside of the dial base designed to fit tightly into the hole on the pry bar shaft may be included.

FIG. 18 illustrates a first arrangement of a forcible entry tool 3000-C in which a handle (e.g., 201) of a striking tool 2000-PT is inserted through a pry-bar end 501 of a Halligan-type pry bar 1000-PT. FIG. 18A illustrates the forcible entry tool 3000-C in a compact configuration of the first arrangement, in which the extension locking dial 1600-A can be used to lock the two components by extending a pin (e.g., mH63 illustrated in FIGS. 14-16) into a hole (e.g., F2-202*b* illustrated in FIGS. 11-12) in the handle 201. FIG. 18B illustrates the forcible entry tool 3000-C in a first extended configuration of the first arrangement, in which the extension locking dial 1600-A can be used to lock the two components by extending a pin (e.g., mH63 illustrated in FIGS. 14-16) into a hole (e.g., F2-202*a* illustrated in FIGS. 11-12) in the handle 201. In the configurations illustrated in FIG. 18A and FIG. 18B, the components of the forcible entry tool 3000-C can either be locked together or left such that the handle 201 of the striking tool 2000-PT is slidable within the hollow shaft of the Halligan-type pry bar 1000-PT. FIG. 18C illustrates the forcible entry tool in a second extended configuration in which an end 3000*a* of a handle 201 of a striking tool 2000-PT does not reach an extension locking mechanism 1600-A. Thus, although striking tool 2000-PT can be used to exert considerable leverage on an adz end 401 of the Halligan-type pry bar 1000-PT, the striking tool 2000-PT and the Halligan-type pry bar 1000-PT cannot be locked together in the extended configuration illustrated in FIG. 18C.

FIG. 19 illustrates a second arrangement of a forcible entry tool 3000-C in which a handle (e.g., 201) of a striking tool 2000-PT is inserted through an adz end 401 of a Halligan-type pry bar 1000-PT. In preferred embodiments of the forcible entry tool 3000-C, the handle 201 has a symmetric cross section such that Halligan-type pry bar 1000-PT can receive the handle of striking tool 2000-PT in the illustrated blade-down manner or in a blade up manner. This symmetrical design advantageously allows a user to quickly slide the handle into the Halligan-type pry bar 1000-PT in either orientation. FIG. 19A illustrates the forcible entry tool 3000-C in a compact configuration in which a slide stop (e.g., F2-208 illustrated in FIGS. 11-12) on handle 201 rests against a top surface of an adz end 401 of the striking tool 2000-PT. FIG. 19B illustrates the forcible entry tool 3000-C in a first extended configuration of the second arrangement, in which the extension locking dial 1600-A can be used to lock the two components by extending a pin (e.g., mH63 illustrated in FIGS. 14-16) into a hole (e.g., F2-202*a* illustrated in FIGS. 11-12) in the handle 201. FIG. 19C illustrates the forcible entry tool in a second extended configuration of the second arrangement in which end 3000*b* of handle 201 does not reach extension locking mechanism 1600-A. The overall length 3000*c* of the second extended configuration provides considerable leverage on a pry bar end 501 of the Halligan-type pry bar 1000-PT. But the striking tool 2000-PT and the Halligan-type pry bar 1000-PT cannot be locked together in the extended configuration illustrated in FIG. 19C.

In certain methods of use, the striking tool 2000-PT can be used to drive the pry bar end 501 of the Halligan-type pry bar 1000-PT into a surface. The second extended configuration illustrated in FIG. 19C is a starting position for a preferable method of use. From the starting position, the striking tool 2000-PT is slid rapidly within the hollow shaft of the Halligan-type pry bar 1000-PT. The compact configuration illustrated in FIG. 19A is an ending, or impact position for this method of use. Slide stop F2-208 impacts the adz end 401 of the Halligan-type pry bar 1000-PT, and imparts significant force through the pry bar end 501 of the Halligan-type pry bar. This method of use allows a single person to drive the pry bar end 501 into a surface, despite the relatively large size and weight of the tools. The sliding motion of the striking tool 2000-PT advantageously controls the motion of the striking tool 2000-PT relative to the Halligan-type pry bar 1000-PT. The person can therefore easily hold the pry bar 1000-PT with a firsthand and slide the striking tool 2000-PT with a second hand. This method requires considerably less strength and dexterity than methods of using known tools, in which the user would have to single-handedly swing a striking tool to strike a pry bar—while simultaneously holding the pry bar in position using the other hand.

FIG. 20 illustrates the components of a forcible entry tool in an arrangement where each component is separated from the other. FIG. 20A illustrates a Halligan-type pry bar 1000-PT that can be used according to known methods for using a conventional Halligan tool, in addition to specialized uses facilitated by features disclosed herein. FIG. 20B similarly illustrates a striking tool 2000-PT that can be used according to known methods for using a conventional firefighter's ax, in addition to specialized uses facilitated by features disclosed herein.

The flow charts in FIG. 21 and FIG. 22 depict the preferred method and related contingencies associated with forcing open a hinged door positioned inside or outside of a structure. The processes supplied each illustrate one possible use for the forcible entry tool 3000-C. The processes illustrated in FIG. 21 and FIG. 22 can each be completed in less than four minutes by a single firefighter. The contingencies connected to some of the preferred steps do not directly apply to the scenario described but are included to further describe what maneuvers the forcible entry tool 3000-C is capable of. In each scenario, the door and frame do not have any pre-existing security measures built-in, such as an angle iron door jamb guard which typically require a saw to be defeated. Instead, the door and the frame are constructed from common contractor grade materials.

FIG. 21, is a flow chart describing the method for using a forcible entry tool 3000-C as disclosed herein to obtain access through an inwardly opening door (inwardly opening doors open away from users). The process for opening an inwardly opening door is considerably more complicated than opening an outwardly opening door because of the additional variables. For this reason, the path N2000 (highlighted in grey) through the flow chart represents the most common process for opening an inwardly facing door. On weaker timber-framed or hollow doors it is advantageous for the firefighter to first attempt an alternate forcible entry method N100-L before beginning the standard forcible entry procedure. This alternate method N100-L uses the forcible entry tool 3000-C into a battering ram. With the forcible entry tool 3000-C in its most compact configuration, as illustrated in FIGS. 1 and 18A, a user can swing the forcible entry tool 3000-C in a way that allows the back 1401*n* of the adz with pike 1400-A to strike the door close to the lock. Multiple strikes positioned within six inches of the door's lock or bolt may be required in order to force the door open. The forcible entry tool 3000-C is swung by holding one grip and the swing handle 52 in each hand. If the door fails to open N1000A after being battered, the firefighter should then begin the standard procedure for forcing entry through an inward opening door. If the door did open N6000A, then the firefighter should pull the door closed again until the team is ready to go inside.

As illustrated in FIG. 21, the first step N100 of the forcible entry process begins with one firefighter using the forcible entry tool 3000-C in a separated configuration, as illustrated in FIG. 20. The firefighter should hold the Halligan-type pry bar 1000-PT in their non-dominant hand (using the grip texture 1101*a* positioned over the halligan-like pry bar's 1000-PT center of gravity) with the fork 1500-A pointing towards their back. The striking tool 2000-PT should be in their dominant hand, using the grip texture 2210*i* and the grip area 2210*j* positioned over the striking tool's 2000-PT center of gravity, as illustrated in FIG. 11, with the blade 2314*a* on the striking tool head 2300-A pointing toward the ground and the handle 2200-A running parallel to and resting against their forearm. Using the top of the striking tool 2309*g*, tap the hardened striking plate 51 on top of the adz and pike 1400-A until the adz blade 401-S2, illustrated in FIG. 4, is between the door and the door jamb and roughly six inches above or below the locks stopping at the first notch 1401*c*. Once the adz blade 401-S2 is in place, the firefighter should make sure the adz 401-S2 is properly positioned N100*a* and then continue on to the next step N200. If the firefighter is unable to create a large enough gap N100*b* to properly position the adz 401-S2 between the door and the jamb, the firefighter has three additional strategies: N101, N102, N103. In most cases, the adz blade 401-S2 can be easily driven into place making the following methods unnecessary.

If the firefighter is unable to establish a proper purchase point for the adz 401-S2 after following the first step N100, they should attempt the first alternate method N101 by returning the forcible entry tool 3000-C to its most compact configuration, as illustrated in FIGS. 1 and 18A. Swing the forcible entry tool 3000-C like a battering ram by holding the handle grip 52 in each hand and swinging the tool 3000-C across the body so the back face of the adz 1401*n* repeatedly strikes the door near its outside edge. This maneuver will create a large dent, therefore pulling the outside edge of the door inward and widening the gap between the door and the jamb so the adz blade 401-S2 can fit inside. If this alternate method N101*b* proves to be ineffective, the firefighter should attempt the next alternate method N102. If the gap is now wide enough N101*a* the firefighter should finish the first step N100*a*. After separating the forcible entry tool 3000-C into two pieces, as illustrated in FIG. 20, the firefighter should pick either the halligan-like pry bar 1000-PT or the striking tool 2000-PT to retry the forcible entry. Using either the hardened striking plate 4-51 (on the top of the adz and pike 1400-A) or the striking surface F2-306*c* (on the striking tool 2000-PT), the firefighter should swing it into the door jamb like a baseball bat. After repeated swings, enough of the door jamb will be flattened or broken for the blade of the adz 401-S2 to fit inside. If this alternate method N102 proves to be ineffective N102*b*, the firefighter should attempt the last alternate method N103. If the gap is now wide enough N102*a* the firefighter should finish the first step N100*a*. Method N103 is particularly effective on wood or Kalamein door frames. By repeatedly swinging either the striking tool 2000-PT or the halligan-like pry bar 1000-PT against the metal door stop, the gap between the door and the frame will be widened enough for the firefighter to force entry. If the gap is now wide enough N103*a* the firefighter should finish the first step N100*a*. In the event that a large enough gap cannot be created N9000A the firefighter should move onto a different forcible entry strategy.

As described in FIG. 21, when the blade of the adz 401-S2 is inserted up to the first notch 1401*c*, the firefighter can use the superior mechanical advantage of the forcible entry tool 3000-C to greatly enlarge the gap created in the first step N100. To begin widening the gap, the firefighter should reconfigure the forcible entry tool 3000-C into an adz-out extended configuration. This can be achieved by inserting the striking tool handle 2200-A into the hollow portion 101-S1 of the pry bar shaft 1100-A on the opening on the fork 1500-A side until the end 202 of the handle 2200-A is at least past 3000*a* the large cutout 1101*e*, as illustrated in FIG. 18C, without inserting the handle 2200-A past the locking dial 1600-A. If the firefighter prefers to lock the striking tool 3000-C into its extended configuration for spreading, as illustrated in FIG. 18B, they can slide the handle shaft 201 until the bottom locking point F2-202*a*, as illustrated in FIG. 11, is roughly aligned with the locking bolt mH63 hole 1104*z*, as illustrated in FIG. 17D. The larger gaps 1101*f* on either side of the locking dial 1600-A can guide the firefighter in this maneuver. Once properly aligned, the firefighter can twist the locking dial 1600-A a quarter turn clockwise to lock the halligan-like pry bar 1000-PT and the striking tool 2000-PT together in the adz-and-pike-out 1400-A extended configuration, illustrated in FIG. 18B. Note that using the tool 3000-C in this configuration will sacrifice some length and mechanical advantage. The firefighter should then pivot the blade of the adz 401-S2 upwards so the striking tool head 2300-A crushes the door frame and creates a gap between the door frame and jamb. If the door the firefighter is attempting to force flexes back into place as the forcible entry tool 3000-C is removed, the firefighter can wedge the metal door stop into any gap before striking again with the forcible entry tool 3000-C. If the gap is wide enough N200*a* for the fork 1500-A to fit through, the firefighter can proceed onto the next step N250 to attempt to force the door all the way open. If the gap between the door and the frame is not wide enough N200*b*, the firefighter should try alternate methods (N201, N202) for widening the gap before continuing on in the forcible entry process.

For the first alternate method N201, the firefighter should rotate the forcible entry tool 3000-C downwards using the pike 1401*b* as a fulcrum. Then, the firefighter can leave the forcible entry tool in the adz-and-pike-out 1400-A extended configuration, as illustrated in FIG. 18C, to create a larger gap between the door and the frame. If the gap is now large enough N201*a* to fit the fork 1500-A the firefighter should attempt to force the door all the way open N250. If the gap is still not wide enough N201*b* the firefighter should attempt the second alternate method N202. For the second alternate method N202, the firefighter separates the tool 3000-C, then holds the halligan-like pry bar 1000-PT in their non-dominant hand and in the designated grip texture 1101*a*. Next, the firefighter should press the tip 1501*b* of the fork 1500-A (with the inside 1501*t* face of the fork facing the door) into whatever gap has been created so far. Using the striking tool 2000-PT in their dominant hand, the firefighter should N202A tap the back 1401*n* of the adz 1400-A with the top 2309*g* of the striking tool head 2300-A until the fork 1500-A is wedged deep enough into the gap that the tool 3000-C is stuck in place. With the halligan-like pry bar 1000-PT stuck in the gap, the firefighter can hold the handle shaft 201 of the striking tool 2000-PT and swing the tool head 2200-A forcefully at the back 1401*n* of the adz 1400-A. Striking can stop when the fork 1500-A is embedded between the door and the frame at least as far as the second depth marker (1401*c*). The firefighter should then insert the striking tool handle 2200-A into the hole 1401*o* at the back 1401*n* of the adz 1400-A until the end 202 of the handle 2200-A is in between 3000*b* the large cutout 1101*d* (as illustrated in FIG. 19C) and the locking dial 1600-A. If the firefighter prefers to lock the tool 3000-C into its extended configuration for prying, they can slide the striking tool handle shaft 201 further in until the bottom locking point F2-202*a* (illustrated in FIG. 11) is roughly aligned with the locking bolt mH63 hole 1104*z* (illustrated in FIG. 17D). The larger gaps 1101*f* on either side of the locking dial 1600-A may be used as reference. Once properly aligned, the firefighter can twist the locking dial 1600-A a quarter turn clockwise to lock together the halligan-like pry bar 1000-PT and the striking tool 2000-PT in the fork-out 1500-A extended configuration (illustrated in FIG. 19B). Using the tool 3000-C in this configuration will sacrifice some length and mechanical advantage. Once the striking tool 2000-PT has been inserted into the halligan-like pry tool 1000-PT the firefighter should N202B push the forcible entry tool 3000-C back and forth, pivoting off the door and the door frame until the gap has been sufficiently widened. If the firefighter feels the door needs to be opened further, they can position their door stop on either side of the fork 1500-A, with the point of the wedge facing the firefighter so the forcible entry tool 3000-C has more reach. If the gap is now wide enough N202*a*, the firefighter should skip N250 forcing the door open using the adz 1400-A and continue onto the next step N300 in the forcible entry process. If the gap is not wide enough N9000B, the firefighter should consider using hydraulic forcible entry tools, power saws, or the through-the-lock forcible entry process.

Once a large gap has been created on weaker doors, it may be possible to skip using the fork 1500-A end of the halligan-like pry bar 1000-PT. Instead, the firefighter can force the door open N250 by resetting the adz blade 401-S2 (so the inside face 1401*a* is hooked on the door's frame N250A) and driving it through the gap with repeated hits by striking tool 2000-PT (illustrated in FIG. 21). The firefighter can then sharply push N250B the extended, but unlocked, forcible entry tool 3000-C (illustrated in FIG. 18C) against the door's hinge side to see if the door's lock fails. If the firefighter prefers to lock the tool 3000-C into its extended configuration for prying, they can slide the striking tool handle shaft 201 until the bottom locking point F2-202*a* (illustrated in FIG. 11) is roughly aligned with the locking bolt mH63 hole 1104*z* (illustrated in FIG. 17D). The larger gaps 1101*f* on either side of the locking dial 1600-A may be used for reference. Once properly aligned, the firefighter can twist the locking dial 1600-A a quarter turn clockwise to lock the halligan-like pry bar 1000-PT and the striking tool 2000-PT together in the adz-and-pike-out 1400-A extended configuration, illustrated in FIG. 18B. Using the tool 3000-C in this configuration will sacrifice some length and mechanical advantage. If the firefighter feels the door will swing open if pushed a little further, they can position their door stop between the door and the back 1401*n* of the adz 1400-A to give their forcible entry tool 3000-C more reach. If the door's lock does fail N6000B and the door swings open, the firefighter can advance to the final step in the forcible entry process N700. If the door does not open N1000B, the firefighter can proceed to the third step in the forcible entry process N300.

As described in FIG. 21, the third step in the forcible entry process N300 involves the firefighter pulling the striking tool 2000-PT out from the halligan-like pry tool 1000-PT and wedging N300A the striking tool's 2000-PT ax head 2300-A (blade F2-314 first) into the newly created gap. This maneuver will "capture" the gap and prevent it from closing when the adz head and pike 1400-A halligan-like pry tool 1000-PT is removed. Leaving the striking tool 2000-PT wedged in the door gap, the firefighter should then N300B insert the fork end 1500-A of the pry tool into the gap so that the concave side (inside face) 1501*t* of the fork 1500-A is facing the door frame. Once the fork 1500-A is in place N300C, the firefighter can remove the head 2300-A of the striking tool 2000-PT from the gap. The firefighter can also "capture" N300-L the gap between the door and door frame by using the force wedge in their turnout gear.

In the fourth step of the forcible entry process N400, the firefighter holds the striking tool 2000-PT in their dominant hand, using the grip texture 2210*i* and the grip area 2210*j* positioned over the striking tool's 2000-PT center of gravity. The firefighter guides the halligan-like pry tool 1000-PT with their non-dominant hand, using the grip texture 1101*a* positioned over the halligan-like pry bar's 1000-PT center of gravity, N400 the firefighter uses the top 2309*g* of the striking tool's 2000-PT head 2300-A to tap the back 1401*n* of the adz 1400-A until the fork 1500-A is embedded in the gap up to the second depth marker 1402*c*. If the gap is still a little tight the firefighter can tap the back of the fork 1500-A until the fork is embedded in the door up to the first depth marker (1401*c*). Next, the firefighter should wedge the door stop between the halligan-like pry bar 1000-PT and the door so the large flat side is resting against the door and the point of the door stop is resting against the halligan-like pry bar. If successful, the door stop will push the pry tool out from the door, thus allowing the firefighter to step back and swing the striking tool 2000-PT with both hands. When the striking surface F2-306*c* on the head 2300-A of the striking tool 2000-PT hits the back 1401*n* of the adz and pike 1400-A, it will drive the halligan-like pry bar 1000-PT into the gap so it reaches the second depth notch (1401*c*) on the tines 501-S2 of the fork 1500-A.

As described in FIG. 21, the fifth step N500 in the forcible entry process for an inward opening door has the firefighter prepare the door to be forced open. Using a nylon strap from their turnout gear, if the firefighter is working by themselves, the firefighter should secure one end of the strap around the door handle while keeping the other end in their pocket, wrapped around their hand, or tied to the forcible entry tool 3000-C. This is necessary to prevent the door from swinging all the way open once it is forced open giving the firefighter no choice but to step into the burning building and the fireball that is sometimes caused by the sudden influx of fresh air into a burning structure when an exterior (to the fire, not necessarily exterior to the structure) door is opened. In addition to preventing the door from opening all the way, the strap also allows the firefighter to easily pull the door closed again so the amount of fresh air the fire has access to can be controlled, reducing the chances of a flashover. If one is available, a second firefighter N500-L could also be used to manage the door and the strap as it is forced open.

Once the door is prepared, N600 if the firefighter believes the amount of force required to force the door open is significantly less than what the forcible entry tool 3000-C is capable to delivering at maximum capacity 3000*c*, such as an interior door, the firefighter may choose to either use only the halligan-like pry bar 1000-PT to finish the door off or use the forcible entry tool 3000-C in a fork-out extended-and-locked configuration, as illustrated in FIG. 19B, in which the firefighter can insert the striking tool handle 2200-A into the hole 1401*o* at the back 1401*n* of the adz 1400-A until the end 202 of the handle 2200-A is at least past 3000*b* the large cutout 1101*d*, as illustrated in FIG. 19C, while not passing the locking dial 1600-A. Then sliding the striking tool handle shaft 202 within the halligan-like pry bar until the bottom locking point F2-202*a*, as illustrated in FIG. 11, is roughly aligned with the locking bolt mH63 hole 1104*z*, as illustrated in FIG. 17D, using the larger gaps 1101*f* on either side of the locking dial 1600-A for reference. Once properly aligned, the firefighter can twist the locking dial 1600-A a quarter turn clockwise to lock the halligan-like pry bar 1000-PT and the striking tool 2000-PT together in the fork-out 1500-A extended configuration, illustrated in FIG. 19B. Using the tool 3000-C in this configuration will sacrifice some length and mechanical advantage. For an exterior door, since the firefighter is working by themselves, they will need to take advantage of all of the force the forcible entry tool 3000-C is capable of delivering with the forcible entry tool 3000-C in its longest configuration 3000*c*, as illustrated in FIG. 19C. To do this the firefighter will insert the striking tool handle 2200-A into the hole 1401*o* at the back 1401*n* of the adz 1400-A until the end 202 of the handle 2200-A is at least past 3000*b*, as illustrated in FIG. 19C, the large cutout 1101*d* while not passing the locking dial 1600-A.

Then using the forcible entry tool's 3000-C superior 10:1 mechanical advantage for prying when the tool 3000-C is in its longest configuration 3000*c* the firefighter can push the striking tool head 2300-A towards the door, pivoting off the door frame until the lock fails as it is ripped out of the door frame. If the firefighter feels like the door will swing open if it is pushed a little further, they can position their door stop between the back 1401*n* of the adz 1400-A and the door to give the forcible entry tool 3000-C more reach. If the door opened the firefighter can continue on to the final step in the forcible entry process N700. If the door did not open N1000C, the firefighter should consider switching N9000C to hydraulic forcible entry tools, power saws, or to through-the-lock forcible entry. Once open N6000C, the firefighter pulls on their nylon strap pulling the door closed again until the firefighters are ready to enter the burning structure. The firefighter can now N700 remove the forcible entry tool 3000-C from the door, unlocking the two parts 1000-PT and 2000-PT by twisting the locking dial 1600-A a quarter turn counter-clockwise, if they had been locked together, before pulling the striking tool 2000-PT out from inside the halligan-like pry bar 1000-PT. Flipping the halligan-like pry bar 1000-PT over, the firefighter can reinsert the end 202 of the striking tool handle 2200-A into hollow portion 101-S1 of the pry bar shaft 1100-A from the fork 1500-A side F1-103*b* until the striking tool 2000-PT is fully inserted, when the slide stop F2-208 is resting against the outside edge 1101*j* of the pry bar shaft 1100-A, before locking the halligan-like pry bar 1000-PT and the striking tool 2000-PT together by turning the locking dial 1600-A a quarter turn clockwise bringing the forcible entry tool 3000-C into a collapsed-and-locked configuration which is also its 3000-C most compact configuration, as illustrated in FIG. 19A. This configuration allows the tool 3000-C to be easily carried around the fireground or stowed away in a fire apparatus.

FIG. 22, is a flow chart describing the method for using a forcible entry tool 3000-C as disclosed herein to obtain access through an outwardly opening door. The most common path through the forcible entry process for opening an outwardly opening door W2000 is highlighted in grey. An outwardly door opens towards the user. The first step W100 of the forcible entry process for one firefighter using the forcible entry tool 3000-C described herein begins with the firefighter using the forcible entry tool 3000-C in a separated configuration, as illustrated in FIG. 20. This separated configuration is achieved by turning the locking dial 1600-A a quarter turn counterclockwise before pulling the striking tool 2000-PT out from inside the halligan-like pry bar 1000-PT. The firefighter should hold the Halligan-type pry bar 1000-PT in their non-dominant hand, using the grip texture 1101*a* positioned over the halligan-like pry bar's 1000-PT center of gravity, with the fork 1500-A pointing towards their back. The striking tool 2000-PT should be in their dominant hand, using the grip texture 2210*i* and the grip area 2210*j* positioned over the striking tool's 2000-PT center of gravity, with the blade 2314*a* on the striking tool head 2300-A pointing toward the ground and the handle 2200-A running parallel to and resting against their forearm. Using the top of the striking tool 2309*g*, tap the hardened striking plate 4-51 on top of the adz and pike 1400-A until the adz blade 401-S2, illustrated in FIG. 4, is wedged between the door and the door frame roughly six inches above or below the locks stopping once the tool is embedded up to the first notch 1401*c*. Once the adz blade 401-S2 is in place, the firefighter should stop and evaluate, making sure the adz 401-S2 is properly positioned W100*a*, if it is then the firefighter can continue to the next step W200. If the adz 1400-A cannot be tapped into place the firefighter should consider switching to a different forcible entry strategy W9000.

With the adz 1400-A end of the halligan-like pry bar 1000-PT embedded in gap between the door and the frame, the firefighter can now W200 insert the striking tool handle 2200-A into the hollow portion 101-S1 of the pry bar shaft 1100-A from the opening fork 1500-A side stopping once the end 202 of the handle 2200-A is at least past 3000*a* the large cutout 1101*e*, as illustrated in FIG. 18C, while not passing the locking dial 1600-A. If the firefighter prefers to lock the tool 3000-C into its extended configuration for spreading, as illustrated in FIG. 18B, they can slide the striking tool handle shaft 201 further in until the bottom locking point F2-202*a*, as illustrated in FIG. 11, is roughly aligned with the locking bolt mH63 hole 1104*z*, as illustrated in FIG. 17D, using the larger gaps 1101*f* on either side of the locking dial 1600-A for reference. Once properly aligned, the firefighter can twist the locking dial 1600-A a quarter turn to the clockwise to lock the halligan-like pry bar 1000-PT and the striking tool 2000-PT together in the adz-and-pike-out 1400-A extended configuration, illustrated in FIG. 18B. Using the tool 3000-C in this configuration will sacrifice some length and mechanical advantage. The firefighter should hold the extended tool 3000-C close striking tool head 2300-A and push down sharply several times, twisting the adz 1400-A in the gap which crushes the door and the frame widening the gap. If the firefighter does not think there is room to drive the adz deeper into the gap W200*a* they should continue onto the next step W200*c*. Before continuing on the firefighter should evaluate the space around the door and decide if they have enough space to work, if they do W200*c* they can continue onto the next step W300. If space is cramped around the door or W200*d* there is another wall that is preventing the firefighter from pushing the tool 3000-C far enough to force the door open the firefighter should W200-U use the striking tool 2000-PT to make a hole in the wall large enough to allow the firefighter to push the tool 3000-C far enough to force the door open. In tight spaces it may be more efficient to use only the adz W250 to force W260 the door open. If the firefighter thinks there is room to drive the adz deeper into the gap W200*b* they should prepare to try and force the door open W250.

On some weaker doors, W250 that have a wooden frame and are only secured by one lock, the firefighter can leave the adz 1400-A embedded in the newly created gap before sliding the striking tool 2000-PT out from inside the halligan-like pry bar 1000-PT, unlocking the two implements if necessary, by rotating the locking dial 1600-A a quarter turn counter-clockwise. Then holding the striking tool 2000-PT in their dominant hand, using the grip texture 2210*i* and the grip area 2210*j* positioned over the striking tool's 2000-PT center of gravity, with the striking tool head's 2300-A blade 2314*a* pointing towards the ground and the handle running parallel to and resting against their forearm. Using their non-dominant hand, the firefighter should hold the fork end 1500-A of the halligan-like pry bar 1000-PT while pulling back slightly to help steer the adz blade 401-S2 around the door jamb. While pulling with their non-dominant hand, the firefighter should use the top of the striking tool 2309*g*, already in their dominant hand, to strike the hardened striking plate 4-51 on top of the adz and pike 1400-A until the adz blade 401-S2, illustrated in FIG. 4, is wedged between the door and the frame in the gap created in the second step W250 stopping once the adz blade 401-S2 is embedded between the door at least up to the second notch 1041*c* located on the side of the adz blade 401-S2. Once the adz blade 401-S2 is embedded deep enough in the gap to support the halligan-like pry tool's 1000-PT weight W250 the firefighter can take a step back and grip the striking tool 2000-PT with both hands at the bottom 2210*b* of the handle shaft 201 swinging the tool forcefully striking the hardened striking plate 4-52 on top of the adz and pike 1400-A with the striking surface F2-306*c* on the striking tool head 2300-A until adz blade 401-S2 is embedded in the gap, past the second notch 1401*c*, up to the surround 1401*g* on the tool mount section 401-S3 of the adz 401.

With the adz blade 401-S2 in place, W260 the firefighter can reinsert the striking tool handle 2200-A into the hollow portion 101-S1 of the pry bar shaft 1100-A from the opening fork 1500-A side stopping once the end 202 of the handle 2200-A is at least past 3000*a* the large cutout 1101*e*, as illustrated in FIG. 18C, while not passing the locking dial 1600-A. If the firefighter prefers to lock the tool 3000-C into its extended configuration for spreading, as illustrated in FIG. 18B, they can slide the striking tool handle shaft 201 further in until the bottom locking point F2-202*a*, as illustrated in FIG. 11, is roughly aligned with the locking bolt mH63 hole 1104*z*, as illustrated in FIG. 17D, using the larger gaps 1101*f* on either side of the locking dial 1600-A for reference. Once properly aligned, the firefighter can twist the locking dial 1600-A a quarter turn clockwise to lock the halligan-like pry bar 1000-PT and the striking tool 2000-PT together in the adz-and-pike-out 1400-A extended configuration, illustrated in FIG. 18B. Using the tool 3000-C in this configuration will sacrifice some length and mechanical advantage. The firefighter should hold the extended tool 3000-C close to the striking tool head 2300-A and pull the striking tool head 2300-A away from the door W260 pivoting off the door frame to force the door open. If the door opened W6000A the firefighter can skip to the eighth step W800 in the outward opening door forcible entry process. If the door did not open W1000A the firefighter should continue on to the third step in the process W300.

As illustrated in FIG. 22, after attempting to force the door using the adz blade 401-S2 the firefighter should slide the striking tool 2000-PT out from inside the halligan-like pry bar 1000-PT, unlocking the implements if needed by rotating the locking dial 1600-A a quarter turn counter-clockwise before pulling W300 the adz 1400-A on the halligan-like pry bar 1000-PT out of the gap between the door and the frame. The firefighter can now W350 insert the fork end 1500-A of the halligan-like pry bar 1000-PT into the gap so that the concave (inside) face 1501*t* is facing the door. If needed, the firefighter can use the striking tool 2000-PT in their dominant hand, using the grip texture 2210*i* and the grip area 2210*j* positioned over the striking tool's 2000-PT center of gravity, to tap the back 1401*n* of the adz 1400-A with the top 2309*g* of the striking tool head 2300-A until the fork 1500-A is embedded in the door up to the first notch (1401*c*). The firefighter should then W400 pull the adz and pike 1400-A end of the halligan-like pry tool 1000-PT away from the door slightly to steer the tines 501-S2 of the fork 1500-A around the door jamb. While pulling back on the halligan-like pry bar 1000-PT the firefighter should use the striking tool 2000-PT, still in their dominant hand, to W450 tap the back 1401*n* of the adz 1400-A with the top 2309*g* of the striking tool head 2300-A until the fork 1500-A is embedded in the door up to the second notch (1401*c*). If more force is needed to get the fork's 1500-PT tines 501-S2 in place, the firefighter should drive the fork's 1500-A tines 501-S2 as deep as they can until they are deep enough into the gap where the halligan-like pry bar's 1000-PT weight is supported so the firefighter can take a step back and grip the striking tool 2000-PT with both hands at the bottom 2210*b* of the handle shaft 201 swinging the tool forcefully striking the back 1401*n* of the adz 1400-A until the fork's 1500-A tines 501-S2 are embedded up to the second notch (1401*c*). When driving the fork 1500-A into the gap between the door and the door frame W450-U the firefighter should be careful not to drive the fork 1500-A in too far initially which can cause the tines 501-S2 to become embedded in the door jamb.

As illustrated in FIG. 22, the fork is now driven into the gap between the door and the door frame up to the second notch (1401*c*) causing W500 the halligan-like pry bar to stick out nearly perpendicularly from the door. In order to force the door open the firefighter should reconfigure the forcible entry tool 3000-C into a fork-out extended configuration, as illustrated in FIG. 19. The firefighter can accomplish this by reinserting the striking tool handle 2200-A into the hollow portion 101-S1 of the pry bar shaft 1100-A from the opening adz 1400-A side stopping once the end 202 of the handle 2200-A is at least past 3000*b* the large cutout 1101*d*, as illustrated in FIG. 19C, while not passing the locking dial 1600-A. If the firefighter prefers to lock the tool 3000-C into its extended configuration for prying, as illustrated in FIG. 19B, they can slide the striking tool handle shaft 201 further in until the bottom locking point F2-202*a*, as illustrated in FIG. 11, is roughly aligned with the locking bolt mH63 hole 1104*z*, as illustrated in FIG. 17D, using the larger gaps 1101*f* on either side of the locking dial 1600-A for reference. Once properly aligned, the firefighter can twist the locking dial 1600-A a quarter turn clockwise to lock the halligan-like pry bar 1000-PT and the striking tool 2000-PT together in the fork-out 1500-A extended configuration, illustrated in FIG. 19B. Using the tool 3000-C in this configuration will sacrifice some length and mechanical advantage. The firefighter should hold the extended tool 3000-C close to the striking tool head 2300-A and push W600 striking tool head 2300-A away from the door, towards the wall, pivoting off the door frame in order to force the door open. If the door did not open, W1000B the firefighter should adjust the fork's 1500-A tines 501-S2 grip on the door and try again. If the firefighter feels like the door will swing open if it is pushed a little further W700, they can position their door stop between the back 1401*n* of the adz 1400-A and the door to give the forcible entry tool 3000-C more reach. If the door did open W6000B the firefighter can move onto the final step W800.

To finish, the firefighter can now W800 remove the forcible entry tool 3000-C from the door, unlocking the two parts 1000-PT and 2000-PT by twisting the locking dial 1600-A a quarter turn counter-clockwise, if they had been locked together, before pulling the striking tool 2000-PT out from inside the halligan-like pry bar 1000-PT. Flipping the halligan-like pry bar 1000-PT over, the firefighter can reinsert the end 202 of the striking tool handle 2200-A into the hollow portion 101-S1 of the pry bar shaft 1100-A from the fork 1500-A side F1-103*b* until the striking tool 2000-PT is fully inserted, when the slide stop F2-208 is resting against the outside edge 1101*j* of the pry bar shaft 1100-A, before locking the halligan-like pry bar 1000-PT and the striking tool 2000-PT together by turning the locking dial 1600-A a quarter turn clockwise bringing the forcible entry tool 3000-C into a collapsed-and-locked configuration which is also its 3000-C most compact configuration, as illustrated in FIG. 19A. This configuration allows the tool 3000-C to be easily carried around the fireground or stowed away in a fire apparatus.

Certain features of tool 3000-C enable method of use described in FIG. 21. In particular, a first component (e.g., 1000-PT) having a hollow shaft designed to slidably receive a handle (e.g., 201) of a second component (e.g., 2000-PT) provides a device that can form a composite shaft comprising lengths of both components. This composite shaft is elongated and therefore advantageously provides leverage that a user could not achieve when using either component individually. The ability to quickly and securely lock the two components together using an extension locking dial (e.g., 1600-A) advantageously gives greater control over the tool by allowing the user to lock the components into a rigid composite shaft. In the locked configuration, users have added control over the tool such that great force can be applied to the tool. Conventional methods of using known tools do not provide such a rigid composite shaft.

Those skilled in the art will recognize that a wide variety of modifications, alterations, and combinations can be made with respect to the above described embodiments and examples without departing from the scope of the invention, and that such modifications, alterations, and combinations are to be viewed as being within the ambit of the inventive concept.

What is claimed is:

1. A multi-purpose tool comprising:

a first shaft;

a second shaft slidably receiving the first shaft;

a pin;

a dial rotatably mounted to the second shaft, the dial operably coupled to the pin such that rotation of the dial in a first direction moves the pin longitudinally relative to the dial toward an extended position to secure the first shaft relative to the second shaft and rotation of the dial in a second direction moves the pin longitudinally relative to the dial toward a retracted position to permit the first shaft to move relative to the second shaft;

a threaded portion affixed to the dial, wherein the pin includes a thread that engages a thread of the threaded portion such that rotation of the dial moves the pin relative to the threaded portion; and a guide protrusion, wherein the pin includes a channel extending axially along at least a portion of the pin, the guide protrusion extending into the channel to inhibit rotation of the pin.

2. The multi-purpose tool of claim 1, wherein the first shaft includes a first tool affixed thereto;

wherein the second shaft includes a first end portion and a second end portion opposite the first end portion, the second shaft including an opening extending from the first end portion to the second end portion to slidably receive the first shaft through either the first end portion or the second end portion, the second shaft having a cross-sectional shape configured to interface with the first shaft when the first shaft is received in the second shaft to inhibit the first shaft from rotation relative to the second shaft;

wherein the second shaft includes a second tool affixed at the first end portion of the second shaft and a third tool affixed at the second end portion of the second shaft.

3. The multi-purpose tool of claim 2 wherein the dial is able to secure the first shaft to the second shaft regardless of whether the first shaft is received through the first end portion or the second end portion.

4. The multi-purpose tool of claim 2 wherein one or more of the second tool and third tool includes a plurality of depth marking notches.

5. The multi-purpose tool of claim 1 wherein the first shaft is separable from the second shaft when the pin is in the retracted position.

6. The multi-purpose tool of claim 1 wherein the first shaft includes a grip aid on the first shaft.

7. The multi-purpose tool of claim 6 wherein the grip aid includes a recess along the first shaft to limit movement of a hand of a user along the first shaft.

8. The multi-purpose tool of claim 1 wherein at least a portion of the first shaft has a cross-sectional profile corresponding to the cross-sectional profile of an opening of the second shaft receiving the first shaft to inhibit the first shaft from rotation relative to the second shaft when received in the second shaft.

9. The multi-purpose tool of claim 1 wherein the dial is able to be rotated to move the pin to the extended position to secure the first shaft to the second shaft at multiple positions relative to the second shaft.

10. The multi-purpose tool of claim 1 wherein the first shaft includes one or more locking holes, wherein when the dial is rotated in the first direction the pin moves inward to engage one of the one or more locking holes of the first shaft and wherein when the dial is rotated in the second direction the pin moves outward to disengage the first shaft.

11. The multi-purpose tool of claim 1 wherein the first shaft includes a first tool affixed thereto, wherein the second shaft includes a second tool affixed thereto, wherein at least a portion of the second tool overlaps with at least a portion of the first tool when the first shaft is fully received into the second shaft.

12. The multi-purpose tool of claim 11 wherein the first tool is an ax head having a narrowed width portion and the second tool is a pry fork having a first tine and a second tine, wherein the narrowed width portion of the ax head is received between the first tine and the second tine when the first shaft is fully received into the second shaft.

13. The multi-purpose tool of claim 12 wherein the ax head has an attachment portion connected to the first shaft and a blade, wherein the attachment portion is between the blade and the narrowed width portion.

14. The multi-purpose tool of claim 1 wherein the second shaft includes at least one tool mount having a slide channel and a mounting hole, further comprising a tool including a tongue slidingly received in the slide channel of the at least one tool mount and secured to the second shaft via the mounting hole.

15. The multi-purpose tool of claim 1 wherein the first shaft includes a first tool affixed thereto including an ax head having an upper portion and a lower portion, the ax head having a blade that angles outward from the first shaft as the blade extends from the lower portion to the upper portion, the upper portion being heavier than the lower portion.

16. The multi-purpose tool of claim 1 wherein the pin engages the first shaft in the extended position to secure the first shaft relative to the second shaft, wherein the first shaft includes at least one locking hole to receive the pin when the pin is in extended position to secure the first shaft in at least one position relative to the second shaft.

17. The multi-purpose tool of claim 1 further comprising a base portion mounted to the second shaft and having an attachment lip, the dial including an annular ridge engaging the attachment lip to secure the dial to the base portion, the attachment lip guiding rotation of the dial and inhibiting axial movement of the dial from the base portion as the dial is rotated relative to the base portion.

18. The multi-purpose tool of claim 17 wherein an entire circumference of the annular ridge of the dial maintains contact with the attachment lip of the base portion during rotation of the dial.

* * * * *